US009970266B2

(12) United States Patent
Marx et al.

(10) Patent No.: US 9,970,266 B2
(45) Date of Patent: May 15, 2018

(54) METHODS AND SYSTEMS FOR IMPROVED DRILLING OPERATIONS USING REAL-TIME AND HISTORICAL DRILLING DATA

(71) Applicant: Resource Energy Solutions Inc., Calgary (CA)

(72) Inventors: Trent Marx, Calgary (CA); Gary William Reid, Black Diamond (CA); Henry Leung, Calgary (CA); Xiaoxiang Liu, Calgary (CA)

(*) Notice: Subject to any disclaimer, the term of this patent is extended or adjusted under 35 U.S.C. 154(b) by 378 days.

(21) Appl. No.: 14/676,901

(22) Filed: Apr. 2, 2015

(65) Prior Publication Data

US 2015/0218914 A1    Aug. 6, 2015

Related U.S. Application Data

(63) Continuation of application No. 13/665,202, filed on Oct. 31, 2012, now Pat. No. 9,022,140.

(51) Int. Cl.

| E21B 44/00 | (2006.01) |
| E21B 41/00 | (2006.01) |
| E21B 49/00 | (2006.01) |
| E21B 12/02 | (2006.01) |
| E21B 7/00 | (2006.01) |
| E21B 47/00 | (2012.01) |
| G06N 5/02 | (2006.01) |
| G06N 7/00 | (2006.01) |

(52) U.S. Cl.
CPC .......... *E21B 41/0092* (2013.01); *E21B 7/00* (2013.01); *E21B 12/02* (2013.01); *E21B 44/00* (2013.01); *E21B 47/00* (2013.01); *E21B 49/00* (2013.01); *G06N 5/02* (2013.01); *G06N 7/005* (2013.01)

(58) Field of Classification Search
CPC ................ E21B 44/00; E21B 44/02
USPC .................... 175/24, 27, 50; 702/9
See application file for complete search history.

(56) References Cited

U.S. PATENT DOCUMENTS 6,109,368 A * 8/2000 Goldman ............... E21B 12/02
                                                  175/39
6,206,108 B1 * 3/2001 MacDonald ........... E21B 44/00
                                                  175/24

(Continued)

*Primary Examiner* — David J Bagnell
*Assistant Examiner* — Michael A Goodwin
(74) *Attorney, Agent, or Firm* — HEER LAW; Christopher D. Heer

(57) ABSTRACT

Methods and systems are described for improved drilling operations through the use of real-time drilling data to predict bit wear, lithology, pore pressure, a rotating friction coefficient, permeability, and cost in real-time and to adjust drilling parameters in real-time based on the predictions. The real-time lithology prediction is made by processing the real-time drilling data through a multilayer neural network. The real-time bit wear prediction is made by using the real-time drilling data to predict a bit efficiency factor and to detect changes in the bit efficiency factor over time. These predictions may be used to adjust drilling parameters in the drilling operation in real-time, subject to override by the operator. The methods and systems may also include determining various downhole hydraulics parameters and a rotary friction factor. Historical data may be used in combination with real-time data to provide expert system assistance and to identify safety concerns.

20 Claims, 77 Drawing Sheets

(56) References Cited

U.S. PATENT DOCUMENTS

| | | | |
|---|---|---|---|
| 6,424,919 B1 * | 7/2002 | Moran .................... | E21B 44/00 702/6 |
| 2008/0289877 A1 * | 11/2008 | Nikolakis-Mouchas . | E21B 7/04 175/57 |
| 2009/0234623 A1 * | 9/2009 | Germain ................ | E21B 41/00 703/6 |

* cited by examiner

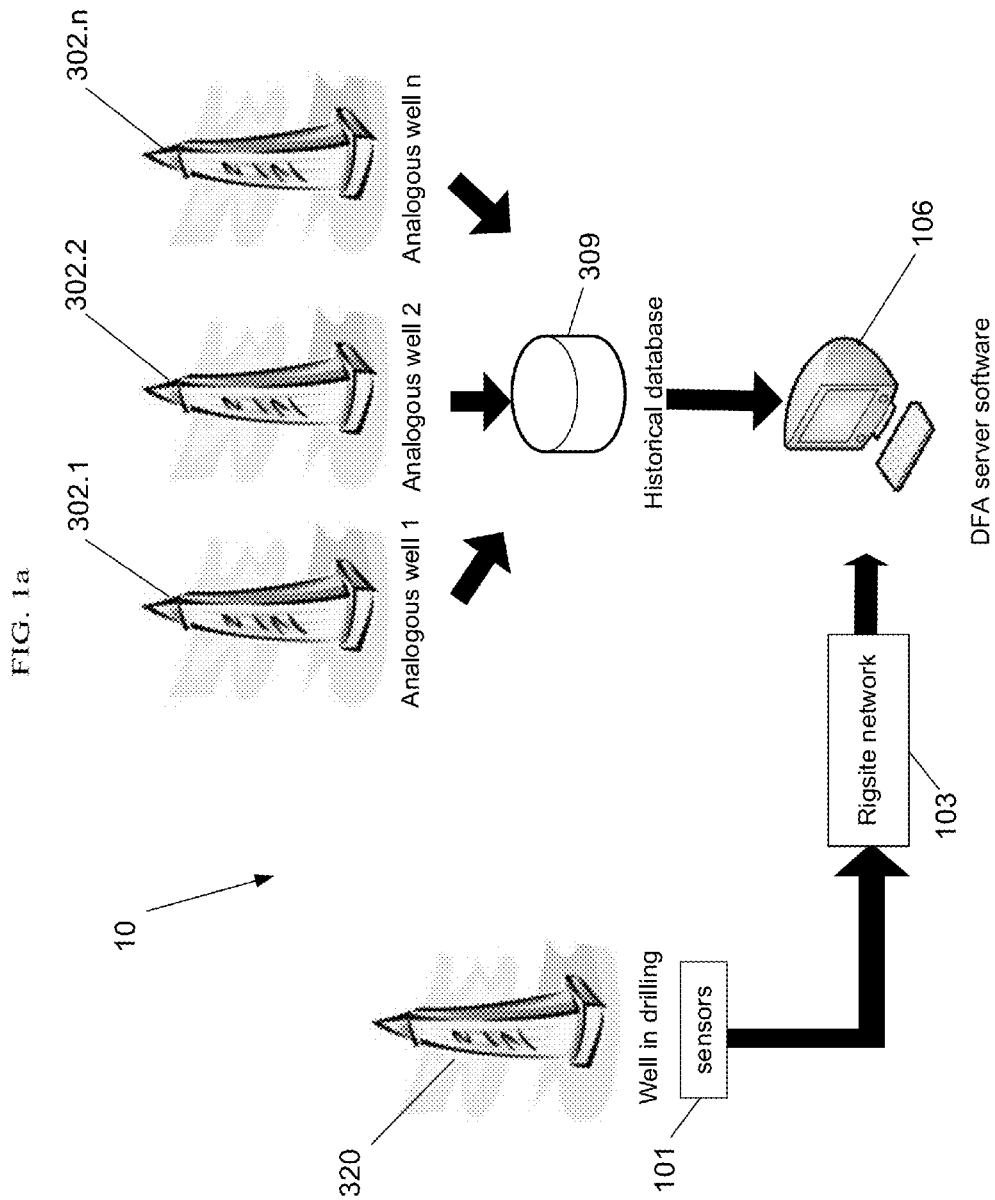

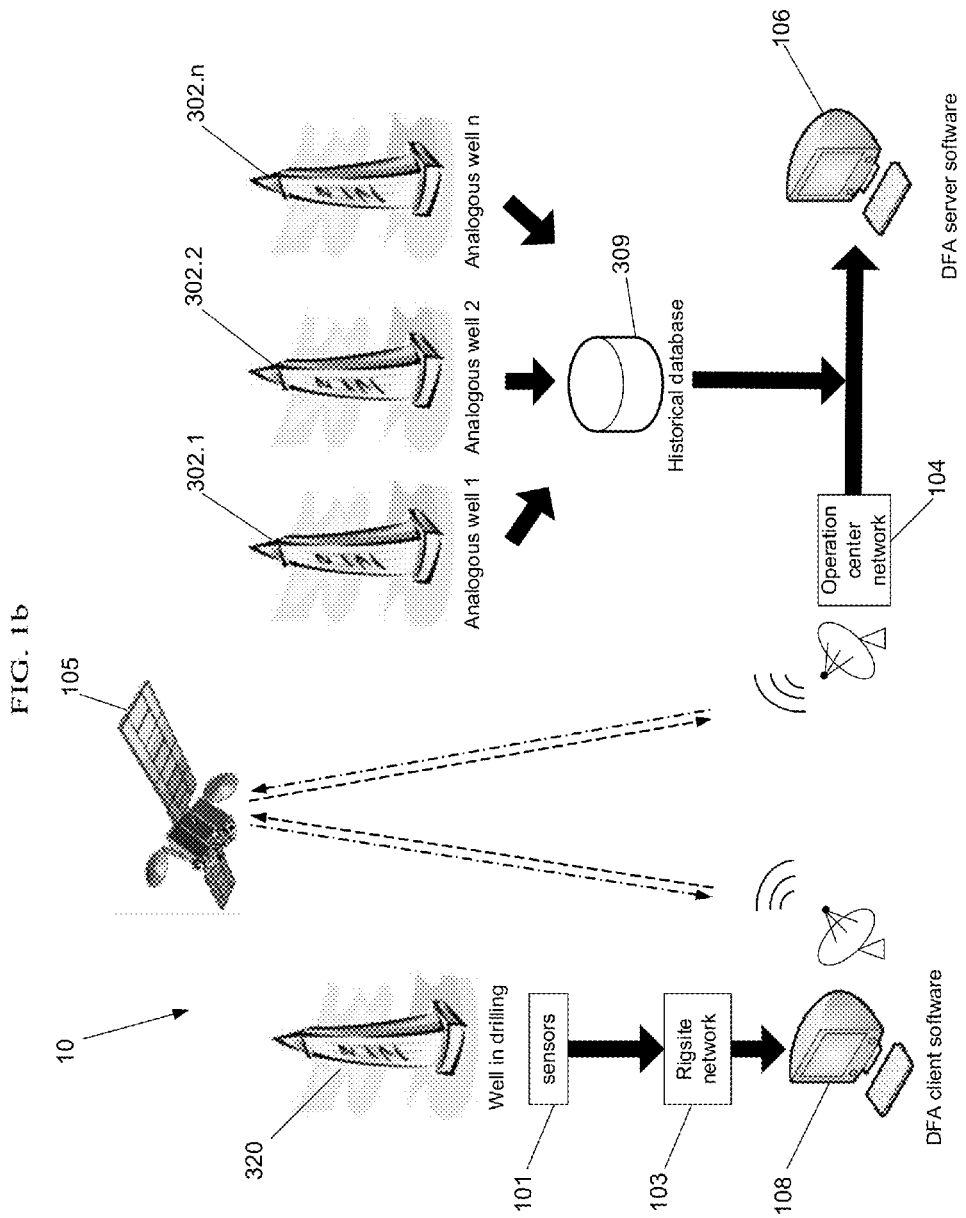

Legend: Three lithology types: shale (dark gray), sandstone (medium gray), siltstone (light gray)

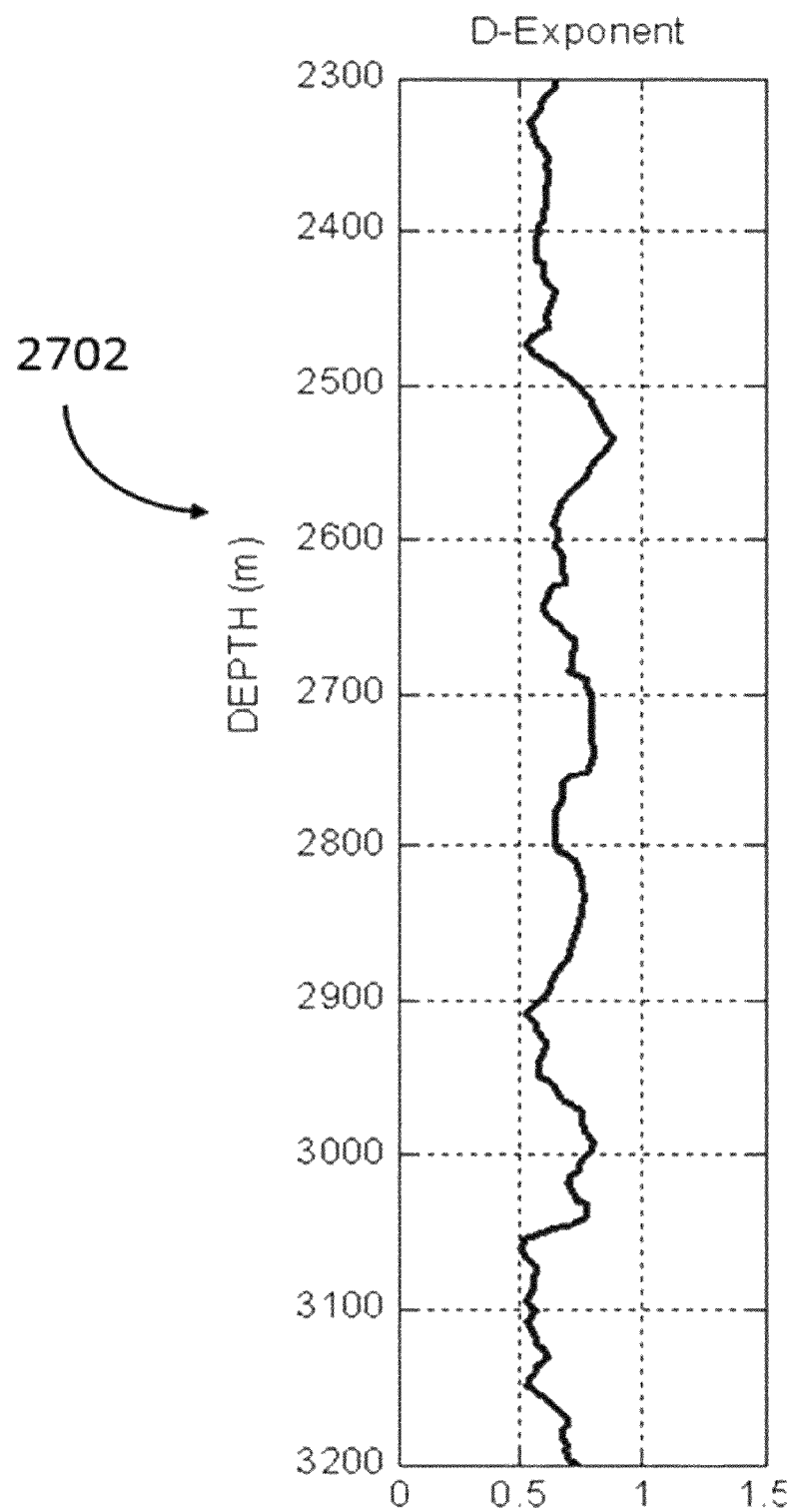

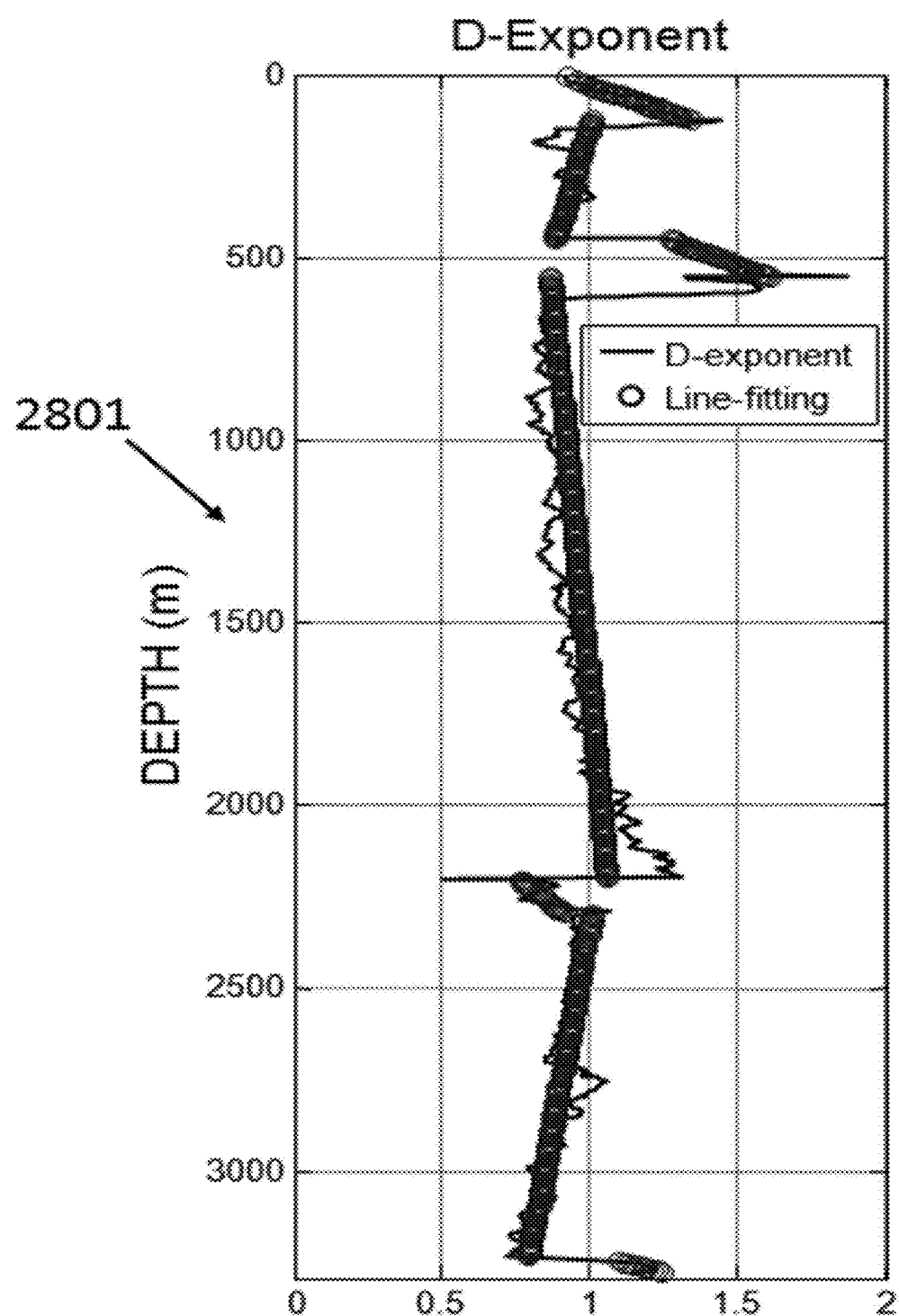

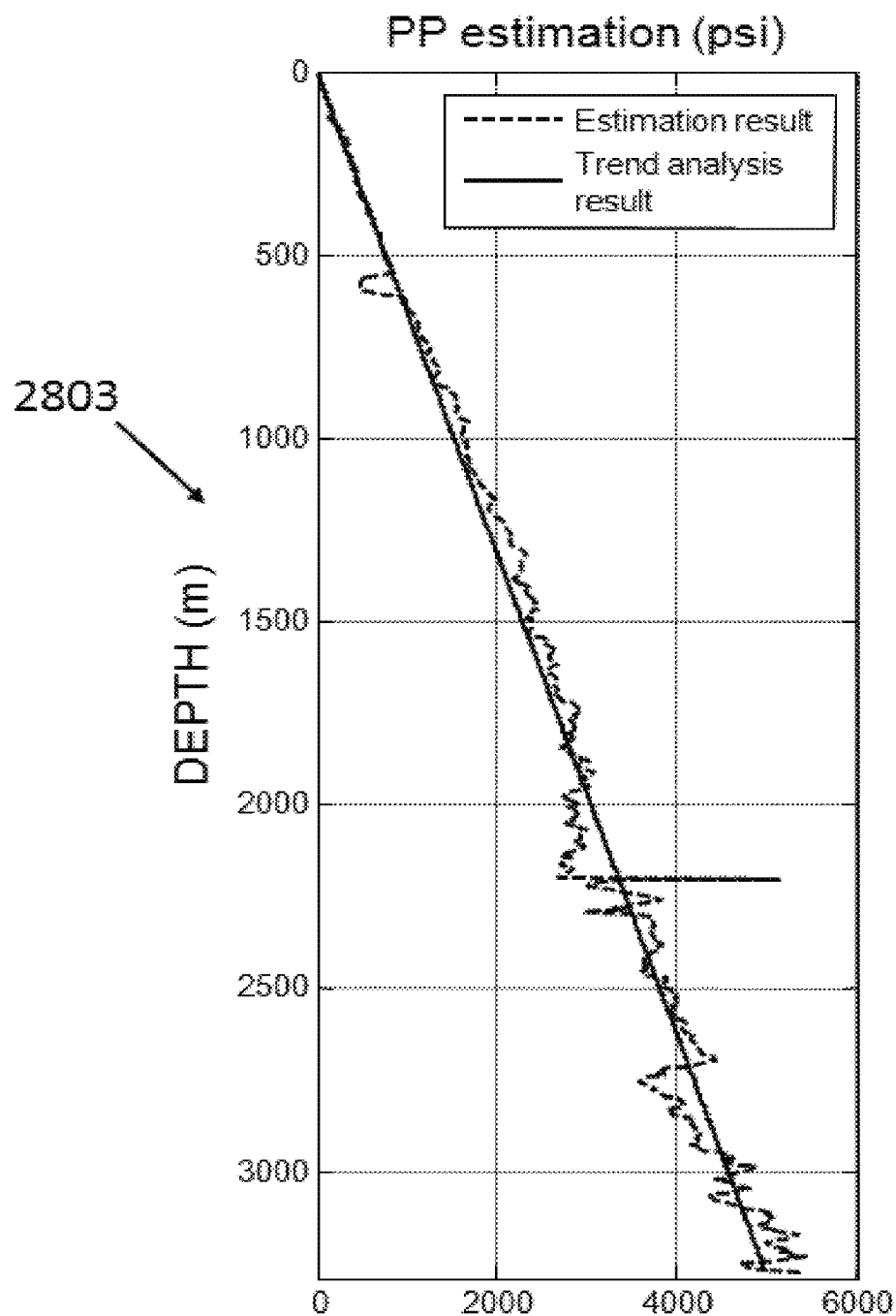

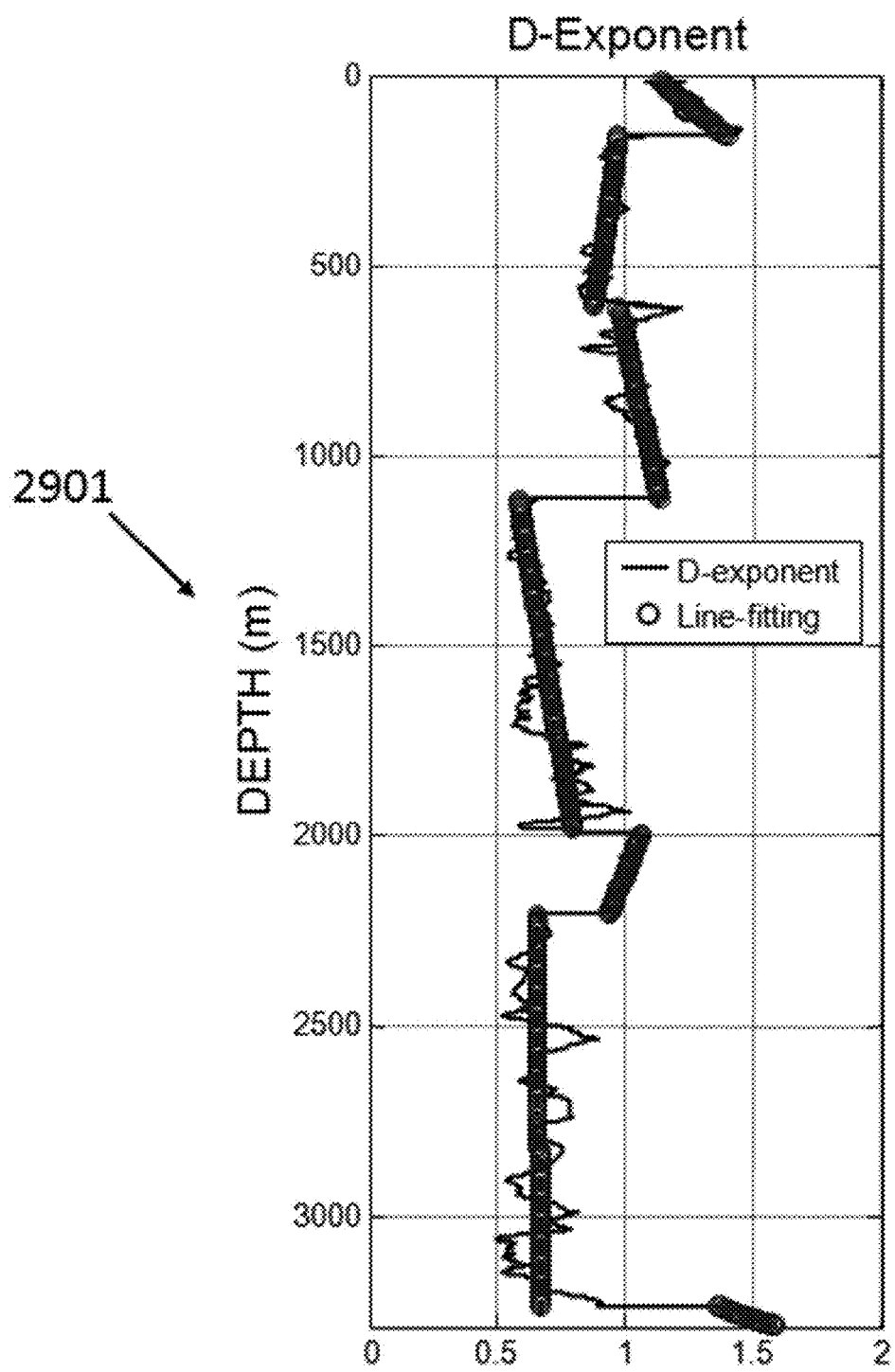

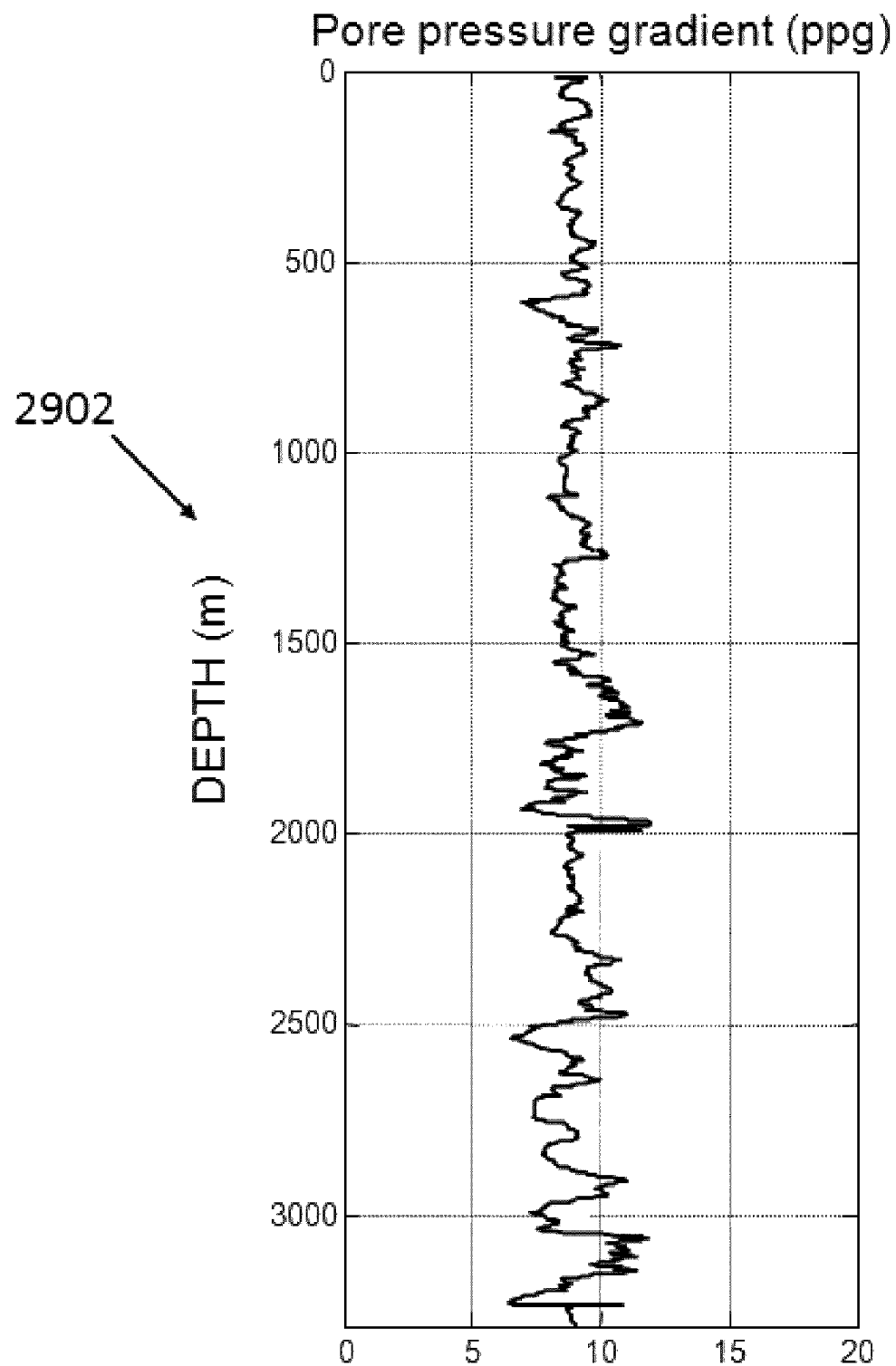

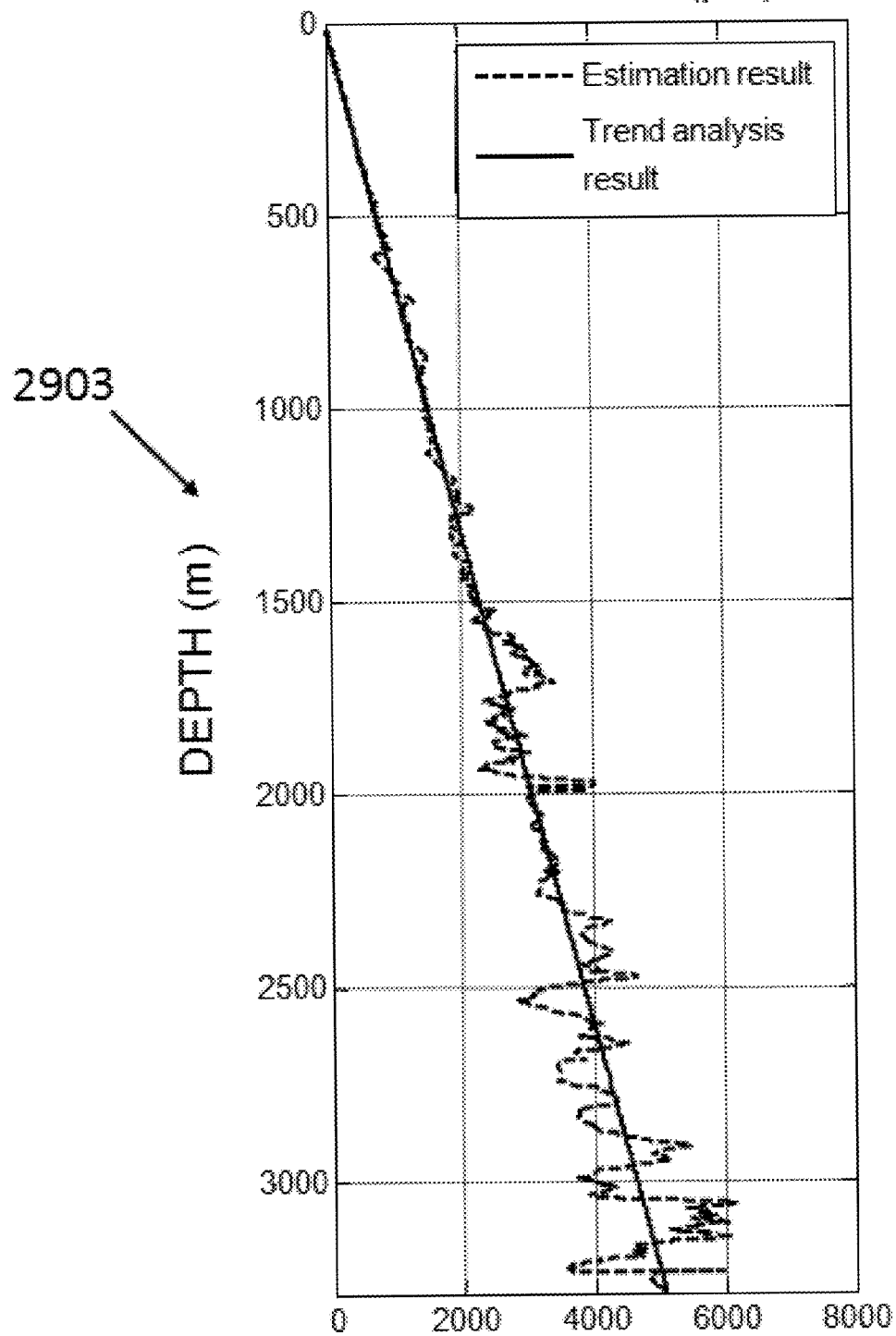

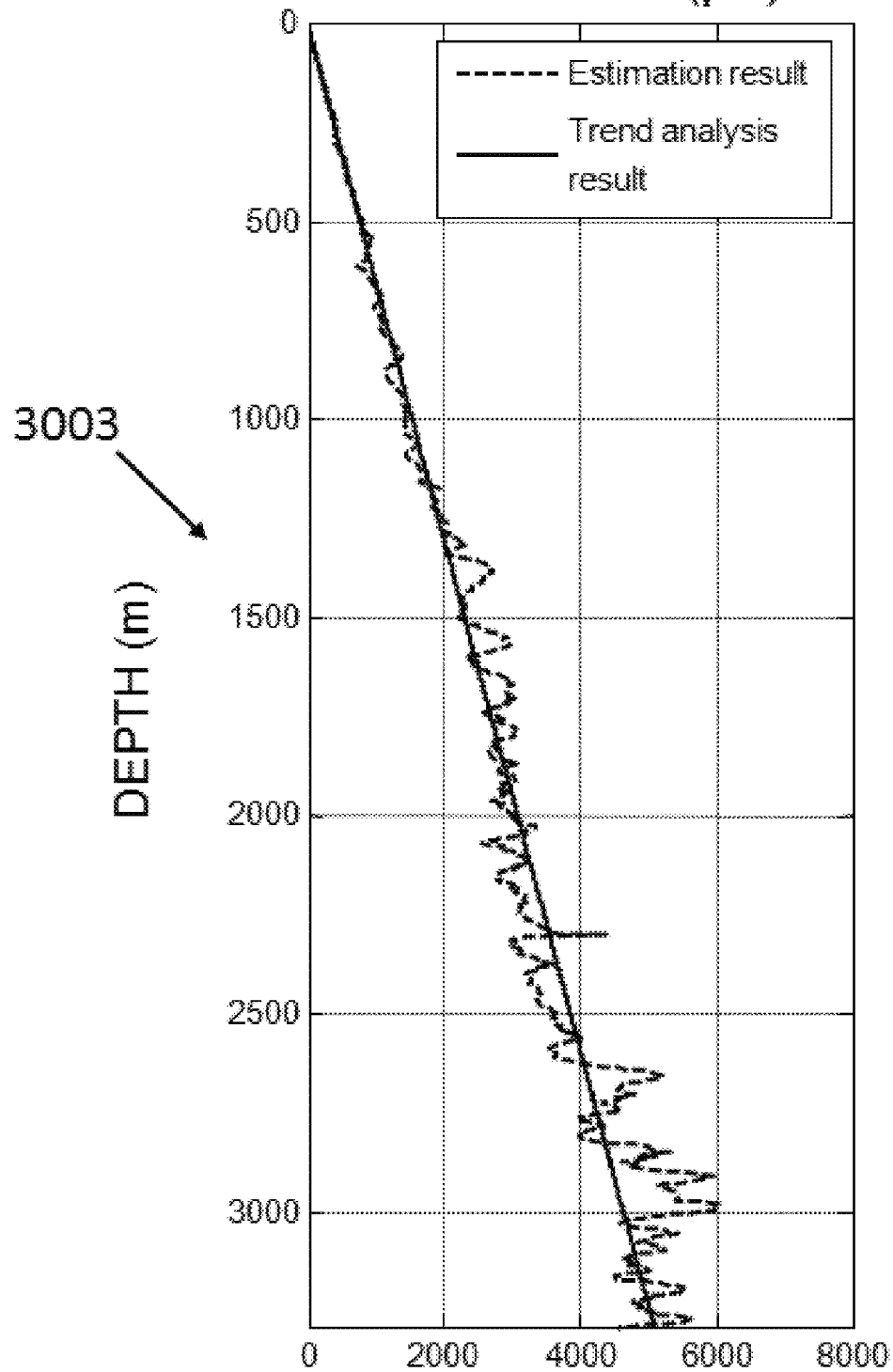

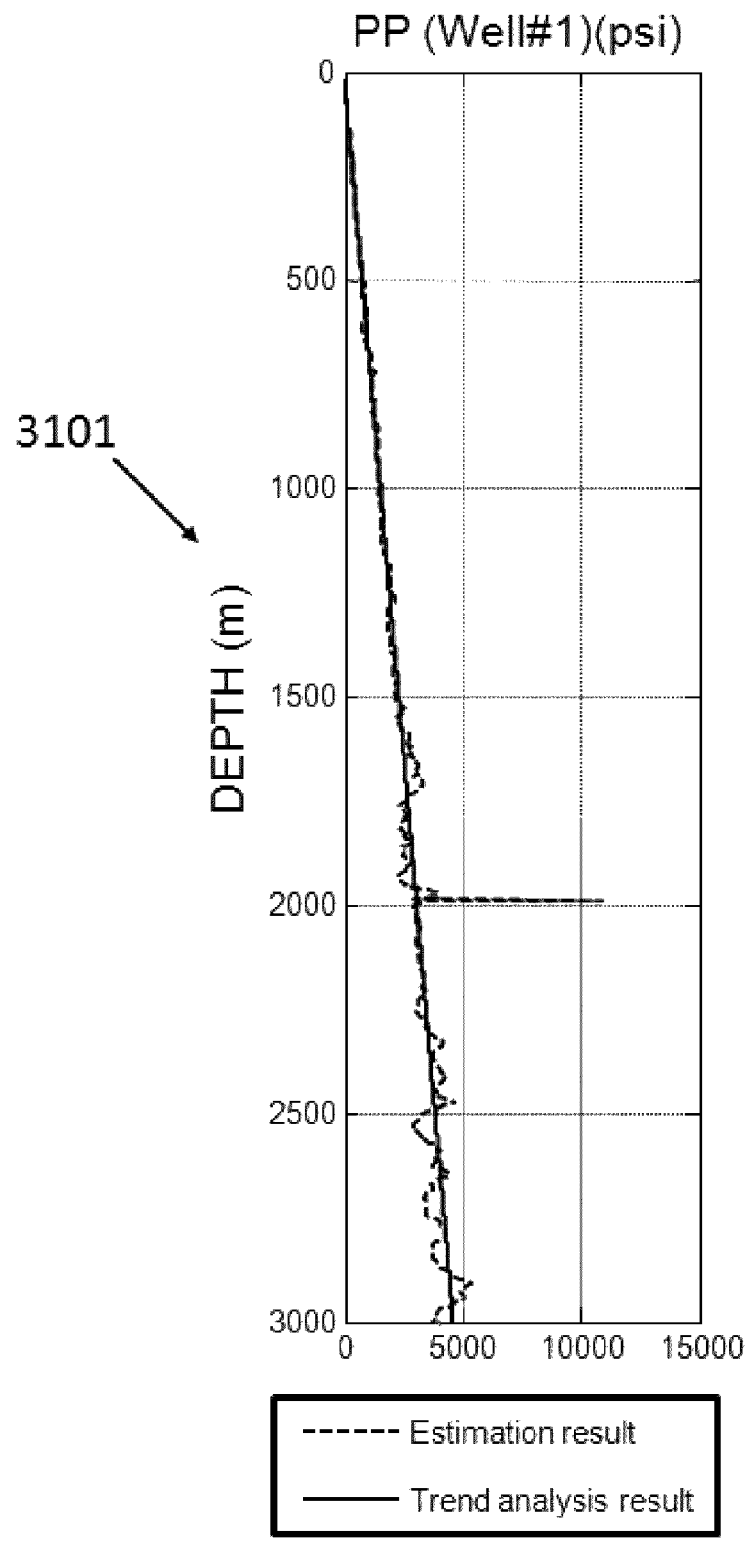

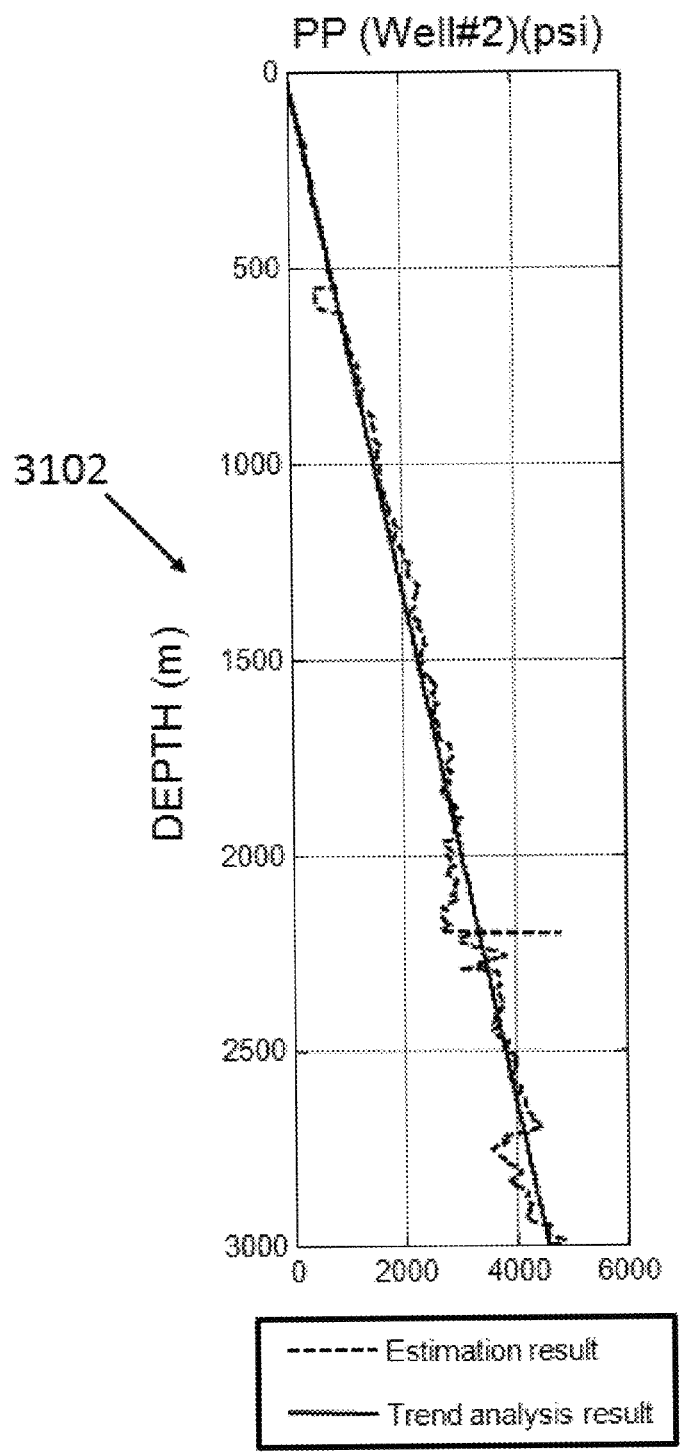

FIG. 24b

| DRILLING ASSEMBLY | | | | |
|---|---|---|---|---|
| No | Component | OD | ID | Length |
| 1 | BIT | 222 | | 0.25m |
| 1 | MOTOR STG3-1.15 | 166 | | 9.06m |
| 1 | MONEL | 165 | 75 | 9.39m |
| 1 | UBHO-SUB | 164 | 71 | 0.80m |
| 1 | X/O | 170 | 57 | 0.52m |
| 12 | DC (7.00 IN) | 170 | 71 | 110.95m |
| 1 | X/O | 165 | 71 | 0.71m |
| 9 | HWDP(5.0 IN) | 127 | 76 | 84.11m |
| | | | | |
| | | | | |
| | | | | |
| | | | | |
| | | | | |
| 51 | Drill Pipe | Stands | | 1400.31m |
| 1 | Drill Pipe | Singles | | 8.90m |
| | Kelly Down | | | 0.00m |
| | Total | | | 1625.00m |
| | Weight of DC | | | 12kdaN |
| | Weight of String | | | 72kdaN |

Read and Record SIDPP, SICP, and PIT GAIN

| S.I.D.P.P. (psi) | PIT GAIN (bbls) | S.I.C.P. (psi) |
|---|---|---|
| 480 | 35 | 600 |

Day:         Date:         Time:

Max. Mud Wt.

| Surface Leak Off Test (psi) | Casing T.V.D. from RKB (ft) | | Leak off Test Mud Weight (ppg) | Maximum Mud Weight (ppg) |
|---|---|---|---|---|
| 15.03 / | 2008 / | 0.052 + | 10.62 = | 10.8 |

| | | Formulation Breakdown Gradient | | Maximum Mud Weight (ppg) |
|---|---|---|---|---|
| | OR | 0.5816 / | 0.052 ≈ | 10.8 |

M.A.A.S.P.

| Maximum Mud Weight (ppg) | Current Drilling Mud Weight (ppg) | | Casing T.V.D. from RKB (ft) | Maximum Allowable Annulus Surface Pressure (psi) |
|---|---|---|---|---|
| ( 10.8 + | 10.62 ) × | 0.052 × | 2008 = | 16.7949 |

M.A.C.P.

| | Casing Yield (psi) | Safety Factor (percent) | Maximum Allowable Annulus Surface Pressure (psi) |
|---|---|---|---|
| | 5000 × | 0.85 = | 4250 |

Kill Mud.

| S.I.D.P.P. (psi) | T.V.D. from RKB (ft) | Current Mud Weight (ppg) | Kill Mud (ppg) |
|---|---|---|---|
| 480 / | 5263 / | 0.052 + 10.62 ≈ | 12.4 |

METHODS AND SYSTEMS FOR IMPROVED DRILLING OPERATIONS USING REAL-TIME AND HISTORICAL DRILLING DATA

CROSS-REFERENCE TO RELATED APPLICATIONS

This application is a continuation of application Ser. No. 13/665,202, filed Oct. 31, 2012, now pending. The patent application identified above is incorporated herein by reference in its entirety to provide continuity of disclosure.

FIELD OF THE INVENTION

The present invention relates to drilling operations, and more particularly, to methods and systems for improved drilling operations through the use of real-time and historical drilling data.

BACKGROUND OF THE INVENTION

Historically, drilling operations rely on "after-the-fact" analysis to determine lithology, as well as other parameters. For example, in order to determine lithology, drill bit cuttings are physically analyzed at the surface by the well site geologist, or to be certain of a formations' lithology, physical parameters and geological facies, 30 feet core sections or sidewall cores are taken and analyzed at the surface. In each of the above methods, samples must be physically removed from the formation and returned to the surface for evaluation.

In order to provide real-time operational data, in-situ tools are used. The most popular is spectral analysis of the formation being drilled. Spectral analysis involves the interpretation of spectra obtained from the formation drilled using logging tools including a passive gamma ray detector and a neutron induced gamma ray log. In the latter tool, a neutron source is placed alongside the formation and periodically emits bursts of high energy neutrons to excite the atoms in the formation. A detector records the number of counts of returning gamma rays and segregates them according to their energies. The major drawback of this method is the recorded neutron induced gamma ray spectrums which are contaminated by significant background noise due to Compton scattering. Hence, spectral analysis cannot determine lithology as precisely as coring-based techniques.

Measurement-while-drilling is a type of well logging that incorporates downhole tools providing real-time information to help with steering the bit. These tools typically include sensors for measuring downhole temperature and pressure, azimuth and inclination, drilling mechanics information (e.g. torque, weight-on-bit, rotary speed, etc.) and a resistivity to determine the presence of hydrocarbons and water.

As the hole drilling operation progresses, a drill bit gradually degrades until it breaks. Replacing a drill bit after it breaks can be costly because of debris left in the hole that will need to be cleaned out. At the same time, deciding to pull the bit early results in lower bit utilization, increased operating costs, and lower productivity due to frequent bit changes.

Accordingly, there remains a need for improvements in the art.

BRIEF SUMMARY OF THE INVENTION

The present application is directed generally to methods and systems for improved drilling operations using real-time and historical drilling data. This may include using measurements obtained using measurement-while-drilling technology to make a real-time bit wear prediction, lithology prediction, pore pressure estimation, rotating friction estimation, permeability estimation, and cost estimation. These predictions may be used to optimize weight on bit and bit rotation speed in an aim to obtain a maximized drilling rate and a minimized drilling cost. An expert decision engine may also be provided to guide the operator or user to avoid safety concerns while drilling.

According to an aspect of the present invention, there is provided a method of drilling a formation, comprising: acquiring real-time drilling data; acquiring a bit wear equation; determining a real-time bit wear prediction by using the real-time drilling data to predict a bit efficiency factor and to detect changes in the bit efficiency factor over time; determining a real-time lithology prediction by processing the real-time drilling data through a multilayer neural network; and adjusting the drilling parameters for the drilling operation in real-time based on the real-time bit wear prediction and the real-time lithology prediction.

According to a further aspect of the present invention, there is provided a drilling system including a drilling fusion prediction engine for predicting bit wear and lithology in real-time for use in determining drilling parameters in a drilling operation, the drilling system comprising: one or more sensors for sensing data at a rig during a drilling operation; a computer system including a drilling fusion prediction engine for predicting bit wear and lithology in real-time, the drilling fusion prediction engine configured to receive the sensed data, the drilling fusion prediction engine including a software module for predicting lithology in real-time by processing the sensed data through a multilayer neural network, the drilling fusion prediction engine including a software module for determining a real-time bit wear prediction by using the real-time drilling data to predict a bit efficiency factor and to detect changes in the bit efficiency factor over time; and a communication network for transmitting the sensed data to the drilling fusion prediction engine.

According to a further aspect of the present invention, there is provided a computer program product, the computer program product comprising: a storage medium configured to store computer readable instructions; the computer readable instructions including instructions for, acquiring real-time drilling data; acquiring cost data and a bit wear equation; determining a real-time bit wear prediction by using the real-time drilling data to predict a bit efficiency factor and to detect changes in the bit efficiency factor over time; determining a real-time lithology prediction by processing the real-time drilling data through a multilayer neural network; and adjusting the drilling parameters for the drilling operation in real-time based on the real-time bit wear prediction and the real-time lithology prediction.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the invention, and how they may be carried into effect, and in which:

FIG. 1a shows the system architecture of a drilling system employing the drilling fusion software in a standalone arrangement according to an embodiment of the present invention;

FIG. 1b shows the system architecture of a drilling system employing the drilling fusion software in a client-server arrangement according to an embodiment of the present invention;

FIG. 11b shows an intermediate d-exponent calculations for the formation pore pressure gradient (lbm/gal) estimation results for Well #1 within depth 2300 m-3200 m according to an embodiment of the present invention;

FIG. 12a shows a D-exponent pore pressure estimation results for Well #1 according to an embodiment of the present invention;

FIG. 12c shows a pore pressure (PP) estimation by linear regression for Well #1 according to an embodiment of the present invention;

FIG. 13a shows a D-exponent pore pressure estimation results for Well #2 according to an embodiment of the present invention;

FIG. 13b shows a pore pressure results for Well #2 according to an embodiment of the present invention;

FIG. 13c shows a pore pressure (PP) estimation by linear regression for Well #2 according to an embodiment of the present invention;

FIG. 14c shows a pore pressure (PP) estimation by linear regression for Well #3 according to an embodiment of the present invention;

FIG. 15a shows a trend fusion results of pore pressure estimation from Well #1 according to an embodiment of the present invention;

FIG. 15b shows a trend fusion results of pore pressure estimation from Well #2 according to an embodiment of the present invention;

FIG. 24b shows a front page summary of the tour sheet for Well #1 according to an embodiment of the present invention;

FIG. 24g shows calculations displayed to the user for kill sheet #2 according to an embodiment of the present invention;

FIG. 24h shows calculations displayed to the user for kill sheet #3 according to an embodiment of the present invention;

FIG. 24i shows calculations displayed to the user for kill sheet #4 according to an embodiment of the present invention;

FIG. 24j shows a copy of the bit record of Well #1 according to an embodiment of the present invention;

FIG. 24k shows a copy of the bit record of Well #2 according to an embodiment of the present invention;

FIG. 24l shows a copy of the bit record of Well #3 according to an embodiment of the present invention;

Like reference numerals indicate like or corresponding elements in the drawings.

DETAILED DESCRIPTION OF THE EMBODIMENTS

Figure 2A:
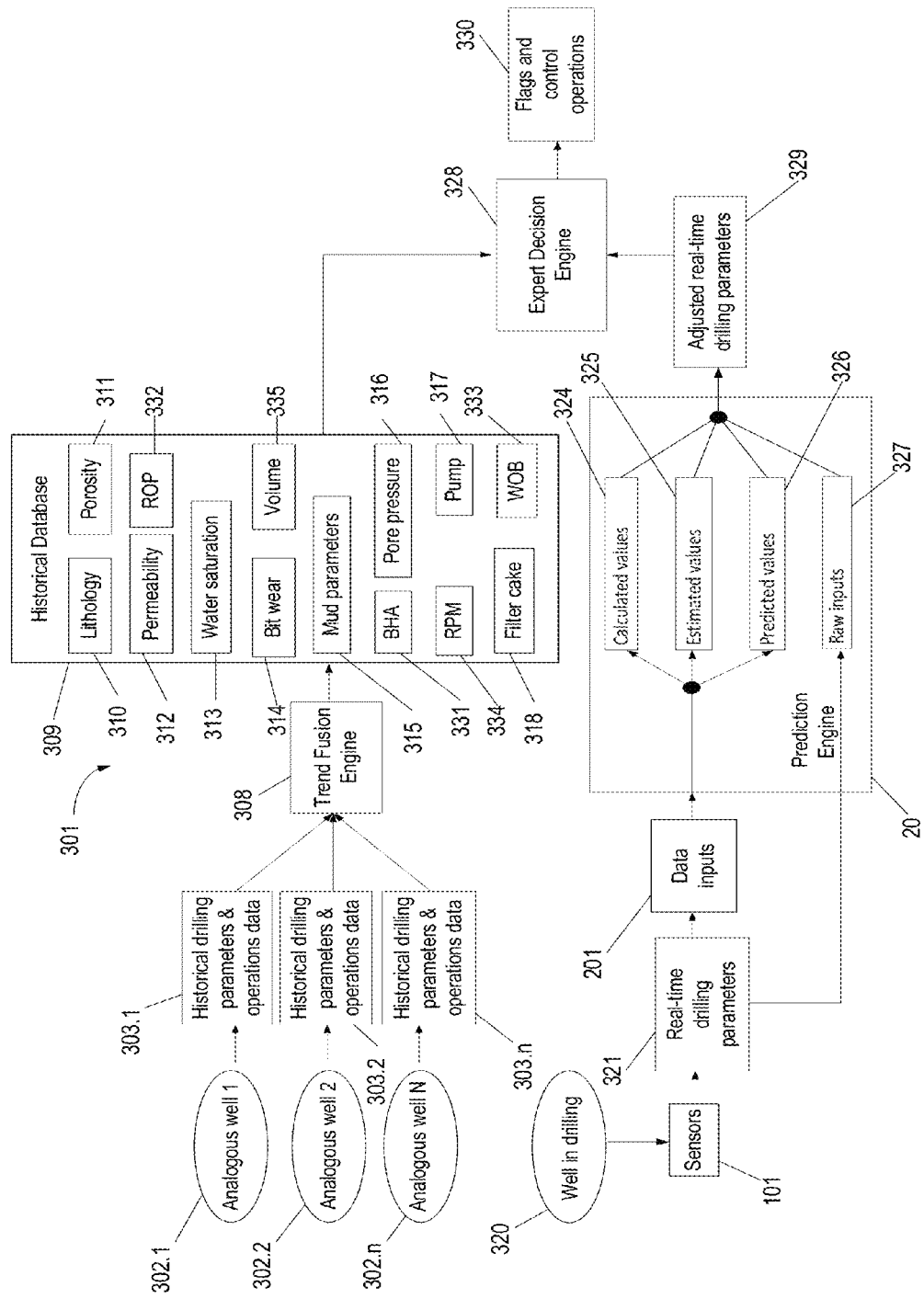
FIG. 2a is a flow diagram of the overall architecture of the drilling fusion engine according to an embodiment of the present invention.

Embodiments of the present invention are generally directed to methods and systems for improved drilling operations using real-time and historical drilling data.

Embodiments of the invention may be used by any persons or entities which control or conduct drilling operations, such as oil and gas exploration and production companies and oil and gas service companies or mining exploration companies, mining coring companies and mining service companies.

According to embodiments of the present invention, the method, system and computer program product, when deployed, may identify and predict geological and drilling events ahead of the drill bit, such that the user's drilling system may more precisely steer the wellbore while rotating the drill string or when using the mud motor to increase rate of penetration (ROP) and reduce drilling cost. In this regard, the present invention may incorporate the steps detailed below for bit wear prediction, lithology prediction, pore pressure estimation, rotating friction coefficient estimation, permeability estimation, and cost estimation using the real-time data collected by a variety of sensors, including logging tools, deployed at the well site. These predictions provide real-time estimates of the geological formation ahead of the drill bit which allow adjustment of drilling parameters as well as the drill bit itself which may reduce time and risk, and therefore cost, in drilling operations. These real-time predictions fused with trends determined from the historical geological knowledge base of the region may also permit use of an expert system engine as described below to warn of safety hazards or other issues of concern to the operator while drilling. By recognizing unsafe conditions in the wellbore before they cause serious consequences, the present invention may increase safety for well site personnel and may reduce or eliminate adverse impacts on the environment.

According to an embodiment, there is a drilling fusion engine (DFE) which may integrate drilling data in real-time from a rig site to inform adjustments to drilling parameters to improve the results of drilling operations (also referred to as "optimization"). This may include specific techniques that enable real-time drilling optimization: bit wear prediction, lithology prediction, pore pressure estimation, rotating friction coefficient estimation, permeability estimation, and cost estimation.

According to embodiments of the invention, software may be installed and used on site as a client-server application or a standalone computer program. The client-server application involves two subcomponents: 1) the client software with a graphical user interface to interact with the operator onsite; and 2) the server software running the engines described below, which may reside on a server computer onsite or offsite, such as in a remote data center or cloud infrastructure.

According to an embodiment as shown in FIG. 1a, which depicts the system architecture of a drilling system in the standalone arrangement, there is a drilling system 10 comprising a well being drilled 320. Sensors 101, such as through an electronic drilling recorder, such as the Pason™ EDR or the NOV M/D Totco™, or other logging tools, acquire data and the data is transmitted over a rig site network 103 to the DFA server software 106. According to an embodiment, historical database 309 may provide historical data obtained from analogous wells 302.1 to 302.n to the DFA server software 106.

According to an embodiment as shown in FIG. 1b, which depicts the system architecture of the drilling system in the client-server arrangement, sensors 101 acquire data, such as through an electronic drilling recorder or other logging tools, which is then communicated over a rig site network 103 to the DFA client software 108 to an operation center network 104 via a satellite 105. The received data is then communicated through the operation center network 104 to the DFA server software 106. It will be appreciated that the data may be communicated from the sensors 101 to the DFA client software 108 and the DFA server software 106 through various wired or wireless communication networks as appropriate according to other embodiments. According to an embodiment, historical database 309 may provide historical data obtained from analogous wells 302.1 to 302.n to the DFA server software 106.

Figure 2B:
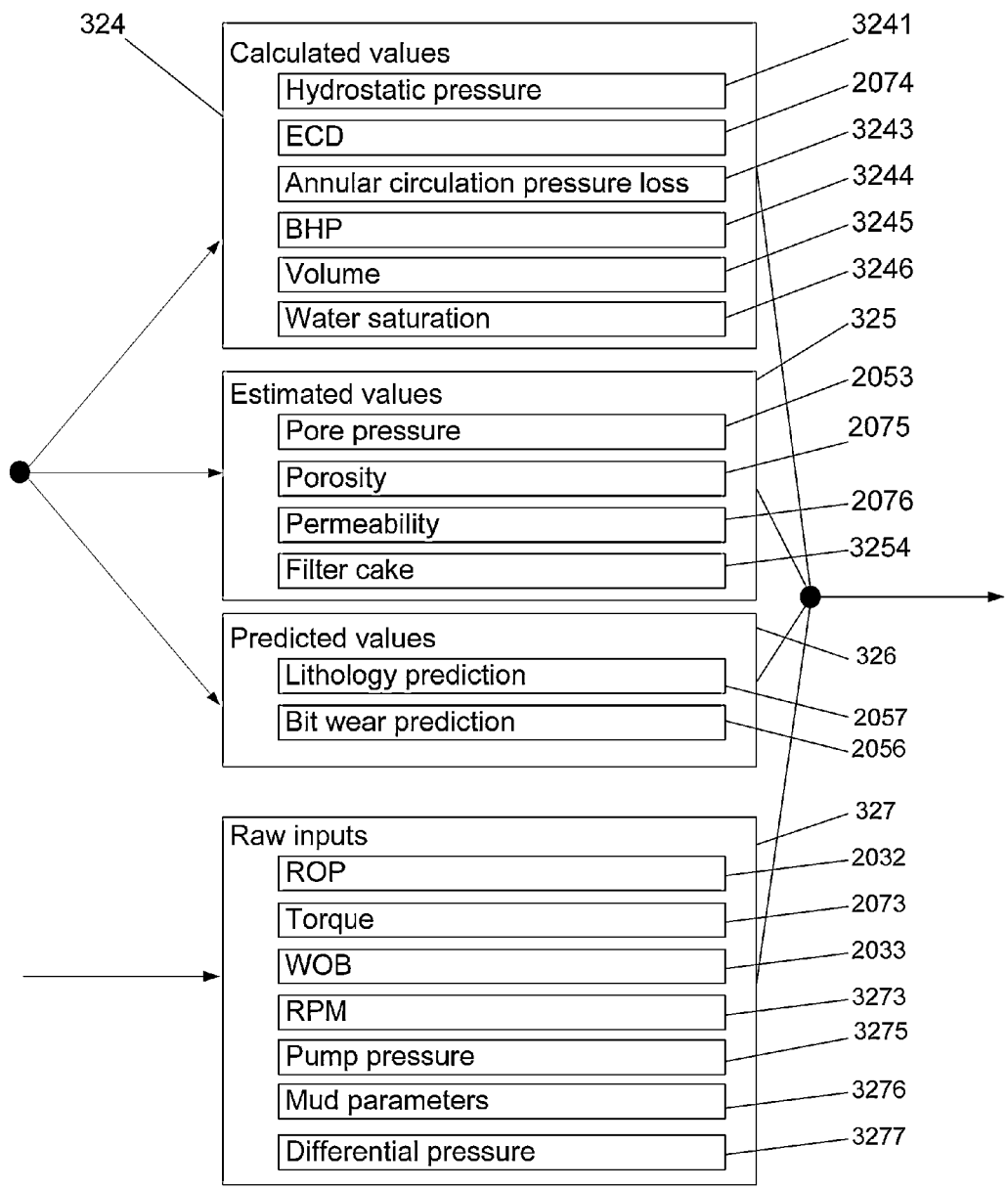
FIG. 2b shows the calculated values, estimated values, predicted values and raw inputs of the prediction engine shown in FIG. 2a according to an embodiment the present invention.

The overall drilling fusion engine architecture is shown according to an embodiment in FIGS. 2a and 2b. According to an embodiment, the drilling fusion engine 301 comprises three main engines: a drilling fusion prediction engine 20, a trend fusion engine 308 and an expert decision engine 328. According to an embodiment, the prediction engine 20 (which is shown in more detail in FIG. 3) may receive real-time drilling parameters 321 as data inputs 201 from sensors 101 at the well during drilling 320. Using the data inputs 201, the prediction engine 20 may calculate the following values 324: hydrostatic pressure 3241, ECD 2074, annular circulation pressure loss 3243, BHP 3244, volume 3245, and water saturation 3246. Using the data inputs 201, the prediction engine 20 may estimate the following values 325: pore pressure 2053, porosity 2075, permeability 2076, and filter cake 3254. Using the data inputs 201, the prediction engine may predict the following values 326: lithology prediction 2057 and bit wear prediction 2056. According to an embodiment, certain data inputs 201 may be as used as raw inputs 327 such as: ROP (rate of penetration) 2032, torque 2036, WOB (weight on bit) 2033, RPM (revolutions per minute) 3273, pump pressure 3275, mud parameters 3276 and differential pressure 3277. The calculated values 324, estimated values 325, predicted values 326 and raw inputs 327 may be used to determine adjusted real-time drilling parameters 329, which may employed in steering the drill bit during drilling or may be provided to an expert decision engine 328.

According to an embodiment as shown in FIG. 2a, the expert decision engine 328 may receive the adjusted real-time drilling parameters 329 and as well as analogous well data from a historical database 309, and use this information to generate flags and control operations 330 for well control which may generate prompts to the operator through the graphical user interface. Well control refers to the management of the dangerous effects caused by an unexpected influx of formation fluids (gas/oil/condensate) into the wellbore and hence potentially causing damage to personnel and surface equipment and into the nearby environment and atmosphere. Part of well control includes preventing formation fluid, referred to as kick, from entering into the wellbore during drilling. According to an embodiment, the drilling fusion engine 301 comprises monitoring a well for signs of impending influx in the formation being drilled in real time, and providing predictive capability for well control by combining real-time drilling data and trends in analogous well data into an expert knowledge system. The expert decision engine 328 may offer decision support towards potential safety issues during drilling and the associated operational suggestions to drilling engineers and geologists on the rig site or, according to an embodiment, be configured to interface with the drilling control system to automatically adjust drilling parameters to avoid well control hazards.

According to an embodiment, the trend fusion engine 308 may generate the analogous well data to populate the historical database 309. The trend fusion engine 308 may optimize the pore pressure estimation results by incorporating historical well data from multiple wells using trend analysis techniques, which may reduce uncertainties due to estimation errors in individual well data. Analogous wells 1 to n 302.1 to 302.n are selected by a user and the data related to the historical drilling parameters and operations 303.1 to 303.n from one or more past drilling jobs for each well are input or imported. As described further below, the trend fusion engine 308 may then generate expected analogous values for lithology 310, porosity 311, permeability 312, water saturation 313, bit wear 314, mud parameters 315, Bottom hole assembly (BHA) 331, pore pressure 316, Rate of Penetration (ROP) 332, Weight of Bit (WOB) 333, Revolutions per minute (RPM) 334, volume (mud tanks and hole volumes) 335, pump 317 and filter cake 318, and other parameters if the parameters are available in the historical data, based on the trends in the historical well data and, according to an embodiment, may also insert the current, real-time data into the historical database 309 for comparison.

Figure 3:
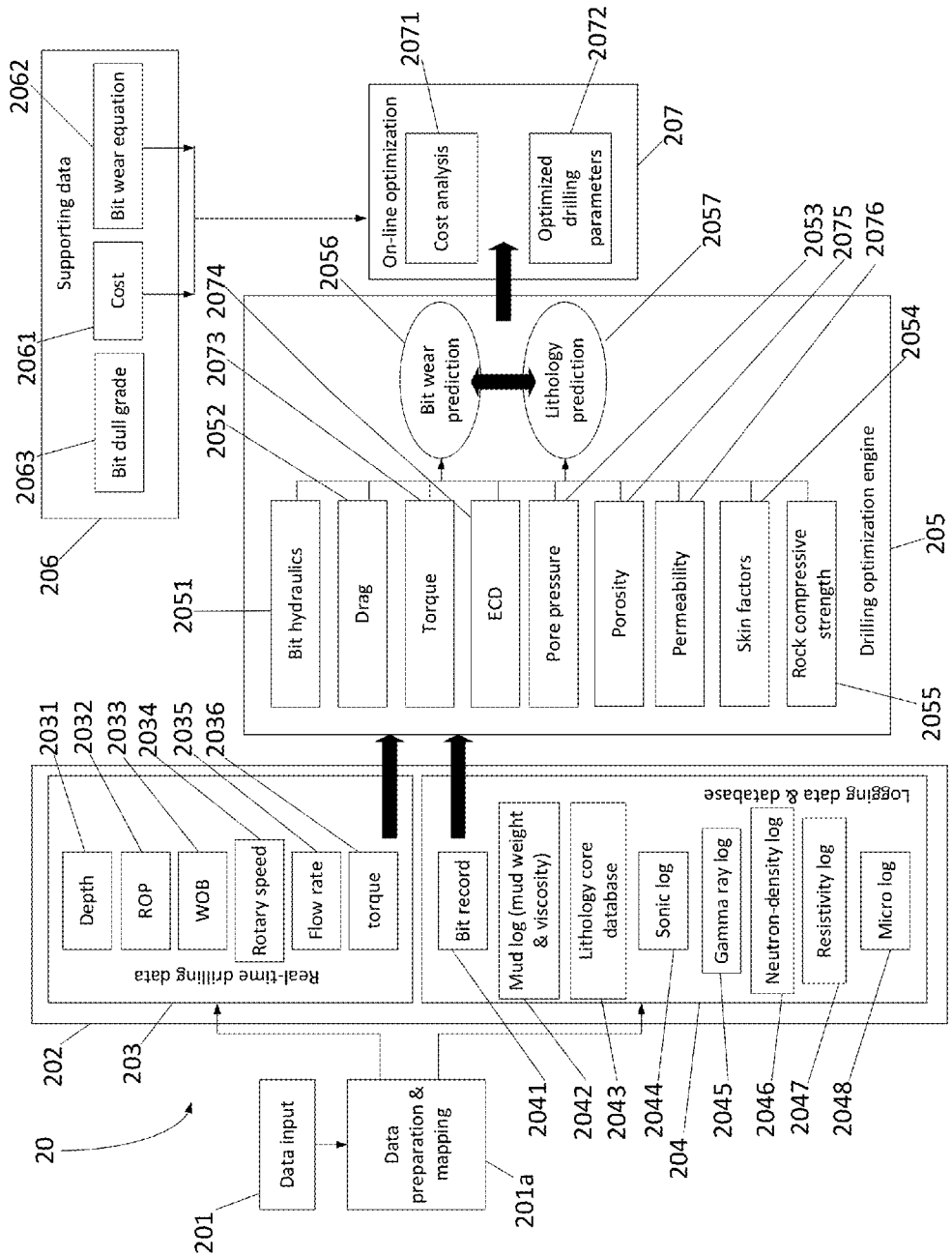
FIG. 3 is a flow chart of the prediction engine according to an embodiment of the present invention.

FIG. 3 shows a flow chart of a prediction engine 20 according to an embodiment of the invention. The data inputs 201 to the prediction engine 20 may be the real-time data received from the sensors 101 (e.g. MWD or logged data) as shown in FIG. 1. These data inputs are pre-processed and mapped by a data preparation and mapping component 201a. The data inputs 201 from sensors 101 may be pre-processed and mapped to the real-time drilling data fields 203 and logged data fields 204 in a database 202, such as a Microsoft SQL Server™ database or other object-based database. Since data sources may have different data formats, the data pre-processing and mapping includes converting the data to a unified format prior to importing the data into the database 202.

According to an embodiment, the prediction engine 20 may be implemented by a computer program which may receive various data inputs that may be converted to a unified format using a conversion program. Additionally, a unit conversion table needs to be established. For data mining and information processing tasks dealing with a huge amount of data, data processing may be carried out to prepare data for further processing. Such data processing tasks may include operations to replace missing data with default values, and to correct incorrect data inputs, for example, through time-based interpolation and to address non-registered multiple data sources, for example, through aligning the data with the same sampling rate or representing the same context. These data processing tasks may then output time or depth aligned data. According to an embodiment, this data may then also be fed into a data smoothing function to remove measurement noise in order to improve lithology prediction accuracy. One such data smoothing function is to use a moving average filtering technique. According to an embodiment, a depth-weighted smoother with a 1-meter window (e.g. the depth point has 0.2 m sampling frequency, 1 meter window corresponds to 5 data points). The weight assigned to each data point in each window is inversely proportional to the depth interval between it and the current point. For example, where the input of the smoother is the raw MWD data, x, the smoother output y will be $$y(0)=x(0)$$

$$y(1)=(x(0)+x(1))/2$$

$$y(2)=(x(0)+x(1)+x(2))/3$$

$$y(3)=(x(0)+x(1)+x(2)+x(3))/4$$

$$y(4)=(x(0)+x(1)+x(2)+x(3)+x(4))/5$$

$$y(5)=(x(1)+x(2)+x(3)+x(4)+x(5))/5$$

...

where x(0) denotes the first data point available for smoothing operation. The starting point of averaging for the current output is found in the fifth data ahead in this case.

Since the purpose of smoothing is to reduce the measurement noise while still preserving the underlying jumps or trends of the data, verification needs to be done by testing on the real drilling data. According to an embodiment, 1 meter (5 points) windows were appropriate in that it did not erase the trends but reduced the overall noise significantly.

As discussed above, according to an embodiment, the database 202 may include pre-processed and mapped real-time drilling data 203 and logged data 204. The real-time drilling data 203 may include one or more data inputs relating to depth 2031, Rate of Penetration (ROP) 2032, Weight On Bit (WOB) 2033, rotary speed 2034, flow rate 2035, and torque 2036, as shown in Table 1, below, according to an embodiment. The logged data 204 may include data inputs from a bit record 2041, mud log 2042, lithology core database 2043, sonic log 2044, gamma ray log 2045, neutron density log 2046, resistivity log 2047, and micro log 2048. The bit record 2041 may include a record of every bit run during an analogous drilling operation including bit size, IADC name and type, depth in and out, time in the hole, WOB, RPM, bit gauge, bit tooth wear, bearing wear, and total time in the hole, as shown in Tables 3 and 4, below, according to an embodiment. The mud log 2042 may include mud weight, mud viscosity, filter cake thickness, chemical usage, mud properties, information found on a daily drilling report, and solids content, as shown in Table 2, below, according to an embodiment. The lithology core database 2043 may include data relating to the formation geology such as depth, lithology type, permeability, porosity, water saturation, core length and core size, gross and net returns, facies, laboratory generated permeability, and fluid type associated with the formations cored. The sonic log 2044 may include formation lithology as derived from calculations of sonic wave returns, sonic or interval transit times, possible fracture size and orientations. The gamma ray log 2045 may include a measurement of gamma radiation: gamma ray, as shown in Table 5, below, according to an embodiment. The neutron density log 2046 may include measurements of caliper, compensated neutron porosity, compensated neutron porosity dolomite/limestone/sandstone matrix, photo electric cross section, bulk density, temperature, density porosity, and total gas, as shown in Table 5, below, according to an embodiment. The resistivity log 2047 may include measurements of shallow induction, medium induction, deep induction, and spontaneous potential, as shown in Table 5, below, according to an embodiment. The micro log 2048 may include measurements of micro normal and micro inverse, as shown in Table 5, below, according to an embodiment. As discussed elsewhere in this description, embodiments of the invention may operate in the absence of some or many of these parameters, if they are not available. Additional data, including other captured or logged data parameters, however, may improve the accuracy of the predictions made by the prediction engine 20 and the recommendations of the expert system engine 328.

The real-time drilling data 203 and the logged data 204 may be used to calculate the drilling bits hydraulics 2051, the drag 2052 and torque 2073, the ECD 2074 & pore pressure 2053, the porosity 2075, permeability 2076 and skin factors 2054, rock compressive strength 2055, bit wear prediction 2056 and lithology prediction 2057. For example, the mud log 2042 and bit record 2041 may be used in porosity 2075 and permeability 2076 estimation, and skin factor estimation 2054.

The real-time drilling data 203 and logged data 204 may be used by the drilling optimization engine 205 to generate optimized drilling parameters, i.e. those adjustments made to current drilling parameters intended to improve drilling results. According to an embodiment, supporting data 206, which may comprise bit dull grade 2063, cost information 2061, i.e. the cost of the bit, and a bit wear equation 2062 may be used to assist with optimizing drilling parameters with respect to bit wear replacement. Manufacturers of drilling software such as Wellman™ may provide supporting data 206 such as bit dull grade for each bit run and cost information. Bit manufacturer data may include equations and parameters to determine the bit tooth wear for the specific bit used in drilling. According to an embodiment, the supporting data 206 from the manufacturer may be imported into the computer program. The supporting data may then be used for the online optimization 207 of bit wear prediction and drilling costs analysis for generating the optimized drilling parameters 2072 and cost analysis 2071.

According to an embodiment, the lithology prediction 2057 may use neural networks to construct a non-linear map between the mechanical drilling data and the lithology types. The output of lithology types may be determined by the training data. Training data may be obtained from analogous wells. The input of the training process may be a vector of features extracted from the training data, and the output may be a vector of target lithology description. For example, if we have three lithology types (sandstone, siltstone and shale), the target output vector may be represented by

[1,0,0], [0,1,0], [0,0,1] for the sandstone, siltstone and shale, respectively. The prediction results will be the similar 3-element vector. With a hard decision of which value of the element is highest, we can determine the predicted lithology type. For example, if the neural network output is [0.9, 0.04, 0.01], then we may make a conclusion that the predicted lithology is sandstone.

According to an embodiment, online optimization may provide drilling parameters to be applied in drilling in real-time as well as associated analysis for drilling engineers. The parameters and analysis may include: the estimated cost for drilling under the current drilling conditions, and adjusted drilling parameters to maximize drilling efficiency while reducing cost, estimated depth or time to pull out the drill bit.

Sample data analysis and input data specifications are described according to an embodiment of the present invention. The sample data comprises three sets of well data that were collected for three S-curve wells. The sample data for analysis may be categorized into the following seven categories: Measurement While Drilling (MWD), an oilfield instrumentation and data acquisition systems Electronic Drilling Recorder (EDR), tour sheet, bit report, drilling software data, geological report, sidewall cores report, and LWD (logging while drilling) (neutron density, gamma ray, and resistivity).

According to an embodiment, the sample data comprises data from three sources: the oilfield instrumentation and data acquisition systems EDR, geological data and drilling software data. The sensors 101, such as those incorporated in the EDR, supplies well site data comprising real-time MWD data and logging data 204 such as, bit record 2041, mud log 2042, gamma ray log 2045, neutron density log 2046, resistivity log 2047 and micro log 2048 as shown, according to an embodiment, in Tables 1, 2, 3, and 5, below. As different EDRs and logging tools may provide different data, the list of parameters may be revised or expanded to match data capture capabilities. The drilling data may be downloaded as functions of either drill time or well depth. The geological data may comprise well path survey information, geological report data and petrophysical evaluation data. The drilling software data may comprise an integrated well life cycle report comprising geology, construction, drilling, and completion. Cost information may also be provided as set out in the Table 4. Other types and organizations of data may be provided as will be appreciated by those skilled in the art.

According to an embodiment as used with the sample data discussed herein, the following parameters may be used:

TABLE 1

Measurement-While-Drilling Data 203

| Parameters | Units |
|---|---|
| Depth 2031 | M |
| Rate of penetration 2032 | m/hr |
| On bottom ROP | m/hr |
| Rotary speed 2034 | Rpm |
| Weight on bit | kDaN |
| Pump rate | m$^3$/min |
| Rotary torque | Nm |
| Inclination | Degree |
| Azimuth | Degree |
| Differential pressure | kPa |
| Trip speed | m/min |
| Hook load | kDaN |
| Standpipe pressure | kPa |

TABLE 1-continued

Measurement-While-Drilling Data 203

| Parameters | Units |
|---|---|
| Total mud volume | m$^3$ |
| Casing pressure | kPa |
| Pump strokes | Strokes/min |
| Circulating hours | Hr |

According to an embodiment, the MWD data may be acquired at a data acquisition rate of up to 0.5 meters (depth-based) or 20 seconds (time-based) for the above parameters. Other data acquisition rates may be used beneficially in the discretion of the operator, subject to the capabilities of the particular EDR used at the rig site.

TABLE 2

Tour sheet

| Parameters | Units |
|---|---|
| Mud density | kg/m$^3$ |
| Mud type | N/A |
| Depth | m |
| Funnel viscosity | s/l |
| PVT | m$^3$ |
| Drilling assembly components (OD, ID, length, unit weight) | mm, mm, m, kg/m |
| Depth in/out | m/m |
| Pipe OD | mm |
| Hole size | mm |
| Number of jet nozzles | integer |
| Jet size | mm |
| Drill pipe (length, unit weight) | m, kg/m |
| Torque at bottom | Nm |
| Weight of Drill Collars | kDaN |
| Weight of string | kDaN |
| Deviation type | N/A |
| Deviation survey depth | m |
| Deviation | degree |
| Direction | degree |

TABLE 3

Bit record 2041

| Parameters | Units |
|---|---|
| Bit diameter | in |
| Bit manufacture | N/A |
| Bit type (IADC code) | N/A |
| Depth in/out | m |
| Accumulated running hours | hr |

TABLE 4

Drilling Software Data 206

| Parameters | Units |
|---|---|
| Bit dull grade 2063 | N/A |
| Cost 2061 | Dollar/hr |

Geological Report

The geological report may include the well summary, casing summary, daily drilling summary, bit record table, wireline logging summary, deviation/direction survey report, formation top summary, formation evaluations, and core sample descriptions. This report may be based on the information gathered from the geological descriptions and the wireline log analysis. This information may form part of the historical data from analogous wells.

Sidewall Cores Report

The sidewall cores report may comprise a parameter for irreducible water saturation for each formation (average value) (in fractional (%)).

TABLE 5

Logging-While-Drilling Data LWD (Neutron density log 2046, resistivity log 2047, gamma ray log 2045 and micro log 2048) and other wire line electrical logging tools.

| Parameters | Units |
|---|---|
| Caliper | mm |
| Compensated neutron porosity | pu |
| Borehole size corrected | pu |
| Compensated neutron porosity dolomite/limestone/sandstone matrix | pu |
| Gamma ray | gapi |
| Photo electric cross section | B/E |
| Bulk density | kgm$^3$ |
| Temperature | degree |
| Density porosity | Fractional |
| Total gas | Units |
| Shallow induction | Ohmm |
| Medium induction | Ohmm |
| Deep induction | Ohmm |
| Spontaneous potential | mv |
| Micro normal | Ohmm |
| Micro inverse | Ohmm |

According to an embodiment, the neutron-density log 2046 and gamma ray log 2045 may provide data at a data acquisition rate of 0.1 meters. Other data acquisition rates may be used beneficially in the discretion of the operator, subject to capabilities of the particular logging tools employed at the drilling site.

Based on the data input specifications, the availability of the data inputs 201 to be used in the prediction engine 20 may be checked and their status marked as (1) available, (2) available but needs to be calculated indirectly, and (3) not available. For the data inputs 201 available, the units and range of data used by each product and reporting standard may be recorded. The mud density information was not available from the EDR drilling data for the sample data provided herein, but it was available from the Electronic Tour Sheet (although the sampling frequency is much lower, i.e. up to 6 times per day, compared to other parameters, as low as 20 seconds per sample).

According to the embodiment used with the sample well data, the different formats of reports and data sheets were imported into a Matlab™ workspace. The Excel™ data was imported by a Matlab™ built-in method. The mud record 2200 was extracted from a ETS 3.0 tour sheet and converted to text format using a custom conversion program which written using the Java™ programming language. The .xsl style-sheet file was reprogrammed for Java™ and the bit record extracted and converted to .csv format. The drilling software database was also linked to Matlab™ and the parameters imported and saved to workspace. A unit conversion table was identified and a unit conversion function established in the Matlab™ program.

It was observed from the Tour Sheet that, for example, in the mud record, some data entries are empty and some are inputted incorrectly. Multiple data sources (i.e. Tour Sheet and other sources) have different sample rates, are either uniformly or non-uniformly sampled, are either time-stamped or depth-stamped, and these need to be aligned to form a unified data source. For example, a set of downhole mechanics measurements, e.g. ROP 2032, WOB 2033, torque 2036, rotary speed 2035, were collected at a specific depth. If any of these measurements are negative or a zero value, the set of measurements is identified as invalid data by data validation, and will be removed from processing. The remaining validated data may then be fed into a data smoothing function to remove noise.

Unit Conversion

The data inputs 201 may employ metric units by default. The system may also enable unit conversion between Metric and English (i.e. imperial) unit systems. Table 6 for the inputs and outputs of unit conversion between these two unit systems is provided below. The unit conversion may be carried out by establishing a data structure whose sub-fields are category, field, and conversion constant and loading the data structure into the software's graphical user interface.

TABLE 6

Inputs and outputs of unit conversion

| Parameters | Category | Field | Metric (I.S.) | Imperial | Conversion |
|---|---|---|---|---|---|
| Oilfield instrumentation and data acquisition systems EDR | | | | | |
| depth | length | METER2FEET | m | ft | 3.281 |
| rate of penetration | length | METER2FEET | m/hr | ft/hr | 3.281 |
| on bottom ROP | length | METER2FEET | m/hr | ft/hr | 3.281 |
| rotary speed | N/A | N/A | rpm | rpm | N/A |
| weight on bit | force | KDAN2LBF | kDaN | lbf | 2248.08943 |
| pump rate | volume | CUBMETER2BBL | m$^3$/min | bbl/min | 6.28981 |
| rotary torque | force | NM2LBFT | Nm | lb ft | 0.7375621 |
| Inclination | N/A | N/A | degree | degree | N/A |
| azimuth | N/A | N/A | degree | degree | N/A |
| differential pressure | pressure | KPA2PSI | kPa | psi | 0.145 |
| trip speed | length | METER2FEET | m/min | ft/min | 3.281 |
| hook load | force | KDAN2LBF | kDaN | lbf | 2248.08943 |
| standpipe pressure | pressure | KPA2PSI | kPa | psi | 0.145 |
| total mud volume | volume | CUBMETER2BBL | m$^3$ | bbl | 6.28981 |
| casing pressure | pressure | KPA2PSI | kPa | psi | 0.145 |
| pump strokes | N/A | N/A | strokes/min | strokes/min | N/A |
| circulating hours | N/A | N/A | hr | hr | N/A |
| Tour sheet | | | | | |
| mud density | density | KGPM32PPG | kg/m$^3$ | ppg | 0.01 |
| mud type | N/A | N/A | N/A | N/A | N/A |

TABLE 6-continued

Inputs and outputs of unit conversion

| Parameters | Category | Field | Metric (I.S.) | Imperial | Conversion |
|---|---|---|---|---|---|
| depth | length | METER2FEET | m | ft | 3.281 |
| funnel viscosity | viscosity | SPL2SPQ | secs/liter | secs/quart | 0.946 |
| PVT | volume | CUBMETER2BBL | m³ | bbl | 6.28981 |
| drilling assembly components (OD, ID, length, unit weight) | length | MILLIMETER2INCH METER2FEET | mm, mm, m, kg/m | In, in, ft, kg/ft | 0.03937 3.281 |
| depth in/out | length | METER2FEET | m/m | ft | 3.281 |
| pipe OD | length | MILLIMETER2INCH | mm | in | 0.03937 |
| hole size | length | MILLIMETER2INCH | mm | in | 0.03937 |
| number of jet nozzle | N/A | N/A | N/A | N/A | N/A |
| jet size | length | MILLIMETER2INCH | mm | in | 0.03937 |
| drill pipe (length, unit weight) | length | METER2FEET | m, kg/m | ft | 3.281 |
| torque at bottom | force | NM2LBFT | Nm | lb ft | 0.7375621 |
| weight of DC | force | KDAN2LBF | kDaN | lbf | 2248.08943 |
| weight of string | force | KDAN2LBF | kDaN | lbf | 2248.08943 |
| deviation type | N/A | N/A | N/A | N/A | N/A |
| deviation survey depth | length | METER2FEET | m | ft | 3.281 |
| deviation | N/A | N/A | degree | degree | N/A |
| direction | N/A | N/A | degree | degree | N/A |
| Bits | | | | | |
| bit diameter | length | MILLIMETER2INCH | mm | in | 0.03937 |
| bit manufacture | N/A | N/A | N/A | N/A | N/A |
| bit type (IADC code) | N/A | N/A | N/A | N/A | N/A |
| depth in/out | length | METER2FEET | m | ft | 3.281 |
| accumulated running hours | N/A | N/A | hr | hr | N/A |

Bit Wear Prediction

It is desirable to know the state of wear of a drill bit in use without having to remove it from the hole. Optimizing when to replace worn bits involves real-time estimation and prediction of the real-time state of bit wear which may assist deciding when to pull the drill bit and may lead to substantial cost savings. Observing a decrease in the ROP 2032 is, however, not sufficient information about the wear of a drill bit unless the strength of the rock penetrated is also known. In general, a decrease in ROP 2032 may be because the bit is worn, or the bit is balling (i.e., the bit is encased by an accumulation of sticky cuttings), or the bit is still in good condition but is simply penetrating a more resistant formation (i.e. the wrong bit is being used for the current formation).

According to an embodiment, the applied bit wear prediction 2056 may be based on the bit-rock interaction model developed in T. Richard and E. Detournay, "Influence of bit rock interaction on stick slip vibrations of PDC bits" *Society of Petroleum and Engineers*, Texas, October 2002, which is incorporated by reference herein. The model accounts for the cutting action of a single cutter and allows forces between the WOB 2033 and torque 2036 to be expressed without involving rock properties. When bit efficiency decreases, the coefficients which characterize these relationships will change. According to an embodiment, the present invention may monitor these coefficients and detect their variations on a real-time basis. The cutting action of each cutter is represented by two independent processes, namely, the cutting process and the friction process. The forces torque, T, and WOB, w, are defined by:

$$T = T_c + T_f$$

$$W = W_c + W_f$$

where $$T_c = \frac{1}{2}\varepsilon a^2 d$$

$$W_c = \xi \varepsilon a d$$

$$T_f = \frac{1}{2}\mu a \gamma W_f$$

$$d = \frac{2\pi R}{\Omega}$$

a: bit radius (m)
d: depth of cut (m)
γ: bit shape factor (dimensionless)
ξ: cutting force coefficient (dimensionless)
ε: intrinsic specific energy (Mpa)
μ: friction coefficient (fractional)
R: ROP (m/hr)
Ω: bit angular velocity (rad/sec)

The subscripts c and f denote cutting and friction, respectively. The response of the bit is obtained by combining the cutting and friction processes:

$$\frac{2T}{a^2d} = (1-\beta)\varepsilon + \mu\gamma\frac{W}{ad},$$

where $\beta=\mu\gamma\xi$

From the above description, the specific energy which corresponds to the necessary energy to grind a given volume of rock is defined by:

$$E=E_0+\mu\gamma S$$

where $E_0=(1-\beta)\epsilon$ $$E = \frac{T}{a^2d}, \text{ specific energy } (Mpa)$$

$$S = \frac{W}{ad}, \text{ drilling strength } (Mpa)$$

The above relationship shows that the slope of E as a function of S is only dependent on the bit shape factor and the friction coefficient. The rock properties are not involved. When a change occurs on the bit wear, these two parameters will be affected. Consequently, the bit wear prediction 2056 may be based on the detection of a change in $\mu$ and $\gamma$, which leads to the change in the slope of E as a linear function of S. If we define the product of $\mu\gamma$ as a bit efficiency factor (BEF), the problem of bit wear prediction 2056 becomes a prediction of BEF using the measurements of the specific energy and the drilling strength.

A Rao-Blackwellised Particle Filter (RBPF) approach as described, for example, in Arnaud, E. and Memin, E., "An efficient Rao-Blackwellized particle filter for object tracking," in *IEEE International Conference on Image Processing*, 2005. ICIP 2005, vol. 2, 2005, II, incorporated by reference herein, may be applied to detect the change in BEF. The RBPF approach is based on combining two functional modes, one of them corresponding to the levels of BEF and the other corresponding to the bit-rock interaction with respect to each level of BEF. Each of the defined functional modes is modeled by a state space system. The RBPF comes from the possibility of combining the features of Kalman filters (KF) and those provided by the particle filters (PF). The role of KF is to treat each of the defined state space representations and PF is used to select the one to be treated. Using RBPF, the underlying objective is achieved by two parallel linear regressions obtained by using RBPF and the prediction is made when the process model moves from the model which corresponds to the process when the BEF changes.

For example, if the mode levels are set from 0 to 8, there will be 9 state-space models in total, and the RBPF algorithm may produce an estimate of all 9 models simultaneously and select one winning model and its corresponding mode level. If the winning model at time T comes from the mode level 3, then the prediction at time T for the bit wear is 3. The bit wear may have a variation trend from mode level 0 to BEF level 8, so that any change of the winning model will reflect the worn bit.

Figure 4:
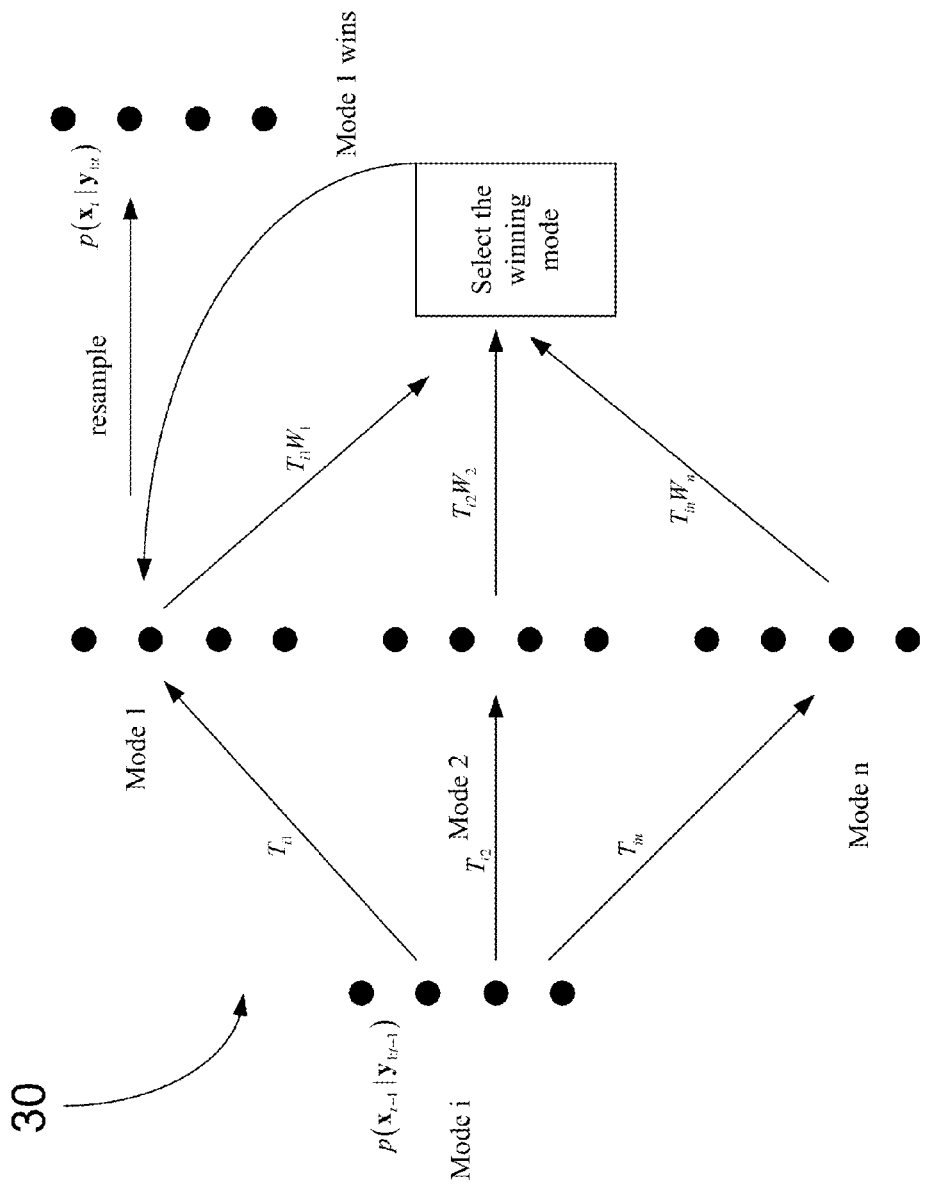
FIG. 4 is a schematic representation of mode selection used in the prediction engine according to an embodiment of the present invention.

When a system is in a mode $\lambda$, its behavior is given by the following state-space model:

$$\begin{cases} x_t = f_\lambda(x_{t-1}, t) + v_t, & \text{for } t \geq 1 \\ y_t = g_\lambda(x_t, t) + w_t, & \text{for } t \geq 1 \end{cases}$$

where $x_t \in X$ is the unobserved n-dimensional state vector at time t, $x_0$ is the initial condition, $y_t \in Y$ is the m-dimensional observation vector at time t, $f_\lambda \in F$ is the state function vector in mode $\lambda$, $g_\lambda \in G$ is the observation function vector in mode $\lambda$, and $v_t$ and $w_t$ are independent, identically distributed random noise sequence vectors which can be functions of mode $\lambda$. $v_t$ and $w_t$ are mutually independent and also independent of the initial state of the system. $f_\lambda$ is referred to as the system model and can be non-linear and non-Gaussian. According to an embodiment, for bit wear prediction, it is linear. Then the mode selection of RBPF from S. Tafazoli, et al., "Hybrid system state tracking and fault detection using particle filters", *IEEE Transaction on Control Systems Technology*, vol. 14, no. 6, pp. 1078-1087, November 2006, incorporated by reference herein, may be applied as follows and its graphic illustration is shown in FIG. 4, which shows a mode selection used in the prediction engine 30:

Step 1 Initialization: The mode at time t=0 is given as $\lambda_0$. For i=1, ..., N, sample $x_0^{(i)}$ from an initial distribution in mode $\lambda_0$ and set t=1.

Step 2 Prediction: For any mode $\lambda_t^j$ such that the transition probability $T_{\lambda_{t-1}, \lambda_t^j}$ from mode $\lambda_{t-1}$ to $\lambda_t^j$ is not zero (j= 1, ..., K) where K is the number of such modes, sample $\tilde{x}_t^{(i)} \sim p_{\lambda_t^j}(X_t | X_{t-1}^{(i)})$ for i=1, ..., N; For each mode $\lambda_t^j$, evaluate the importance weights $\tilde{\omega}_t^{(i)} = p_{\lambda_t^j}(y_t | \tilde{x}_t^{(i)})$, for i=1, ..., N.

Step 3 Mode selection: Average the total particles weights in each mode $\lambda_t^j$ and multiply by the transition probability:

$$\tilde{\omega}_t^{\lambda_t^j} = T_{\lambda_{t-1}, \lambda_t^j} \sum_{i=1}^{N} \tilde{\omega}_t^{(i)} / N;$$

Find the most likely mode:

$$\lambda_t = \underset{\lambda_t^j}{\operatorname{argmax}}\left\{\tilde{\omega}_t^{\lambda_t^j} : \text{ for all } \lambda_t^j, j=1, \ldots, K\right\};$$

Normalize the weights of particles in mode $\lambda_t$.

Step 4 Resampling: Resample N new particles $\{x_t^{(i)},$ for i=1, ..., N$\}$ with replacement from the particles in mode $\lambda_t$, $\{\tilde{x}_t^{(i)},$ for i=1, ..., N$\}$, according to the importance weights. Set t=t+1 and go to step 2.

Figure 5:
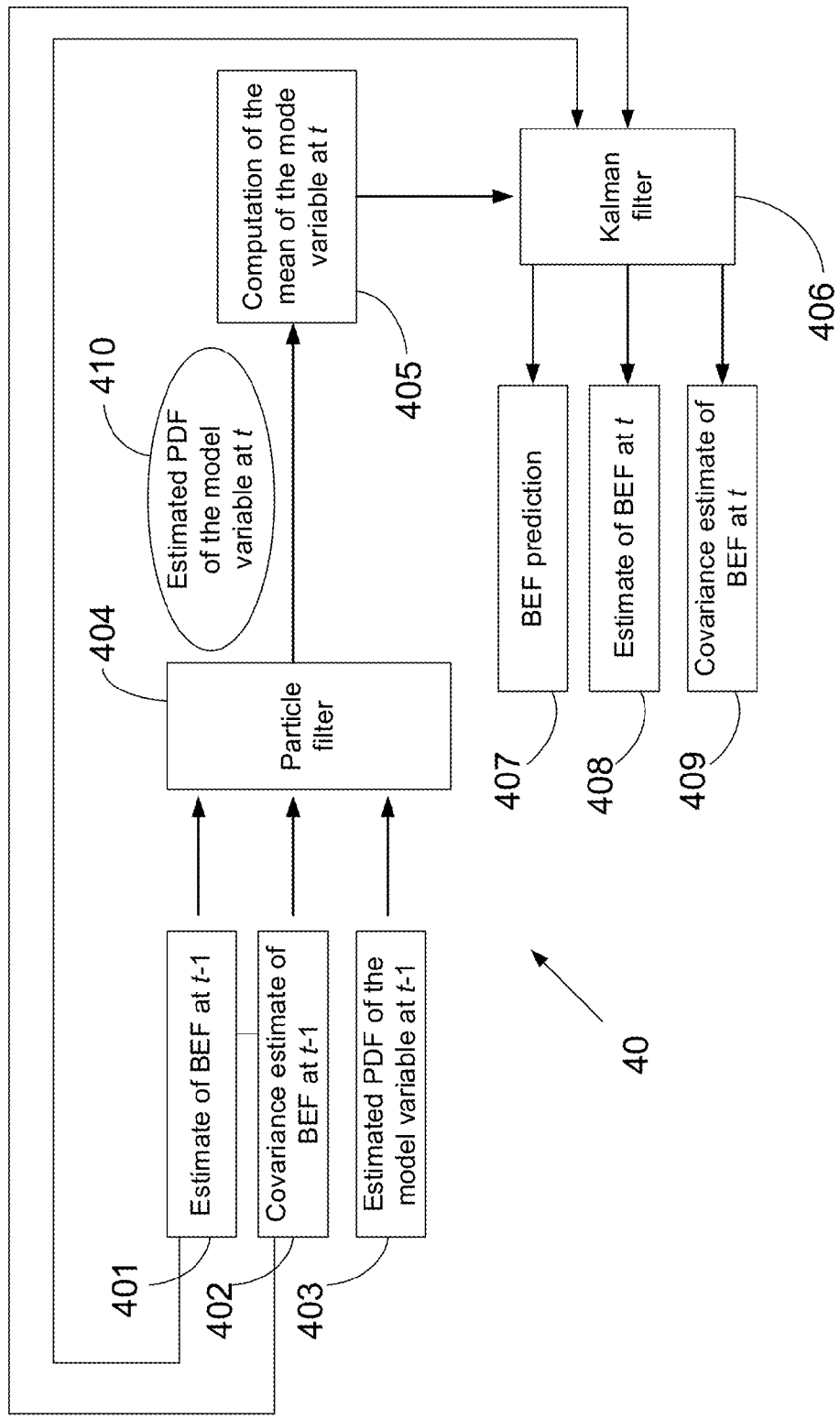
FIG. 5 is a block diagram of bit wear prediction according to an embodiment of the present invention.

According to an embodiment of the bit wear prediction method, the level of bit wear (i.e., the mode) may be assumed to vary from 1 to K. According to an embodiment, there may be a specific measurement function corresponding to each mode. In other words, the measurement function is not only a function of BEF, but also the mode variable, which defines the measurement model. At the same time, it is assumed that BEF evolves with time. Based on the above assumptions, the bit wear prediction 2056 may be developed according to the block diagram 40 shown in FIG. 5. At the time instant t, the inputs are the estimate of BEF at t−1 401, the covariance estimate of BEF at t−1 402, and the estimated probability density function (PDF) of the mode variable at the time instant t−1 403. These variables may be input into a RBPF particle filter 404 to compute the estimated PDF of the mode variable at the time t 410 by the mode selection scheme proposed above. Based on the estimated PDF of the mode variable 410, computation of the mean of the mode variable at t 405 is performed. This mean value along with the estimate of BEF at t−1 401 and the covariance estimate of BEF at t−1 402 is input into a Kalman filter (KF) 406. The prediction step of KF 406 yields the BEF prediction 407 and the update step of KF 406 produces the estimate of BEF at t 408 and the covariance estimate of BEF at t 409. The mode variable is the value of interest. The mathematical description of this embodiment is as follows.

Given an importance distribution $\pi(\lambda_t | \lambda_{1:t-1}^{(i)}, y_{1:t})$, set of particles $\{w_{t-1}^{(i)}, \lambda_{t-1}^{(i)}, m_{t-1}^{(i)}, P_{t-1}^{(i)}, i=1, \ldots, N\}$, and measurement $y_t$, the set of particles $\{w_t^{(i)}, \lambda_t^{(i)}, m_t^{(i)}, P_t^{(i)}, i=1, \ldots, N\}$ is processed as follows:

Perform KF predictions for the means $m_{t-1}^{(i)}$ and the covariance $P_{t-1}^{(i)}$ of particles, $i=1, \ldots, N$ conditioned on the previously drawn mode variable $\lambda_{t-1}^{(i)}$ as $$m_t^{-(i)} = A_{t-1}(\lambda_{t-1}^{(i)}) m_{t-1}^{(i)},$$

$$P_t^{-(i)} = A_{t-1}(\lambda_{t-1}^{(i)}) P_{t-1}^{-(i)} A_{t-1}^T(\lambda_{t-1}^{(i)}) + Q_{t-1}(\lambda_{t-1}^{(i)}).$$

Draw new mode variables $\lambda_t^{(i)}$ for each particle in $i = 1, \ldots, N$ from the corresponding importance distributions $\lambda_t^{(i)} \sim \pi(\lambda_t | \lambda_{1:t-1}^{(i)}, y_{1:t})$.

Calculate new weights as follows:

$$w_t^{*(i)} \propto w_{t-1}^{*(i)} \frac{p(y_t | \lambda_{1:t}^{(i)}, y_{1:t-1}) p(\lambda_t^{(i)} | \lambda_{t-1}^{(i)})}{\pi(\lambda_t^{(i)} | \lambda_{1:t-1}^{(i)}, y_{1:t})},$$

where the likelihood term is the marginal measurement likelihood of the KF $$p(y_t | \lambda_{1:t}^{(i)}, y_{1:t-1}) = N(y_t | H_t(\lambda_t^{(i)}) m_t^{-(i)}, H_t(\lambda_t^{(i)}) P_t^{-(i)} H_t^T(\lambda_t^{(i)}) + R_t(\lambda_t^{(i)})),$$

such that the model parameters in KF are conditioned on the drawn mode variable $\lambda_t^{(i)}$.

Normalize the weights to sum to unity as $$w_t^{(i)} = \frac{w_t^{*(i)}}{\sum_{j=1}^{N} w_t^{*(i)}}.$$

Perform KF updates for each of the particles conditioned on the drawn mode variable $\lambda_t^{(i)}$:

$$v_t^{(i)} = y_t - H_t(\lambda_t^{(i)}) m_t^{-(i)},$$

$$S_t^{(i)} = H_t(\lambda_t^{(i)}) P_t^{-(i)} H_t^T(\lambda_t^{(i)}) + R_t(\lambda_t^{(i)}),$$

$$K_t^{(i)} = P_t^{-(i)} H_t^T(\lambda_t^{(i)}) S_t^{(i)-1},$$

$$m_t^{(i)} = m_t^{-(i)} + K_t^{(i)} v_t^{(i)},$$

$$P_t^{(i)} = P_t^{-(i)} - K_t^{(i)} S_t^{(i)} [K_t^{(i)}]^T.$$

If the effective number of particles is too low, perform resampling. After the set of particles have been acquired, the filtering distribution can be approximated as:

$$p(x_t, \lambda_t | y_{1:t}) \approx \sum_{i=1}^{N} w_t^{(i)} \delta(\lambda_t - \lambda_t^{(i)}) N(x_t | m_t^{(i)}, P_t^{(i)})$$

Figure 6:
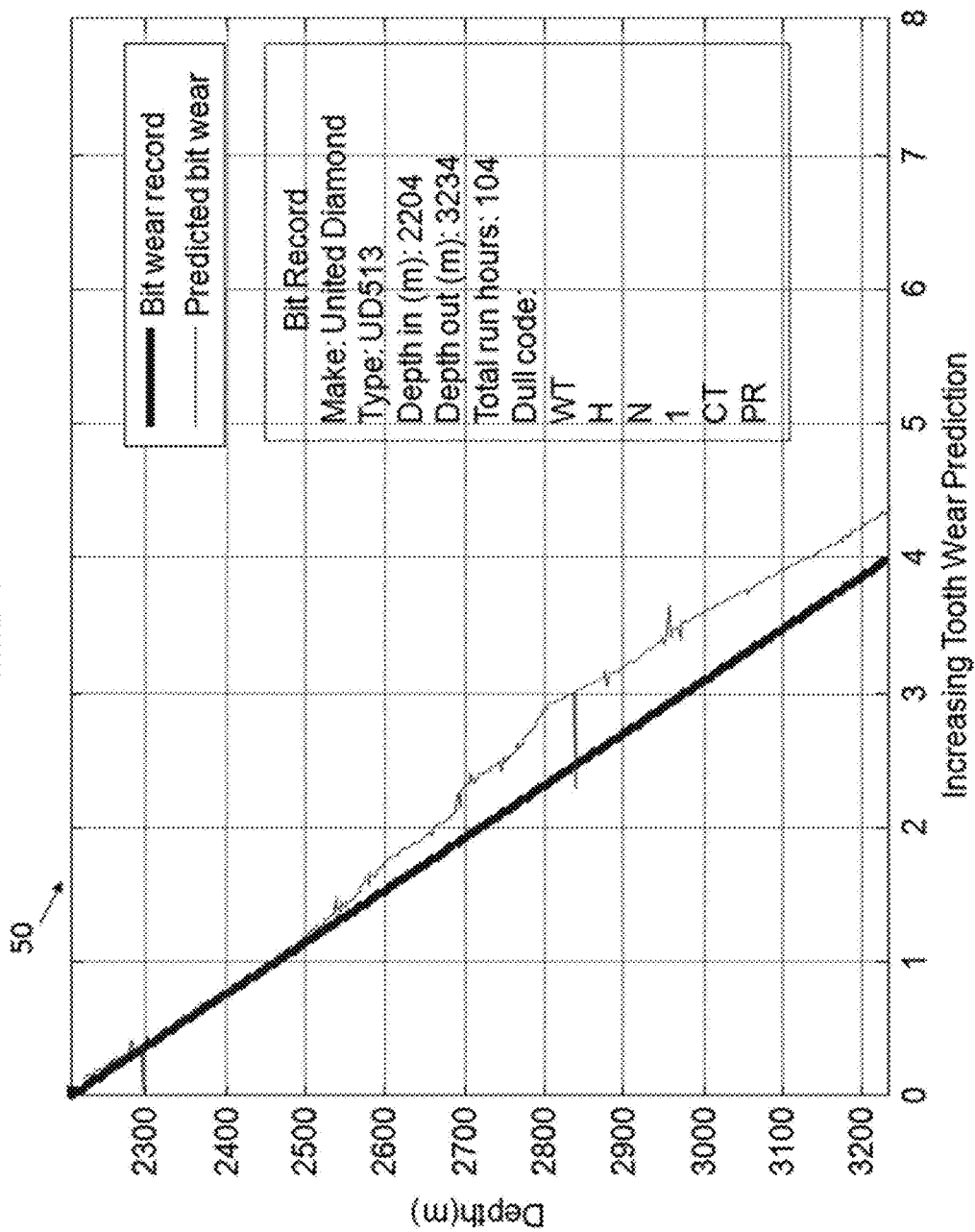
FIG. 6 is a graphical diagram depicting the bit wear prediction results for bit #7 from Well #2 according to an embodiment of the present invention.

According to an embodiment, the results from the bit record 2041 for bit #7 from Well #1 were input for prediction and FIG. 6 displays the bit wear prediction results 50 for bit #7 from Well #1.

Complementary information may also be displayed to the user or otherwise provided from the historical bit data of the analogous wells showing what bit was used most often in other wells around the current well being drilled, the depth at which the bit was pulled, its dull coding when it was pulled, and the time the bit spent at the bottom of the well. An example of complementary information for analogous Well #2 and Well #3 is shown in Table 7. This information may be part of the bit record 2041 and used in bit wear prediction 2056 to enhance the cost optimization of bit replacement.

TABLE 7

Complementary information for analogous Well #2 and Well #3

| Well | Make | Type | Depth in (m) | Depth out (m) | Total run hrs | Total run depth (m) | Dull code | | | | | | | |
|------|------|------|--------------|---------------|---------------|---------------------|-----------|---|---|---|---|---|---|---|
| | | | | | | | I | O | D | L | B | G | O2A | RP |
| #2 | REED | MSF513M | 3242 | 3271 | 8.25 | 29 | 2 | 2 | CC | M | X | 156 | PN | PR |
| #3 | SHEAR | SH416 | 2300 | 3390 | 75.25 | 1090 | 1 | 3 | WT | H | NO | IN | CT | PR |

Lithology Prediction

Neural networks may be used to establish complicated non-linear mapping between inputs and outputs. The relationship between formation lithology types and real-time drilling data is usually non-linear. In practice, it is difficult to obtain a well-defined relationship between drilling data and lithology type in an exact mathematical format. Using a neural network approach avoids an exact mathematical modelling of this relationship, and instead non-linear mapping is established using a neural network. Training data may be applied to fine tune the network parameters in order to obtain one which is closest to the real world. For the underlying lithology prediction problem, a multilayer neural network may be established to represent the mapping between the real-time drilling data and the lithology class.

Features are calculated values based on data inputs. According to an embodiment, the features may be rock compressive strength, formation drillability coefficient, dynamic drilling response, and formation shear strength. Feature extraction (the calculation process) may be a factor in the prediction performance of neural networks. Poorly selected features may deteriorate the network performance and thus may result in significant errors during prediction. The features should be selected to best represent the input of the non-linear mapping with less dimension, noise and redundancy. One may choose measurements which may better reflect the rock properties as input features, for instance, the rock strength. Rock properties may be inferred from two different sources: from elastic parameters via the seismic amplitude versus offset (AVO) data, and indirectly from mechanical drilling data by rock-bit interactive formulations. According to an embodiment, if seismic AVO data is not captured, mechanical drilling data may be used to form a set of features for the neural network. According to a further embodiment, if seismic AVO data is captured, additional information about the geology of the well to be drilled may be available, and features for seismic elastic parameters, including P-wave velocity, S-wave velocity, and density may also be included.

According to an embodiment, the mechanical measurements may include ROP 2032, WOB 2033, torque 2036, and rotary speed 2034 such as shown in real-time drilling data 203 in FIG. 3. Other information may include mud density and bit size. The raw data may be pre-processed as discussed above. After pre-processing, four features may be calculated at each point of drilling depth.

Rock confined compressive strength (CCS) 2055

$$CCS = C_b * \ln\left\{\frac{36T/(D_B * W)}{a_1 * [a_2 * \ln(M) + a_3]}\right\}(psi),$$

where T: rotary torque (ft-lbf)
$D_B$: bit size (inches)
M: mud density (ppg)
W: WOB (lb)

CCS is normalized with respect to a mud density of 9.5 ppg. $a_1$, $a_2$, $a_3$ are dimensionless correction factors determined by the laboratory experiments which may be used to estimate CCS at any mud density value.

$C_b$: a bit-related constant. For a PDC bit, $C_b=-0.125*10^6$.

Formation drillability coefficient (FDC)

$$FDC = \frac{R \cdot D_B}{W \cdot N}$$

R: ROP (ft/hr)
N: rotary speed (rpm)

Dynamic drilling response (DDR)

$$DDR = \frac{T \cdot R}{W^2 \cdot N}$$

Formation shear strength (FSS)

$$FSS = \frac{T \cdot N}{R \cdot D_B^2}$$

The use of neural networks for lithology prediction 2057 may be advantageous due to certain properties of neural networks, including learning by experience (neural network training), the ability to generalize (map similar inputs to similar outputs), and their robustness in the presence of noise and multivariable capabilities, which allows them to deal with the highly complex and uncertain problem of lithology determination. The basic processing element of neural networks is called a neuron.

Figure 7:
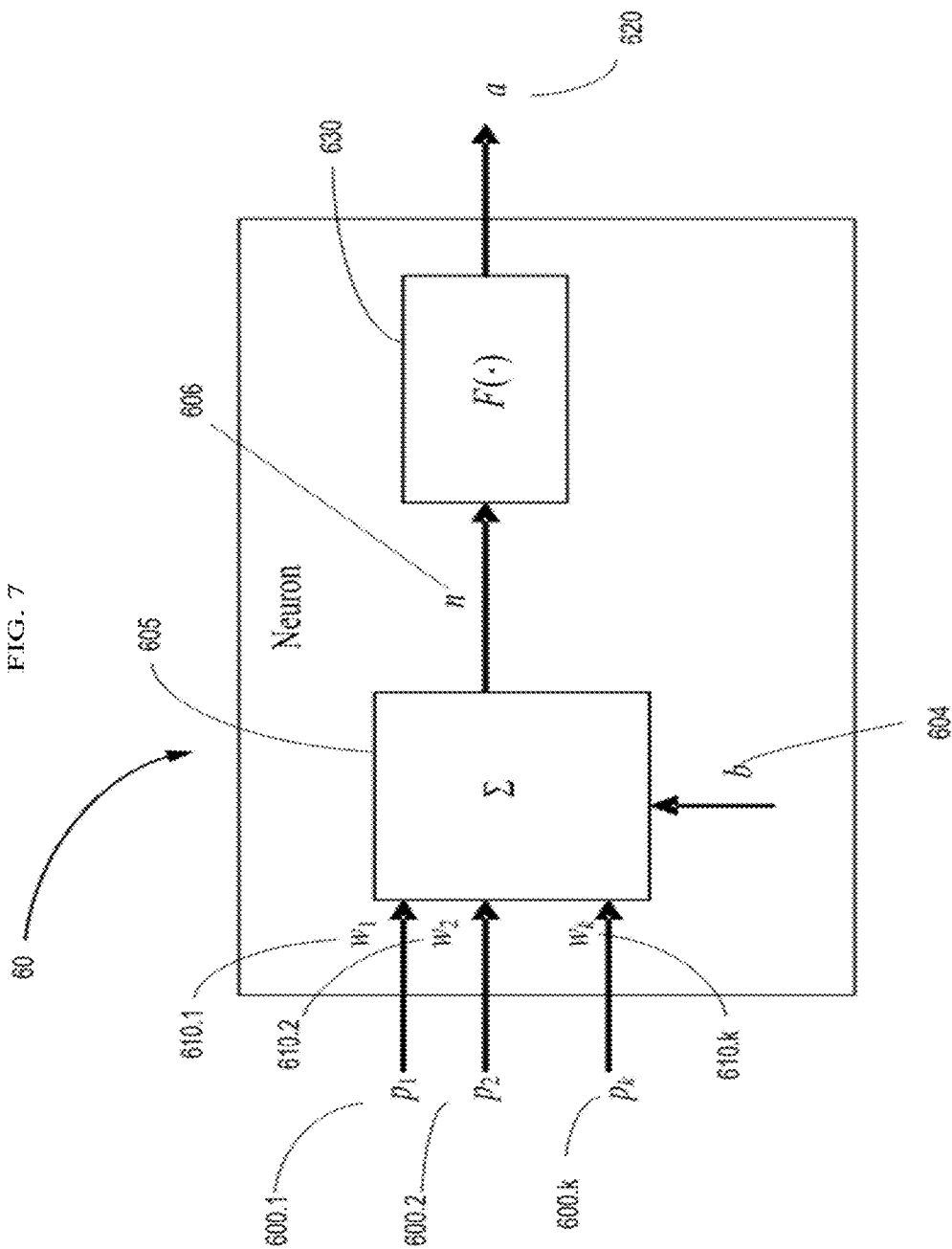
FIG. 7 is a block diagram of a neuron according to an embodiment of the present invention.
Figure 8:
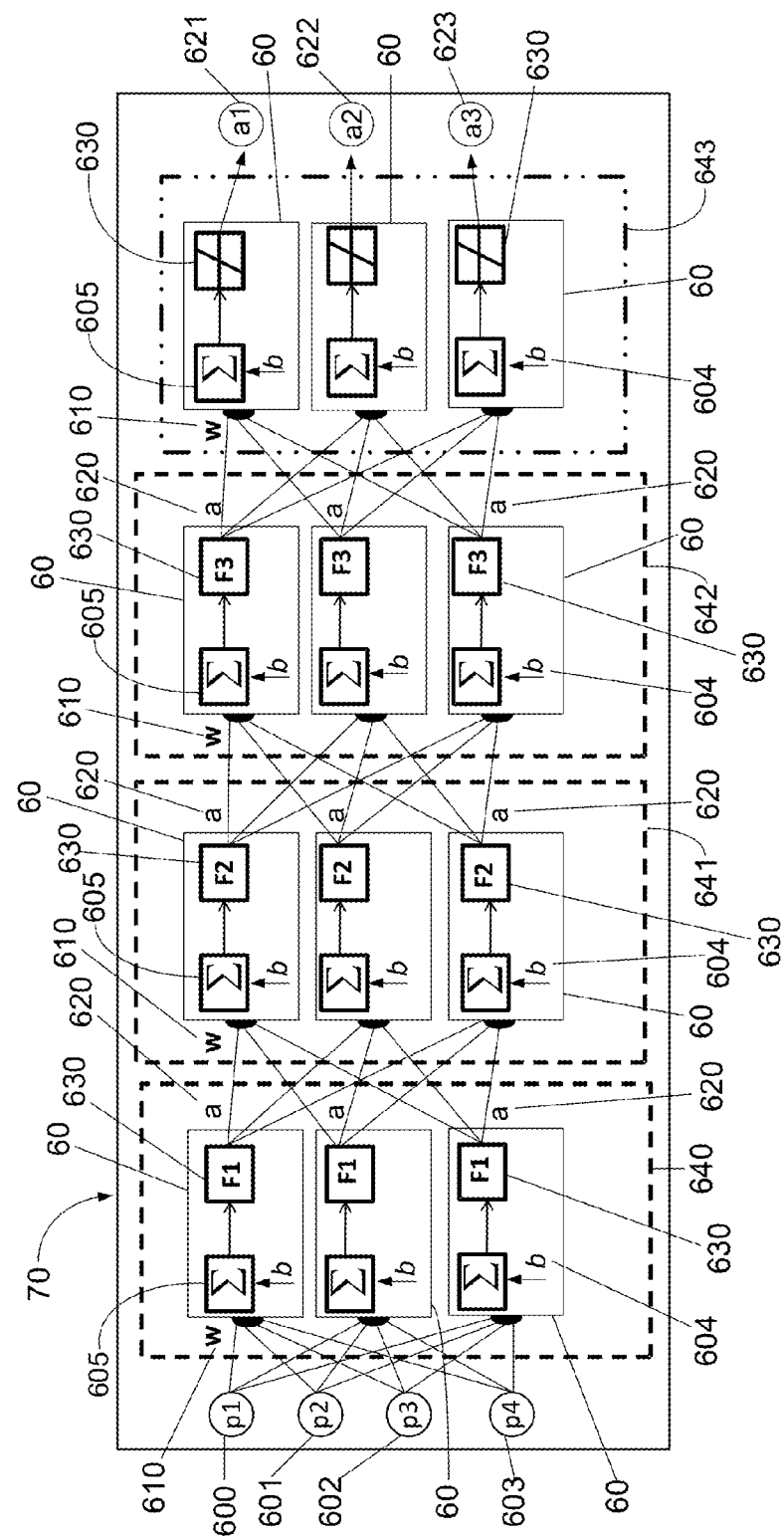
FIG. 8 is a schematic diagram depicting a multilayer neural network for lithology determination according to an embodiment of the present invention.

FIG. 7 displays a block diagram of a neuron 60. Each neuron has multiple inputs $p_1, p_2, \ldots, p_k$ 600.1, 600.2, ... 600.k where k is limited only by desired number of features and the available computing processing power, and a single output a 620. Each time a neuron is supplied with the input 600.1, 600.2, ... 600.k, it computes the net input n 606 through the function $\Sigma$ 605. The net input n 606 is passed through the activation function F(•) 630, which may be either linear or non-linear, producing the neuron output a 620. $w_1, w_2, \ldots, w_k$ 610.1, 610.2, ... 610. k are neuron weights, and b 604 is a neuron bias. The equation for the neuron output may be represented as follows: $a=F(w^T p+b)$ According to an embodiment as shown in FIG. 8, the neural network 70 may have multiple layers 640, 641, 642, and 643. Two or more of the neurons 60 described above may be combined in a layer. The neural network 70 may be supplied with inputs p1 600, p2 601, p3 602, and p4 603. The number of inputs in a layer need not equal the number of neurons in a layer. Each layer has a weight matrix w 610, a bias vector b 604, a function $\Sigma$ 605, an activation function $F_n$ 630 and an output vector a 620. The output vector a 620 from each intermediate layer is the input to the following layer. The layers in a multilayer network 70 play different roles. A layer that produces the network outputs a1 621, a2 622, a3 623 is an output layer 643. The other layers are hidden layers 640, 641, 642. The neural network 70 shown in FIG. 7, for example, has one output 643 layer and three hidden layers 640, 641, 642.

According to an embodiment, training procedures may be applied once topology and activation functions are defined. The activation function may be selected from the pure linear, log-sigmoid, tangent sigmoid, etc. In supervised learning, a set of input data and correct output data (i.e. lithology type data) may be used to train the network. The network, using the set of training input, produces its own output. This output may be compared with the targeted output (the known lithology type) and the differences are used to modify the weights and biases. Methods of deriving the changes that might be made in a neural network or a procedure for modifying the weights and biases of a network are known as learning rules. A test set, i.e., a set of inputs and targeted outputs (i.e. correct output data) that were not used in training the network, is used to verify the quality of the obtained neural network. In other words, the test set is used to verify how well the neural network can generalize.

According to an embodiment, when the neural network 70 as shown in FIG. 8 is used for lithology prediction, the inputs to the neural network 600, 601, 602, 603 are the four features from feature extraction as discussed above: rock confined compressive strength (CCS), formation drillability coefficient (FDC), dynamic drilling response (DDR), and formation shear strength (FSS). According to an embodiment, the learning rule used here may be back propagation learning. Backward propagation learning may be composed of the following three steps:

Step 1: forward propagation: the first step is to propagate the input forward through the network $$a^{m+1}=F^{m+1}(W^{m+1}a^m+b^{m+1}) \text{ for } m=0, 1, \ldots, m-1$$

where M is the number of layers in the network. The neurons in the first layer receive external inputs: $a^0=p$, which provides the starting point for the above equation. The outputs of the neurons in the last layer are considered the network outputs: $a=a^M$.

Step 2: backward propagation: the second step is to propagate the sensitivities backward through the network $$s^M=2\dot{F}^M(n^M)(t-a)$$

$$s^m=\dot{F}^m(n^m)(W^{m+1})^T s^{m+1}, \text{ for } m=M-1, \ldots, 2, 1$$

Where $$S^m \triangleq \frac{\partial \hat{F}}{\partial n^m} = \left[ \frac{\partial \hat{F}}{\partial n_1^m}, \frac{\partial \hat{F}}{\partial n_2^m}, \cdots, \frac{\partial \hat{F}}{\partial n_{S^m}^m} \right]$$

denotes the sensitivity;
$\hat{F}(x) = e^T(k)e(k) = (t(k)-a(k))^T(t(k)-a(k))$ is the approximate performance index;

$$\dot{F}^m(n^m) = \begin{bmatrix} \dot{F}^m(n_1^m) & 0 & \cdots & 0 \\ 0 & \dot{F}^m(n_2^m) & \cdots & 0 \\ \vdots & \vdots & \vdots & \vdots \\ 0 & 0 & \cdots & \dot{F}^m(n_{S^m}^m) \end{bmatrix};$$

and $\dot{F}^m(n_j^m) = \frac{\partial F^m(n_j^m)}{\partial n_j^m}$ t is the target vector from the training set.

Step 3: weight and bias updates: finally, the weights and biases are updated using the approximate steepest descent rule:

$$W^m(k+1) = W^m(k) - \alpha s^m (a^{m-1})^T$$

$$b^m(k+1) = b^m(k) - \alpha s^m$$

where α is the learning rate.

As a result, the outputs are the weighting values associated with each of possible lithology types. The largest value of the output weight corresponds to the predicted type of lithology.

Figure 9:
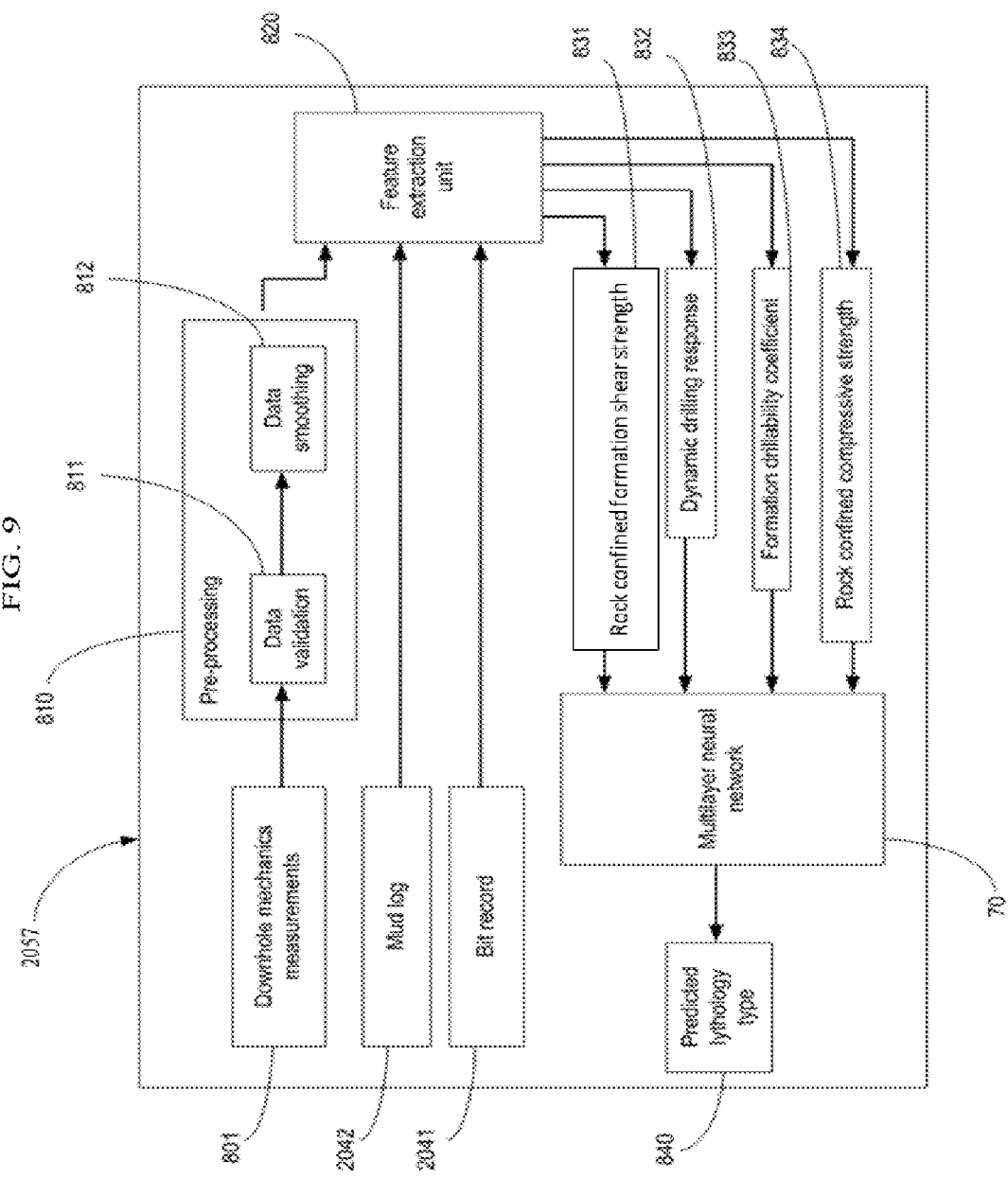
FIG. 9 is a flow chart of a processing subsystem for real-time lithology prediction according to an embodiment of the present invention.

According to an embodiment, the overall processing system for real-time lithology prediction 2057 may be as shown in FIG. 9. As shown, the inputs to the system may include downhole mechanic measurements 801 (e.g., ROP 2032, WOB 2033, torque 2036, rotary speed 2034), mud log 2042 (e.g., mud density), and bit record 2041 (e.g., bit size, PDC cutter size). The downhole mechanics measurements 801 may undergo pre-processing 810 before being fed into the feature extraction unit 820. The pre-processing 810 may include data validation 811 and data smoothing 812. The downhole mechanics measurements 801, for example, ROP 2032, WOB 2033, torque 2036, and rotary speed 2034, are collected at a specific depth. If any of these measurements has a negative or zero value, the set of measurements may be designated as invalid data by data validation 811, and may be removed from processing. Data smoothing techniques 812, such as moving average filtering, are then applied to the data to remove noise. The pre-processed downhole mechanics measurements 801 along with mud log 2042 and bit record 2041 are inputs into feature extraction unit 820 to obtain, through further computation, the four features of interest, that is rock confined formation shear strength (FSS) 831, dynamic drilling response (DDR) 832, formation drillability coefficient (FDC) 833, and compressive strength (CCS) 834. The computation of the four features may be according to the equations discussed above. These four features may be used as inputs to a multilayer neural network 70 trained as discussed above. The output of the multilayer neural network is the predicted lithology type 840.

Figure 10:
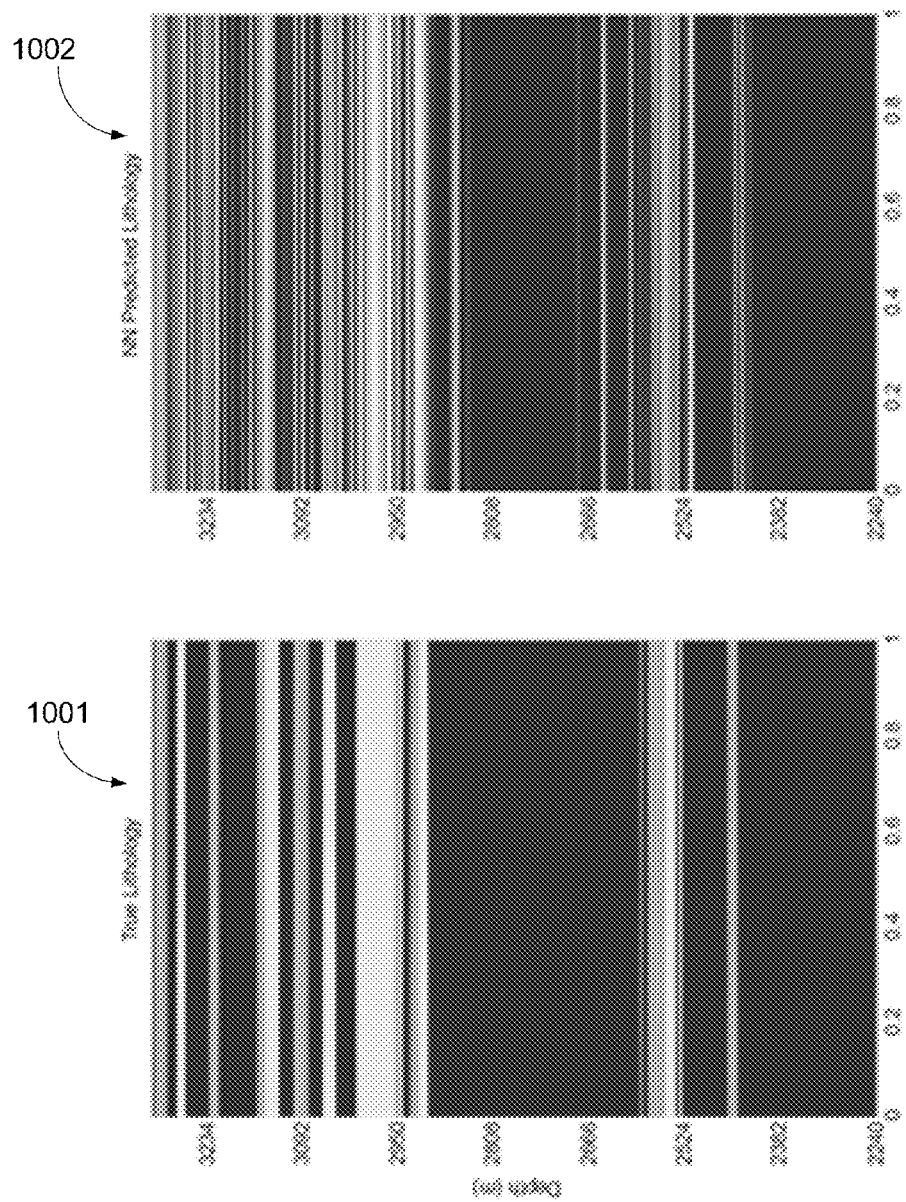
FIG. 10 is a screen shot of the user interface during neural network training for Well #2 according to an embodiment of the present invention.

Sample prediction results are now provided using the embodiment discussed above. A three layer 12-20-12 (tansig-logsig-tansig) feed forward neural network was used with the four features for training and testing in Well #1. The predicted lithology 1002 using the same network is shown in FIG. 10. In the sample prediction results, the lithology prediction 1002 had a rate of successful prediction of 82.33% when compared to the true lithology 1001.

Pore Pressure Estimation and the Trend Fusion Engine

Pore pressure estimation 2053 may be carried out in three stages: before drilling, while drilling and after drilling. Since the drilling fusion engine uses real-time drilling-while-processing for drilling optimization and decision support, while-drilling pore pressure estimation approaches are employed according to embodiments of the invention. According to an embodiment, two quantitative estimation techniques may be used: a D-exponent-based approach or a Sigmalog based approach.

D-Exponent Approach

Empirical models of the rotary drilling process have been proposed to mathematically compensate for the effect of changes in the more important variables affecting penetration rate. One of the first empirical models is d-exponent, which is defined by:

$$d = \frac{\log\left(\frac{R}{60\,N}\right)}{\log\left(\frac{12\,W}{1000\,D_b}\right)}$$

R: Rate of penetration (ft/hr)
N: Rotary speed (rpm)
W: Weight on bit (k-lbf)
$D_b$: Bit diameter (in)

Rehm and McClendon proposed a modified d-exponent to correct the effect of mud-density changes as well changes in weight on bit, bit diameter, and rotary speed, which is $$d_{mod} = d \frac{\rho_n}{\rho_e}$$

$\rho_n$: Mud density equivalent to a normal formation pore pressure gradient
$\rho_e$: Equivalent circulating density (ECD) at the bit The units for $\rho_n$ and $\rho_e$ are the same.

To estimate formation pore pressure quantitatively, we may use linear scales for both drilling depth D and $d_{mod}$ values when constructing a graph. A straight-line normal pressure trend line may be generated having intercept $(d_{mod})_o$ and slope m, thus the points on this trend line are:

$$(d_{mod})_n = (d_{mod})_o + mD$$

D: Depth (ft)

Using the established trend line, there are two different equations to obtain the formation pore pressure gradient estimation:

$$g_p = 7.65 \log[(d_{mod})_n - (d_{mod})] + 16.5 \text{ (lbm/gal)} \quad (1)$$

$$g_p = S - \left[(S - g_n) \times \left(\frac{(d_{mod})_o}{(d_{mod})_n}\right)^{1.2}\right] \text{(lbm/gal)} \quad (2)$$

S: Overburden pore pressure gradient (lbm/gal)
$g_n$: Normal pore pressure gradient (lbm/gal)

The third approach is to use a linear scale for depth D but a logarithmic scale for $d_{mod}$. A straight-line normal pressure trend line may be obtained having intercept $(d_{mod})_o$ and exponent m:

$$(d_{mod})_n = (d_{mod})_o e^{mD}$$

Using this trend line, the empirical relation for the formation pore pressure gradient $g_p$ becomes:

$$g_p = g_n \frac{(d_{mod})_n}{d_{mod}}$$

Since the $d_{mod}$ parameter considers only the effects of bit weight, bit diameter, rotary speed 2034, and mud log 2042, changes in other drilling variables such as bit type, bit wear, mud type, may still create problems in interpreting the obtained results. In addition, extreme changes in the variables included in the $d_{mod}$ calculation may create big uncertainties. Therefore any new trend may be established for the changed conditions. The utility of the d-exponent is diminished when the mud density is several pounds per gallon greater than the formation pore pressure gradient. Because of the overbalance, the penetration rates may no longer respond significantly to changes in formation pressure. Under these conditions, increases in drilling fluid density may cause an erroneous shift in the modified d-exponent plot, which may yield higher pore pressure readings.

Sigmalog Approach (or Formation Capture Cross Section Approach)

The Sigmalog was developed in the Po Valley in the mid-seventies as a joint venture between AGIP and Geoservices. The aim was to solve the shortcomings of the d-exponent while drilling overpressured sequences of carbonates, marls and silty shales in deep wells. Sigmalog model calculate the rock strength which is also derive from drilling parameters weight on bit 2033, rotary speed 2034, rate of penetration 2032, and bit diameter. The procedures are:

Step 1: Calculate total rock strength (i.e., Sigma raw)

$$\sqrt{\sigma_t} = \frac{W^{0.5} N^{0.25}}{D_b R^{0.25}}$$

R: Rate of penetration (m/hr)
N: Rotary speed (rpm)
W: Weight on bit (ton)
$D_b$: Bit diameter (in)

$$\sqrt{\sigma_{t'}} = \sqrt{\sigma_t} + 0.028 \times \left(7 - \frac{D}{1000}\right)$$

D: Depth (m)
Step 2: Calculate true Sigma $\sqrt{\sigma_o}$ $$\sqrt{\sigma_o} = \sqrt{\sigma_{t'}} \times \left(1 + \frac{1 - \sqrt{(1+n^2)\Delta P^2}}{n\Delta P}\right)$$

$$\text{where } n = \begin{cases} \frac{1}{640} \times \left(4 - \frac{0.75}{\sqrt{\sigma_{t'}}}\right) & \text{if } \sqrt{\sigma_{t'}} > 1 \\ \frac{3.25}{640 \times \sqrt{\sigma_{t'}}} & \text{if } \sqrt{\sigma_{t'}} \leq 1 \end{cases}$$

ΔP: Differential pressure of mud to formation fluid corresponding to the normal hydrostatic gradient (kg/cm²)
n: Factor expressing the time required for the internal pressure of cuttings not yet cleared from the bit face to reach mud pressure Step 3: Establish a normal trend line $\sqrt{\sigma_r}$ on plotted $\sqrt{\sigma_o}$ values. At any point, ΔP is calculated as:

$$\Delta P = \frac{2\left(1 - \frac{\sqrt{\sigma_r}}{\sqrt{\sigma_{t'}}}\right)}{1 - \left(1 - \frac{\sqrt{\sigma_r}}{\sqrt{\sigma_{t'}}}\right)^2} \times \left(\frac{1}{n}\right)$$

Step 4: The formation pore pressure gradient is calculated using the following equation:

$$g_p = \rho - \frac{\Delta P}{D}$$

ρ: Mud weight (ppg)

Sigmalog may be used in place of d-exponent, but since the method is not easy to use it may be ill-suited to unexplored basins. The limitations of Sigmalog are the same as for d-exponent. According to an embodiment, its use might be entirely restricted to clays and shales.

Data Input and Processing

Table 8 shows a list of data inputs for pore pressure estimation.

TABLE 8

Data inputs for pore pressure estimation.

| Parameter | Unit | Source |
|---|---|---|
| Depth | m | EDR |
| Rate of penetration 2032 | m/hr | EDR |
| Rotary speed 2034 | rpm | EDR |
| Weight on bit 2033 | kDaN | EDR |
| Pump rate | m³/min | EDR |
| Differential pressure | kDaN | EDR |
| Mud density | kg/m³ | Tour sheet |
| Depth in/out | m | Tour sheet |
| Pipe OD | mm | Tour sheet |
| Hole size | mm | Tour sheet |
| Bit diameter | in | Bit report |

Calculations performed according to an embodiment of the invention with the three sets of sample well data and the results from Well #1 are shown below. According to the theory of d-exponent and Sigmalog based pore pressure estimation approaches, the trend lines may be established for the same bit and lithology types in normal pressure conditions to minimize the effects of other factors which may invalidate the underlying techniques. A sequence of samples from bit #6 was taken and the corresponding lithology types are listed in Table 9.

TABLE 9

Lithology samples from bit # 6 at various depths.

| Depth in (m) | Depth out (m) | Lithology |
|---|---|---|
| 2205 | 2375 | shale |
| 2375 | 2385 | siltstone |

TABLE 9-continued

Lithology samples from bit # 6 at various depths.

| Depth in (m) | Depth out (m) | Lithology |
|---|---|---|
| 2385 | 2445 | shale |
| 2445 | 2450 | siltstone |
| 2450 | 2460 | shale |
| 2460 | 2475 | sandstone |
| 2475 | 2500 | siltstone |
| 2500 | 2510 | shale |
| 2510 | 2515 | siltstone |
| 2515 | 2920 | shale |
| 2920 | 2930 | sandstone |
| 2930 | 2937 | siltstone |
| 2937 | 2946 | shale |
| 2946 | 3010 | sandstone |
| 3010 | 3040 | shale |
| 3040 | 3054 | sandstone |
| 3054 | 3070 | shale |
| 3070 | 3084 | siltstone |
| 3084 | 3100 | shale |
| 3100 | 3115 | sandstone |
| 3115 | 3125 | siltstone |
| 3125 | 3165 | shale |
| 3165 | 3175 | siltstone |
| 3175 | 3200 | shale |
| 3200 | 3210 | sandstone |
| 3210 | 3220 | shale |
| 3220 | 3231.5 | siltstone |
| 3231.5 | 3235.5 | shale |

Figure 11A:
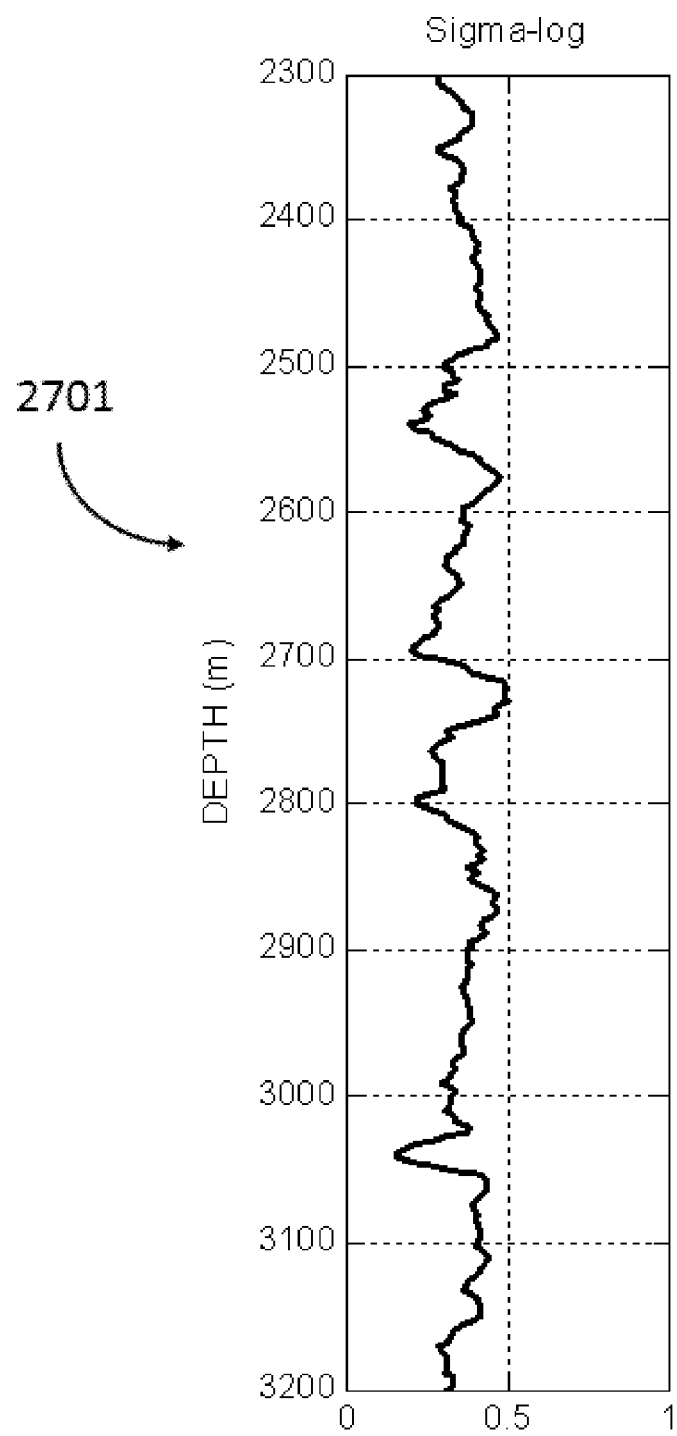
FIG. 11a shows an intermediate Sigmalog calculations for the formation pore pressure gradient (lbm/gal) estimation results for Well #1 within depth 2300 m-3200 m according to an embodiment of the present invention.
Figure 11C:
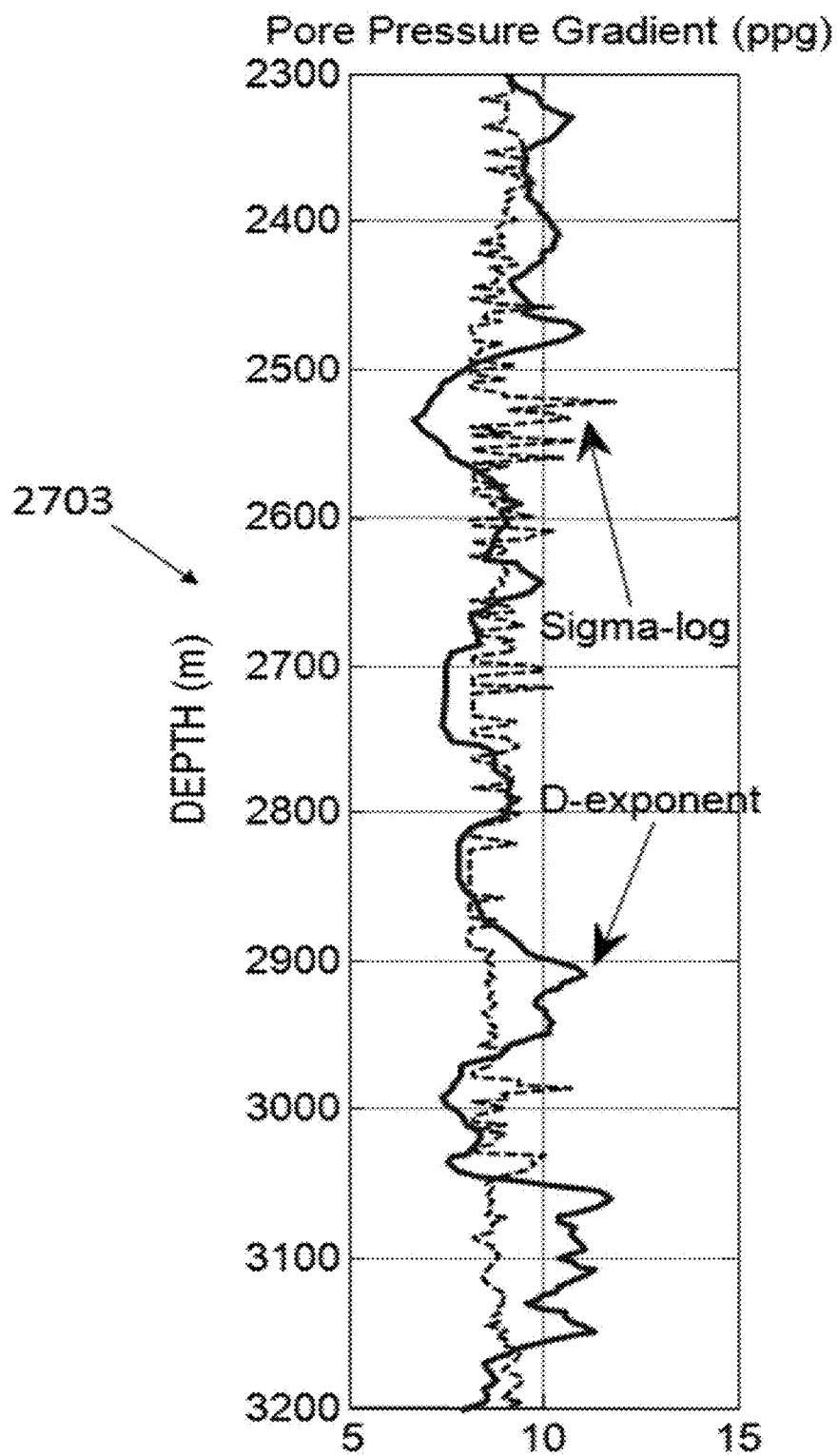
FIG. 11c shows a formation pore pressure gradient (lbm/gal) estimation results using d-exponent and Sigmalog approaches for Well #1 within depth 2300 m-3200 m according to an embodiment of the present invention.

FIGS. 11a, 11b and 11c illustrate the formation pore estimation results 2703 using d-exponent 2702 and Sigmalog 2701 methods. Intermediate d-exponent and Sigmalog calculations are also shown. According to an embodiment, the normal pore pressure gradient used in the calculation is a constant 0.4650 psi/feet. Since the D-exponent based PP estimation equation is a function of normal pore pressure, any variation of the normal pore pressure gradient may change the real-time estimation results. According to an embodiment, the software has the capability of programming the mud weight to watch if it gets to a predefined value, say, 1 or 1.25 pp, over the programmed/estimated PP. In such cases, a flag may be raised thus averting a potential safety concern.

Trend Analysis and Fusion

According to an embodiment, the inputs to the trend fusion engine 308 according to an embodiment are grouped into two categories: historical data and real-time data.

Historical Data

According to an embodiment, the historical data inputs as shown in Table 10 may be estimates based on mining nearby historical drilling well sites (i.e., analogous well data). This is based on the assumption that nearby analogous wells 302.1 to 302.n may have similar geological properties. Therefore, this data may provide useful information to new wells and drilling operations thereof for potential safety indications.

TABLE 10

Historical data input from analogous wells

Predicted lithology (from the NN lithology prediction tool) 310
Estimated pore pressure (gradient) 316
Porosity 311
Permeability 312
Water saturation 313
Predicted bit wear 314

Figure 12B:
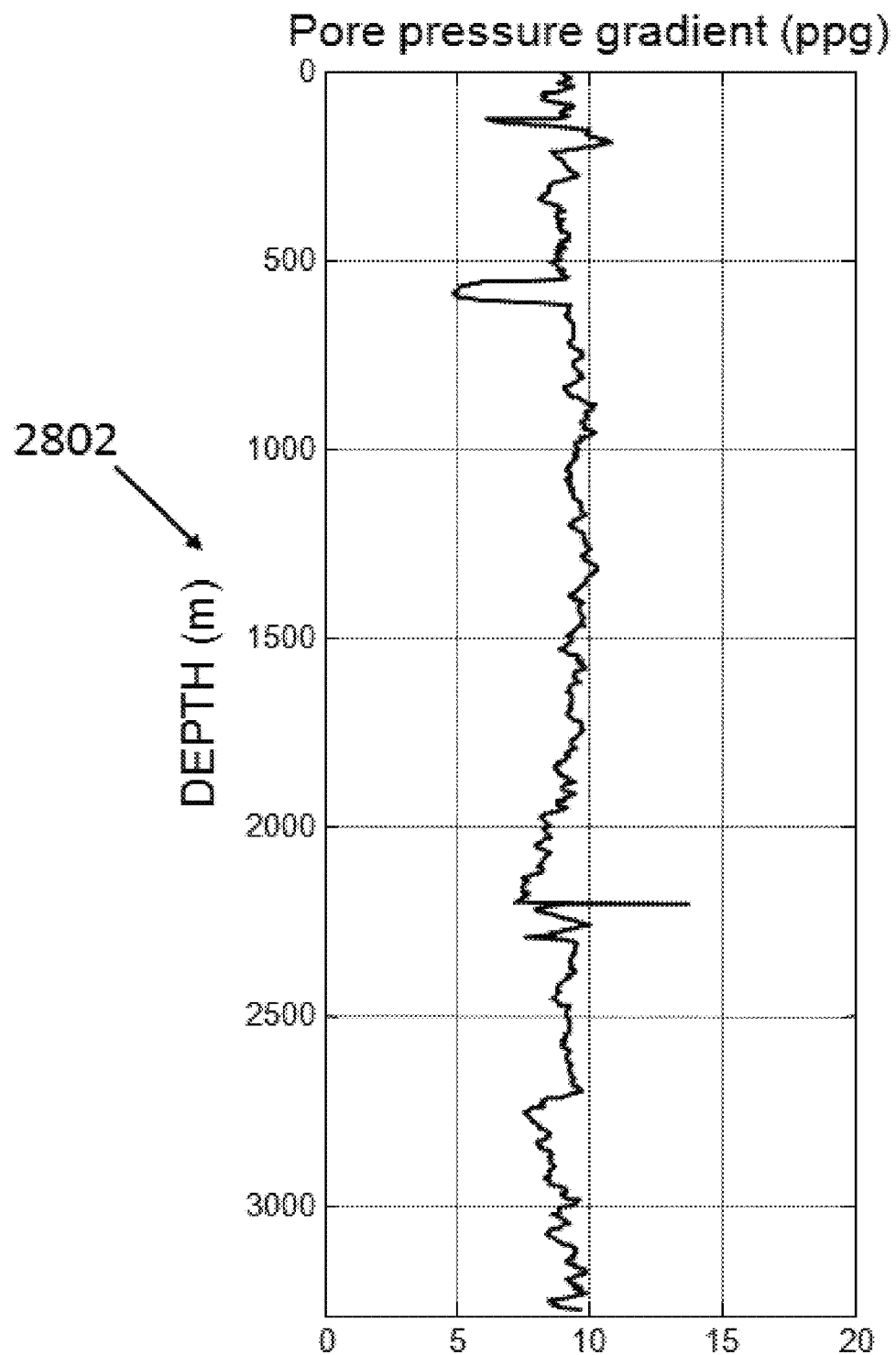
FIG. 12b shows a pore pressure results for Well #1 according to an embodiment of the present invention.
Figure 14A:
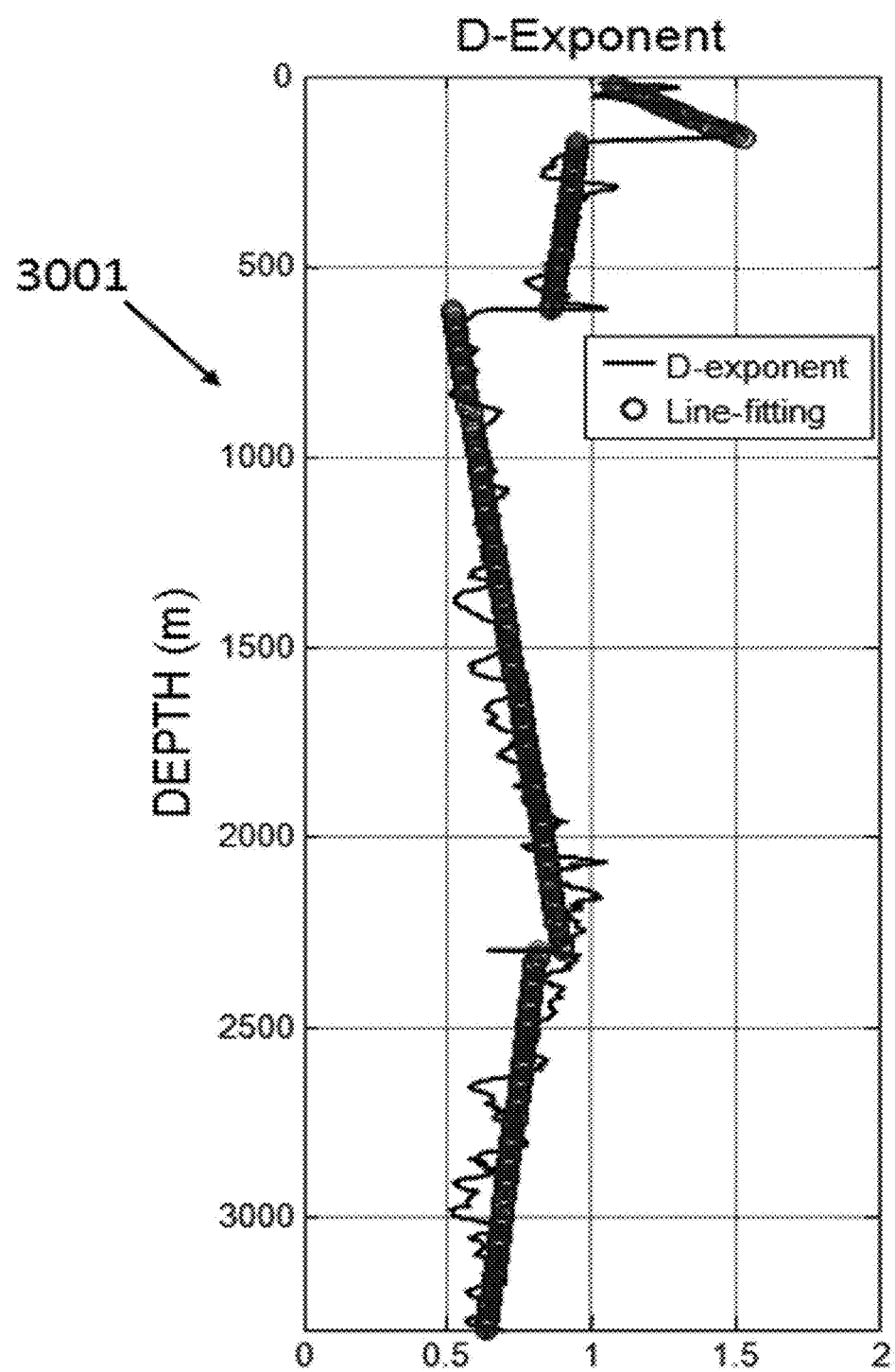
FIG. 14a shows a D-exponent pore pressure estimation results for Well #3 according to an embodiment of the present invention.
Figure 14B:
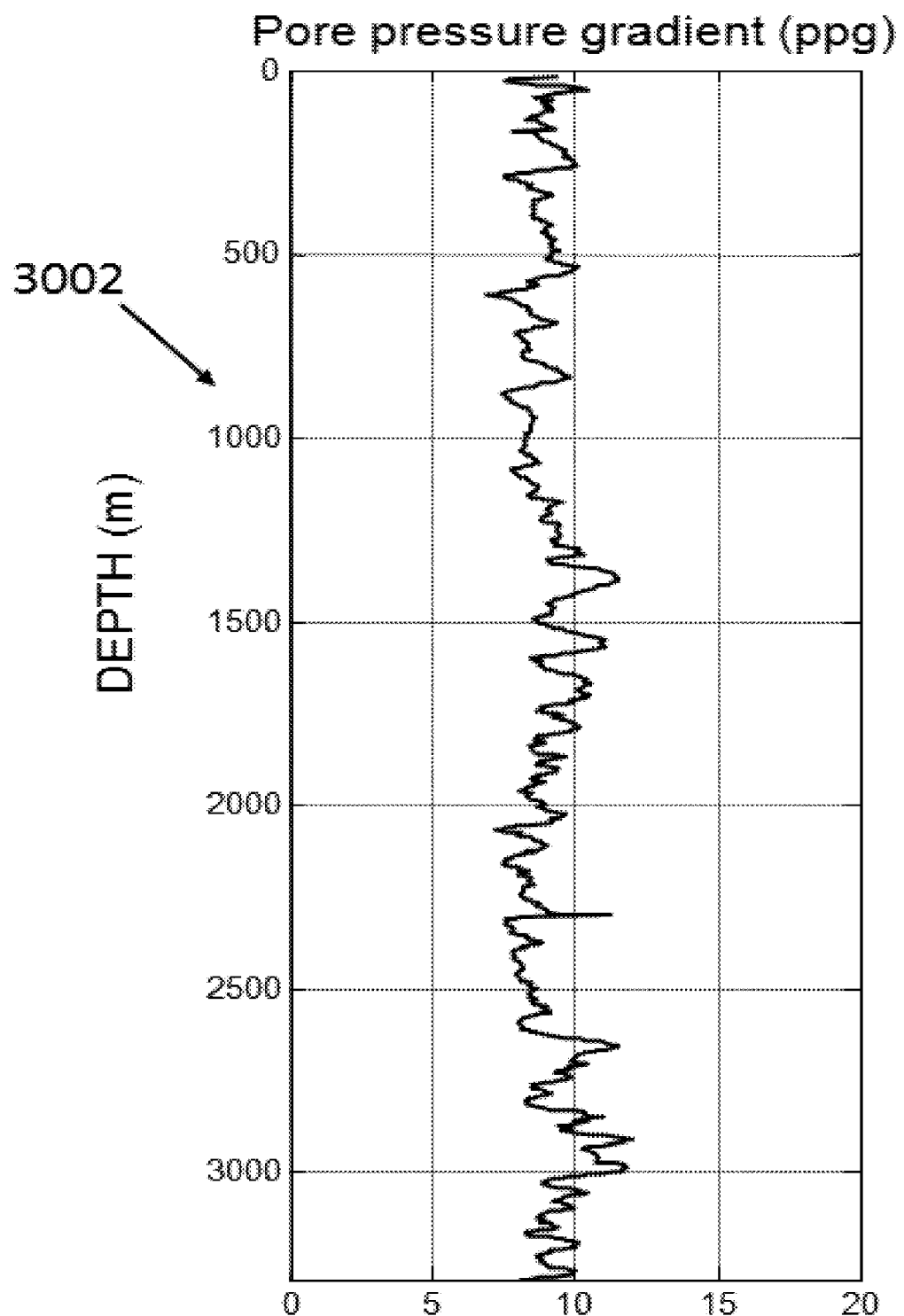
FIG. 14b shows pore pressure results for Well #3 according to an embodiment of the present invention.

According to an embodiment, trend fusion may be performed on historical data from the historical database 309 from multiple analogous wells 302.1 to 302.3n to minimize the uncertainties and noise from individual wells in historical 303.1 to 303.3n drilling data. According to an embodiment, FIGS. 12a, 12b, 12c, 13a, 13b, 13c, 14a, 14b, 14c show trend fusion performed on historical data for Well #1, Well #2, and Well #3. FIGS. 12a, 13a, and 14a show D-exponent pore pressure estimation results 2801, 2901, and 3001 for Well #1, Well #2, and Well #3. FIGS. 12b, 13b, and 14b show pore pressure results 2802, 2902, and 3002 for Well #1, Well #2, and Well #3. FIGS. 12c, 13c, and 14c show a pore pressure (PP) estimation by linear regression 2803, 2903, and 3003 for Well #1, Well #2, and Well #3. FIGS. 12c, 13c, and 14c show the D-exponent based pore estimation results (dashed curve in the Pore Pressure (PP) estimation plot) and their associated trend analysis results (overlayed by a solid line in the PP estimation plot) by linear regression (with the associated statistical parameters tabulated in Table 11) for Well #1, Well #2, and Well #3, respectively. Since the D-exponent based PP estimation method may use a process of line fitting to get the intercept and slope of the trend line of D-exponent, the estimated intercept and slope feeds into the PP estimation equation to obtain the PP. However, the line fitting on D-exponent may not be carried out over the entire drilling depth. Instead, it may be applied only for the same drilling bit. A line of best fit is also shown in the D-exponent plot. FIG. 15a, FIG. 15b, FIG. 15c, and FIG. 15d illustrate the trend fusion engine 308 according to an embodiment in fusing pore pressure estimation results 3101, 3102 and 3103 from three different wells into optimized pore pressure estimate 3104. After performing the pore pressure estimation 316 for each well site, a centralized fusion algorithm may be carried out to integrate the results into an optimized pore pressure estimation with reduced uncertainties. For example, pore pressure estimated in Well #1 shows a spike around 2000 meters which is caused by bit transition, where the measured mechanical sensors provide certain erroneous readings and should not affect the pore pressure estimation. After trend fusion, this effect may be effectively smoothed out.

TABLE 11

Trend analysis parameters for three wells

| | Well #1 | Well #2 | Well #3 |
|---|---|---|---|
| SSE | $1.7631 \times 10^9$ | $1.0003 \times 10^9$ | $2.097 \times 10^9$ |
| R-Square | 0.9463 | 0.9670 | 0.9426 |
| RMSE | 351.9952 | 267.2016 | 383.3287 |

SSE: the sum of squares due to error
R-Square: R-square is defined as the ratio of the sum of squares of the regression (SSR) and the total sum of squares (SST)
RMSE: root mean square error Real-Time Data According to an embodiment, real-time data inputs may be provided from ongoing drilling profiles to assist in identifying and addressing safety concerns while drilling. They may be conveyed to the trend fusion engine 308 as inputs to find any deviations from the static data inputs. As set out in Table 12, these inputs may include:

TABLE 12

Real-time data inputs from the well being drilled

| Mechanics | Lithology | Dynamic Pressure |
|---|---|---|
| ROP 2032 | Pore pressure estimation 2053 | Mud weight |
| Torque 2036 | | Differential pressure 3277 |
| WOB 2033 | Lithofacies estimation | |
| RPM 3273 | Porosity 2075 | Hydrostatic pressure |
| Pump pressure 3275 | Permeability 2076 | 3241 |

TABLE 12-continued

Real-time data inputs from the well being drilled

| Mechanics | Lithology | Dynamic Pressure |
|---|---|---|
| Predicted bit wear 2056 Volume 3245 | Water Saturation 3246 | ECD 2074 Annular circulation pressure loss 3243 Bottom hole pressure 3244 |

Further real-time data inputs may be included at the discretion of the operator, as long as such real-time data may be obtained from the sensors 101 at the well being drilled.

According to an embodiment, an expert decision engine 328 may be employed in the system to address the safety concerns, which may be based on feeding it both historical data and real-time data and determining potential safety issues according to the embedded expert decision rules.

Bit Hydraulics, Permeability Estimation, Volume and Capacity, Rotary Friction Coefficient, Stuck Pipe Calculations and Cost Estimation According to an embodiment, drilling bit hydraulics may be another component in the drilling optimization software.

Accommodating for drilling bit hydraulics may contribute to the safe, economic, and efficient drilling of wells and may be a particular concern for deepwater, high temperature-high pressure (HTHP), and highly directional wells. Hydraulics may be a cause or solution in many common drilling problems. Therefore, improvements in hydraulics simulation software may provide better insights into downhole behaviour. Moreover, hydraulic parameters may lend themselves to visualization.

Hydrostatic Pressure Estimation

Under a static condition, the bottom hole pressure (BHP) is equal to hydrostatic pressure from the drilling fluid.

Hydrostatic Pressure 3241

$$HP, psi = MW, ppg \times 0.052 \times TVD, ft$$

MW: mud weight, ppg
TVD: true vertical depth, ft

Bottom Hole Pressure (Static) 3244

$$BHP, psi = HP, psi$$

During many drilling operations, the well fluid column contains several sections of different fluid densities. The variation of pressure with depth in this type of complex fluid column must be determined by separating the effect of each fluid segment. In this case, the hydrostatic pressure 3241 at any vertical distance depth may be calculated by:

$$HP, psi = P_0, psi + 0.052 \times \sum_{i=1}^{N} MW_i, ppg \times (TVD_i - TVD_{i-1}), ft$$

Figure 15C:
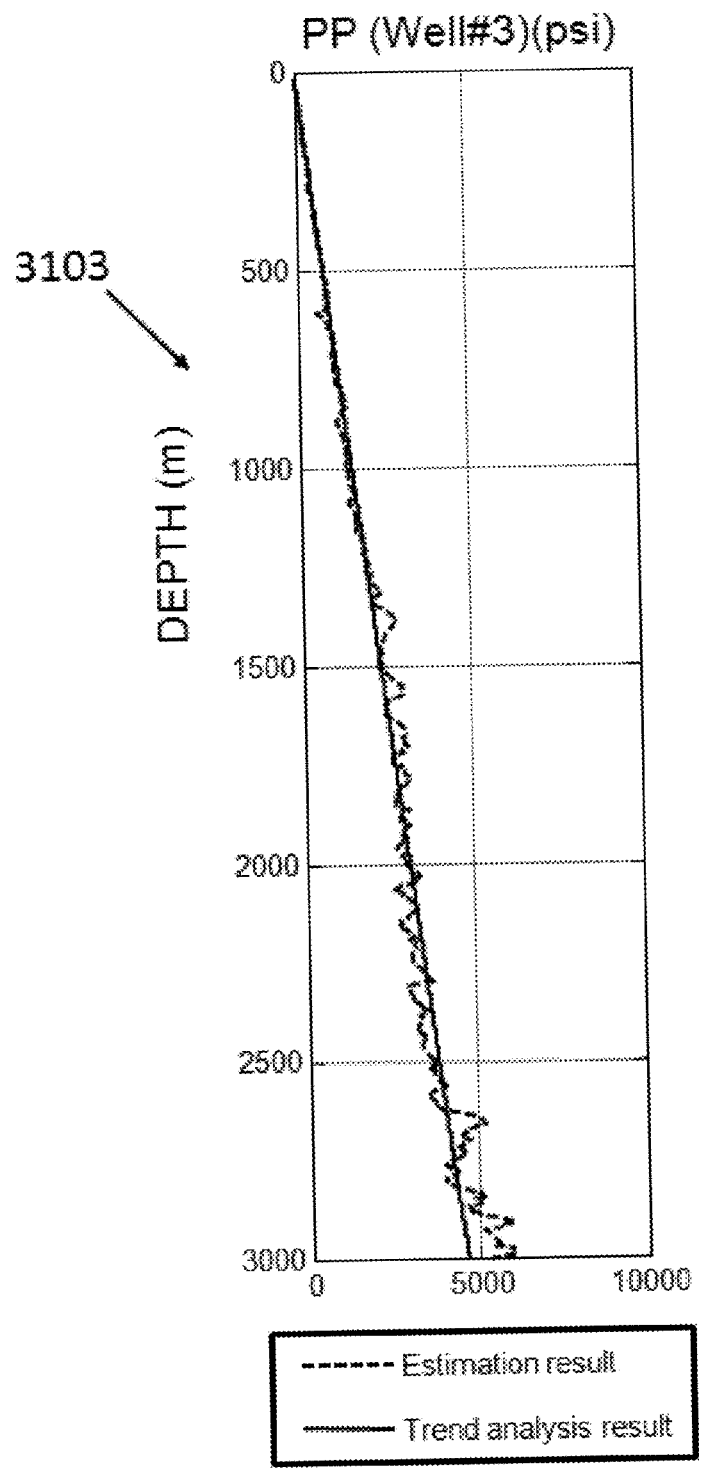
FIG. 15c shows a trend fusion results of pore pressure estimation from Well #3 according to an embodiment of the present invention.
Figure 15D:
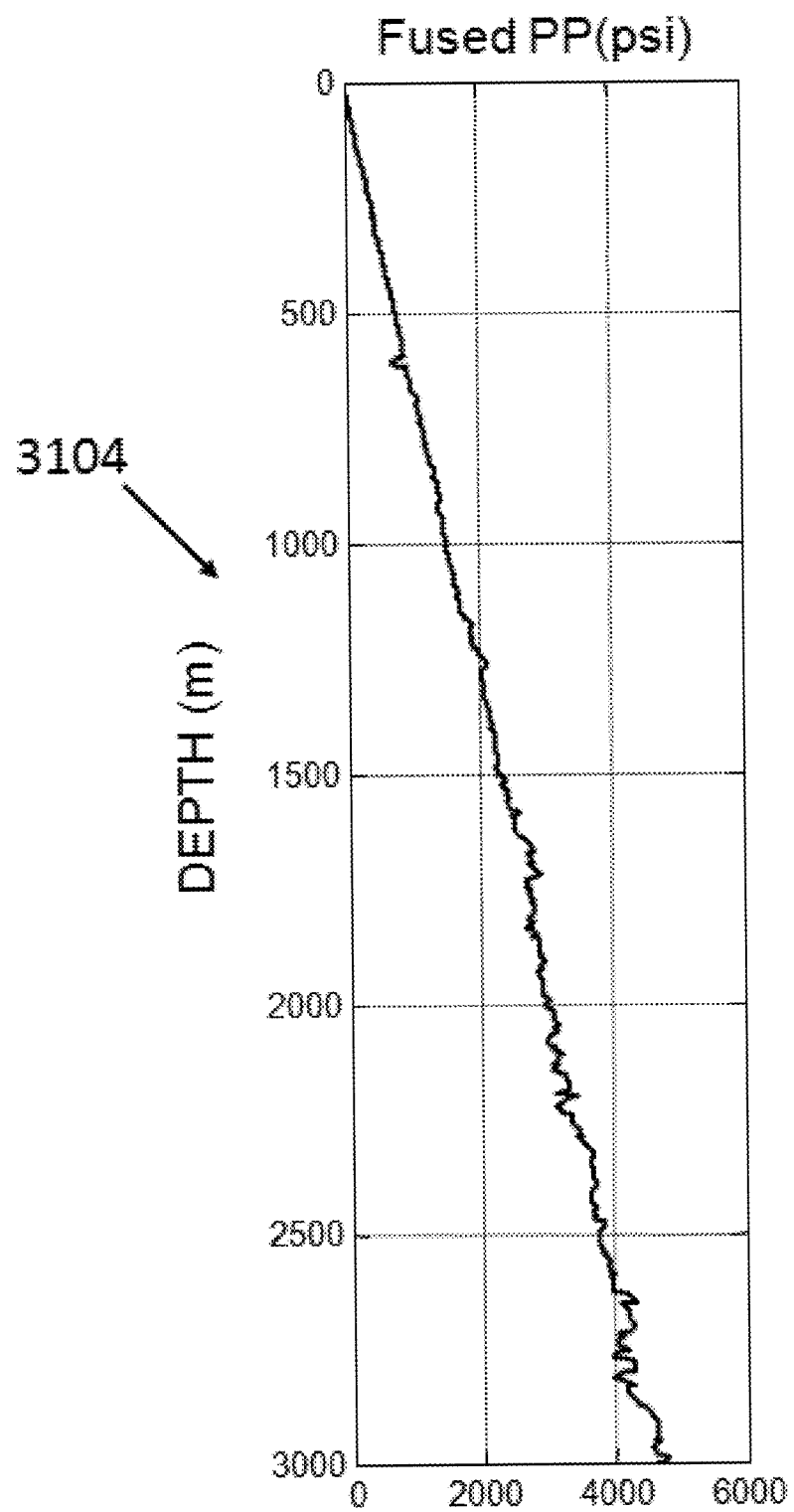
FIG. 15d shows an optimized pore pressure estimation obtained from integration of the trend fusion results of pore pressure estimation from Well #1, Well #2, and Well #3 according to an embodiment of the present invention.
Figure 15E:
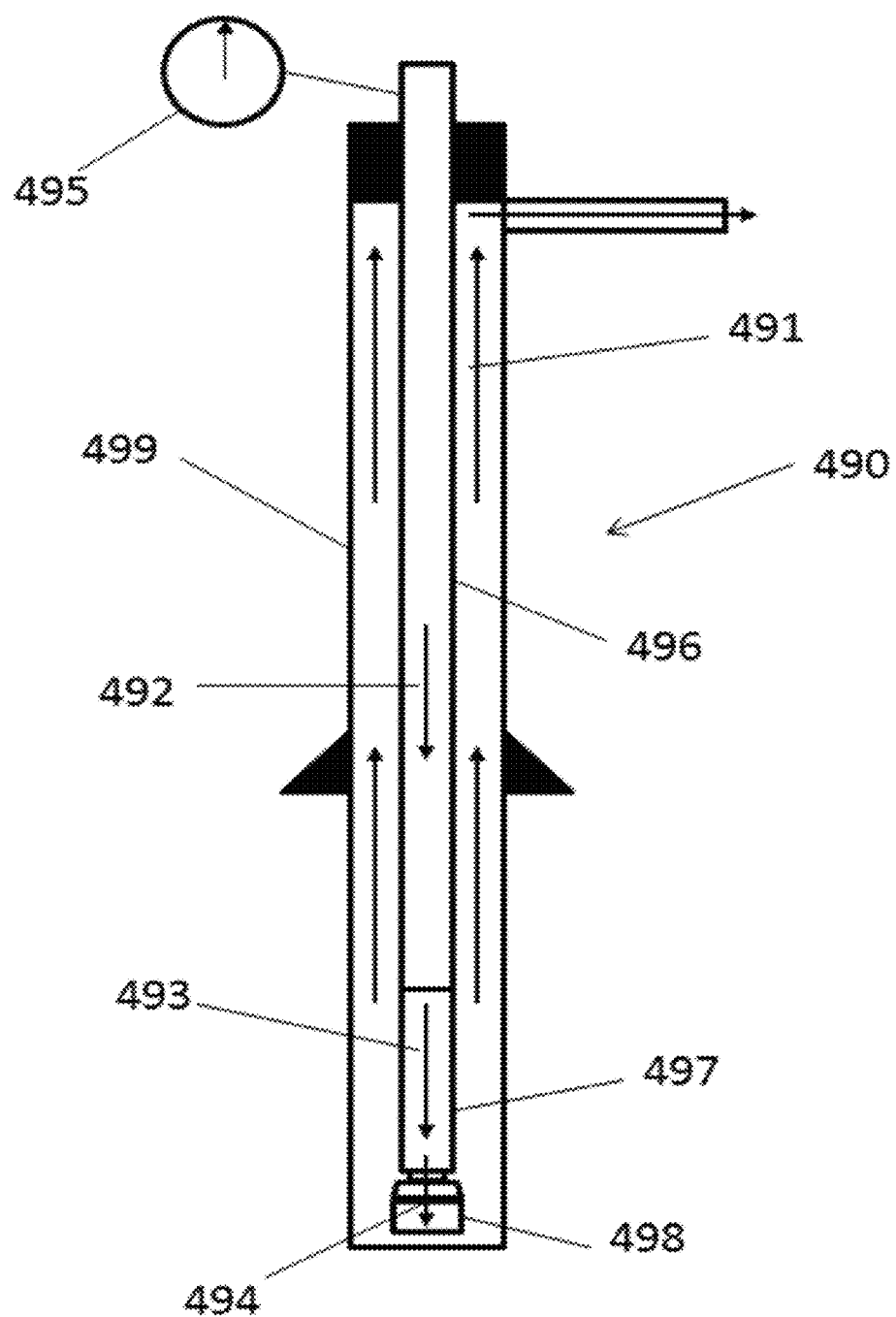
FIG. 15e shows pressure losses in the circulating system according to an embodiment of the present invention.

$P_0$, initial pressure, psi
$MW_i$: mud weight at the i-th segment, ppg
$TVD_i$: true vertical depth at the i-th segment, ft Dynamic Pressure Estimation FIG. 15e shows a schematic representation of pressure losses in the circulating system 490 having a downhole 499, a drill string 496, a bottom hole assembly 497 and a drill bit 498.

In a dynamic circulating system 490, the factors affecting circulating pressure may include:

length of the drill string;
fluid density or mud weight;
yield point and plastic viscosity of the fluid;
hydraulic diameters of the system components;
available hydraulic horsepower; and
circulating rate.

The various pressure losses shown in FIG. 15e, are reflected in the following equation:

Stand pipe pressure 495=Pressure loss in drill string 492+Pressure loss in BHA 493+Pressure loss across the bit 494+Pressure loss in the annulus 491

The pressure loss acts opposite to the direction of fluid being moved; therefore, the bottom hole pressure on the annulus side at the dynamic condition may be determined according to the equation below:

BHP=Hydrostatic pressure+Pressure loss in the annulus

Under the dynamic condition, the only effect on the bottom hole pressure may be pressure loss in the annulus.

Downhole hydraulics parameters, including equivalent circulating density (ECD) 2074, annular velocity, annular pressure loss 3243, jet nozzle pressure loss, hydraulics horsepower, jet velocity, pore pressure gradient, and jet impact force may be calculated using the equations below:

Equivalent Circulating Density 2074

$$ECD, ppg = \frac{APL, psi}{0.052 \times TVD, ft} + MW, ppg$$

APL: annular pressure loss, psi
MW: mud weight, ppg
TVD: true vertical depth, ft Annular Velocity $$AV, ft/min = \frac{24.5 \times Q}{Dh^2 - Dp^2}$$

Q: circulation rate, gpm
Dh: hole diameter, in
Dp: pipe or collar O.D, in

Annular Pressure Loss $$APL, psi = 1.4327 \times 10^{-7} \cdot \frac{MW \times Length \times AV^2}{Dh^2 - Dp^2}$$

Jet Nozzle Pressure Loss (Pb)

$$Pb, psi = \frac{156.5 \times Q^2 \times MW}{[N_1^2 + N_2^2 + N_3^2]^2}$$

$N_1$, $N_2$, $N_3$: jet nozzle sizes, $32^{nd}$ in

System Hydraulic Horsepower Available (SysHHP)

$$SysHHP = \frac{SP, psi \times Q}{1714}$$

SP: surface pressure, psi

Hydraulic Horsepower at Bit (HHPb)

$$HHPb = \frac{Q \times Pb}{1714}$$

Hydraulic Horsepower Per Square Inch of Bit Diameter $$HHPb/\text{sq in.} = \frac{HHPb \times 1.27}{Db^2}$$

Db: bit diameter, in
Percent Pressure Loss at Bit (% psib)

$$\% \, psib = \frac{Pb}{SP} \times 100$$

Jet Velocity (Vn)

$$Vn, \text{ft/sec} = \frac{417.2 \times Q}{N_1^2 + N_2^2 + N_3^2}$$

Impact Force at Bit (IF)

$$IF, \text{lb} = \frac{MW \times Vn \times Q}{1930}$$

Impact Force Per Square Inch of Bit Area (IF/sq in.)

$$IF/\text{sq in.} = \frac{1.27 \times IF}{Db^2}$$

Trip Margin

The pressure reduction through swabbing may be relevant when tripping pipe because: the balancing pressure is the static mud hydrostatic rather than the higher equivalent circulatory density, there may be repeated swabbing as each stand is pulled, and the "piston" effect may affect every permeable formation in open hole.

According to an embodiment, the pressure reduction may be minimized by pulling the drill string at a slower speed and keeping mud viscosity as low as possible, bearing in mind that hole cleaning and cutting lift properties may have to be maintained while drilling.

A safety or trip margin may be calculated to ensure that the pressure reduction does not create an underbalance. In the static condition, the trip margin may be calculated by:

TripMargin(psi)=Hydrostatic pressure(psi)−Formation pressure psi/ft)×TVD(ft)

In the dynamic condition, the trip margin may be calculated by:

TripMargin(psi)=APL(psi)+TripMargin(static)(psi)

Dynamic Pressure Estimation Results

Figure 16A:
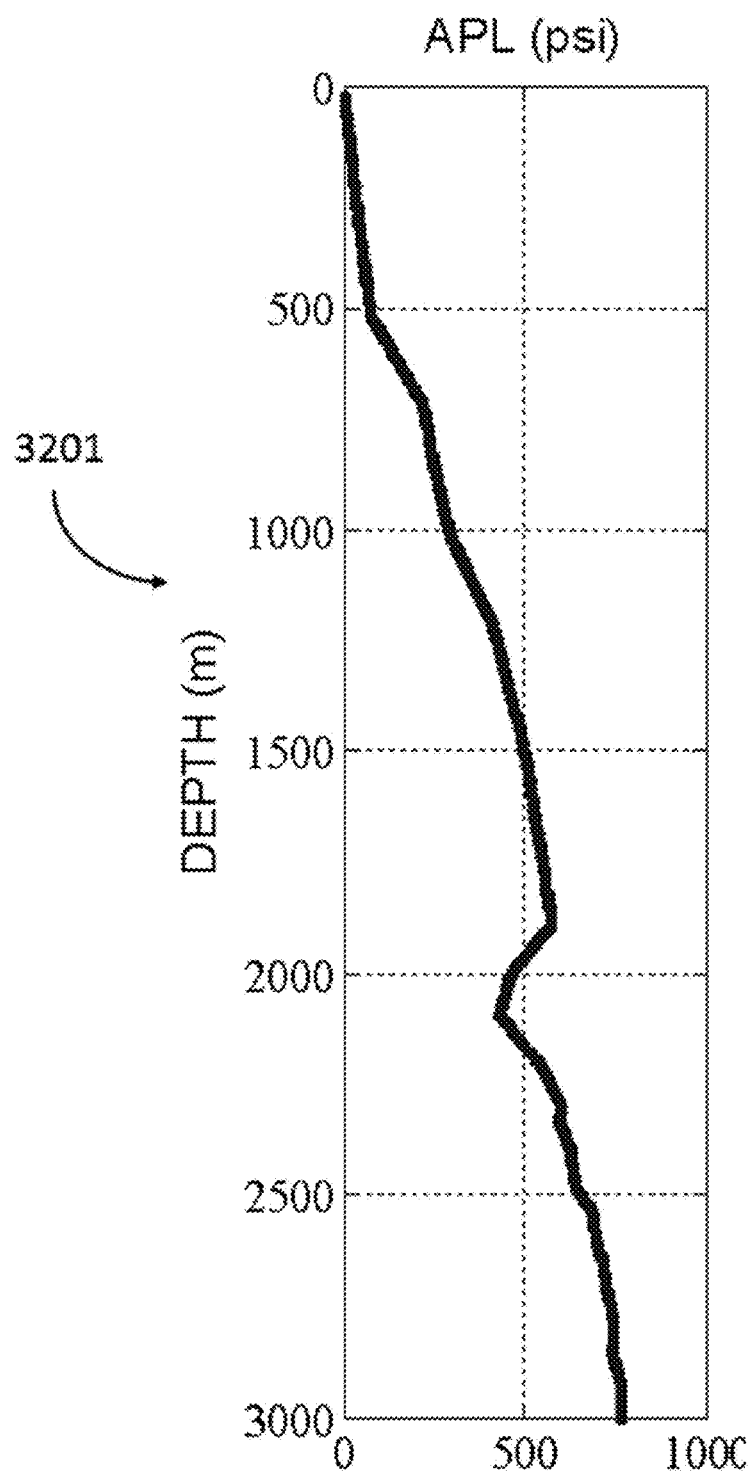
FIG. 16a shows a calculated annular pressure loss (APL) for Well #1 according to an embodiment of the present invention.
Figure 16B:
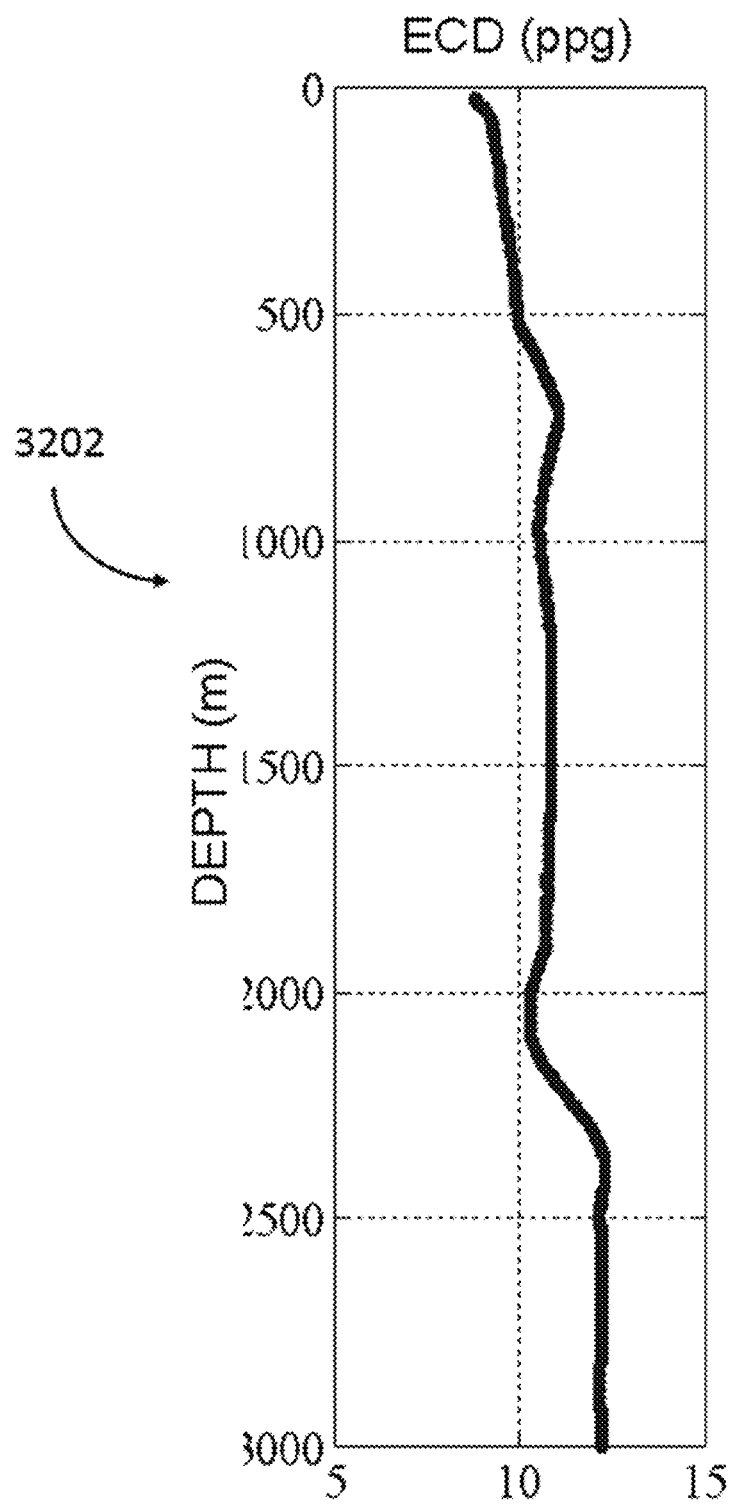
FIG. 16b shows a calculated equivalent circulatory density (ECD) for Well #1 according to an embodiment of the present invention.
Figure 16C:
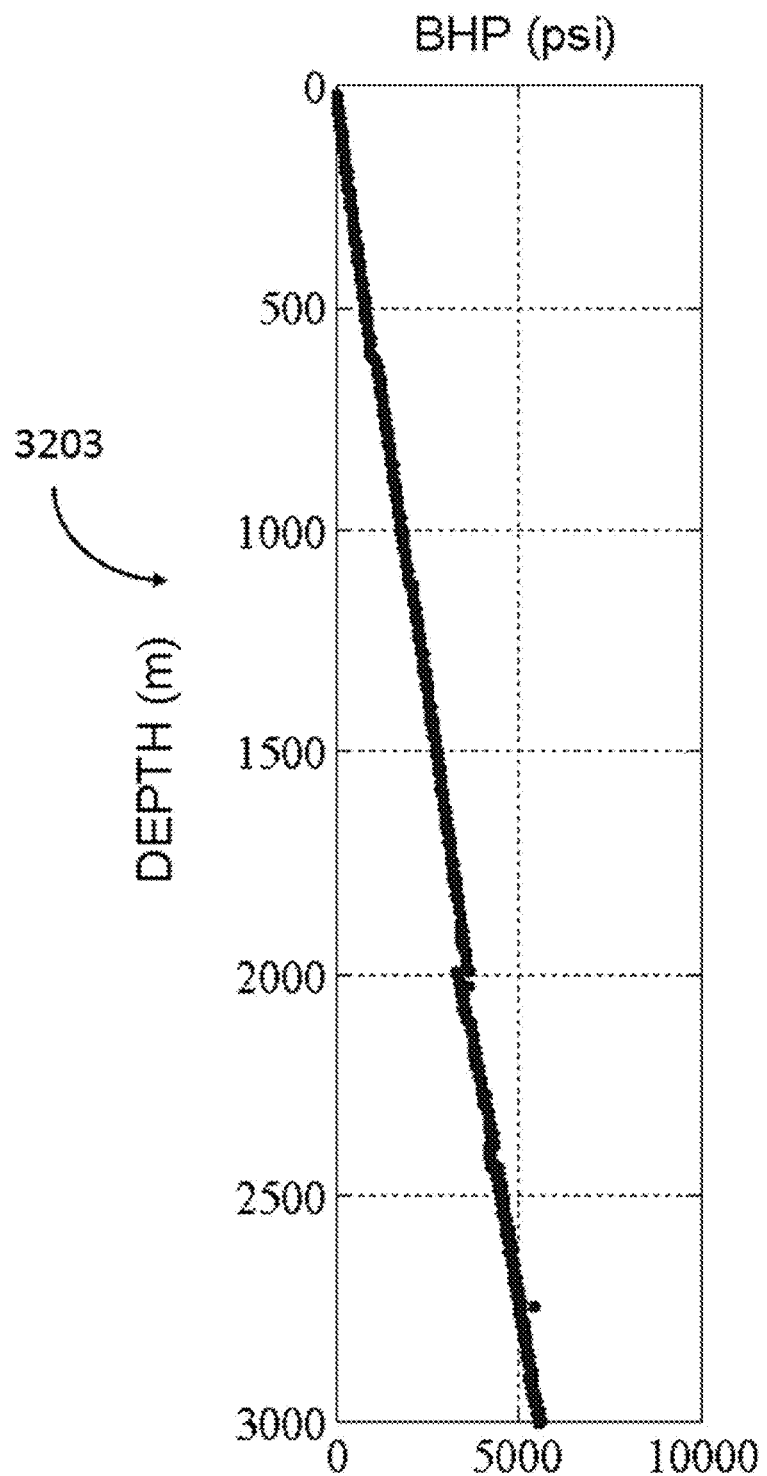
FIG. 16c shows a bottom hole pressure (BHP) for Well #1 according to an embodiment of the present invention.
Figure 16D:
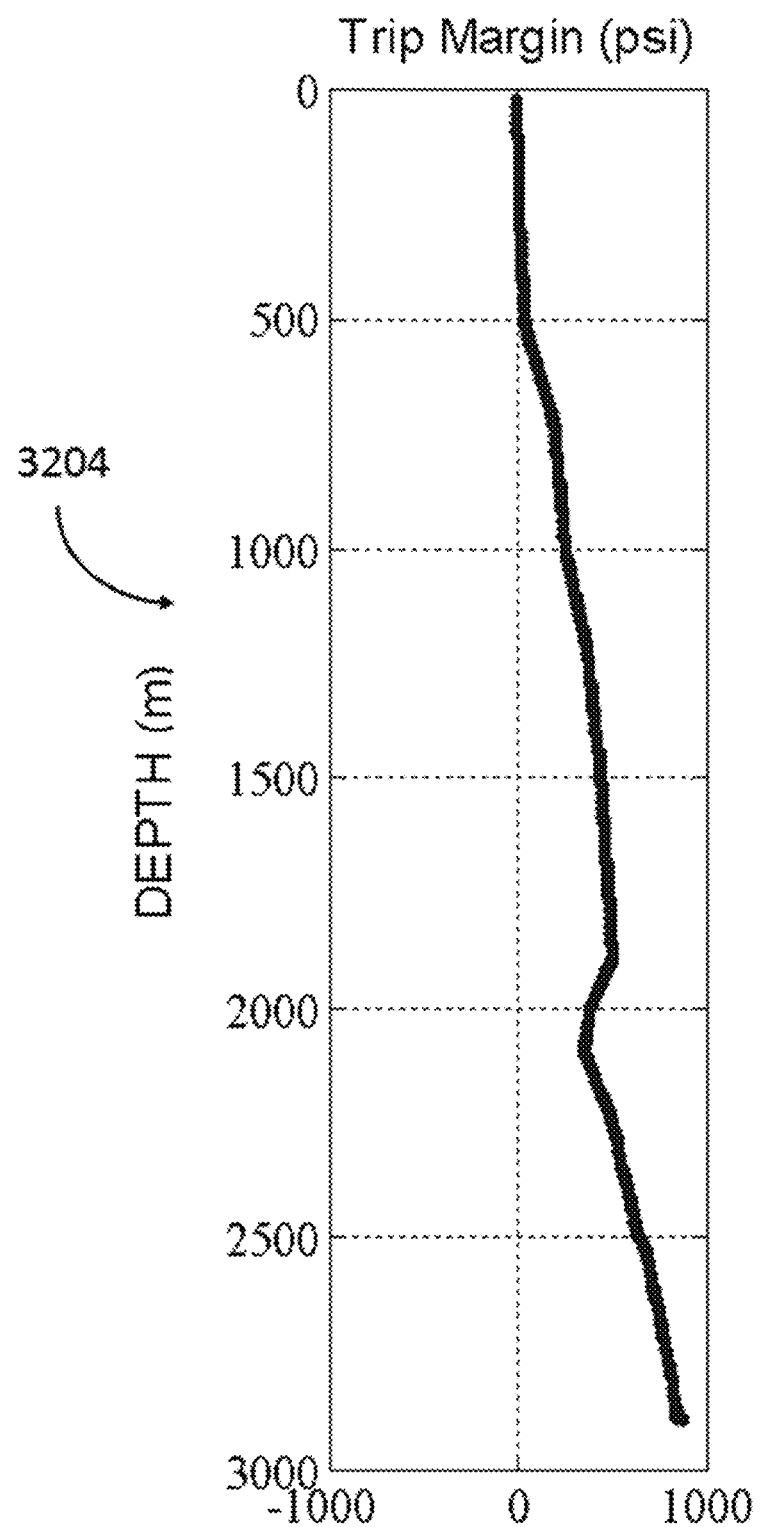
FIG. 16d shows a calculated trip margin for Well #1 according to an embodiment of the present invention.
Figure 17A:
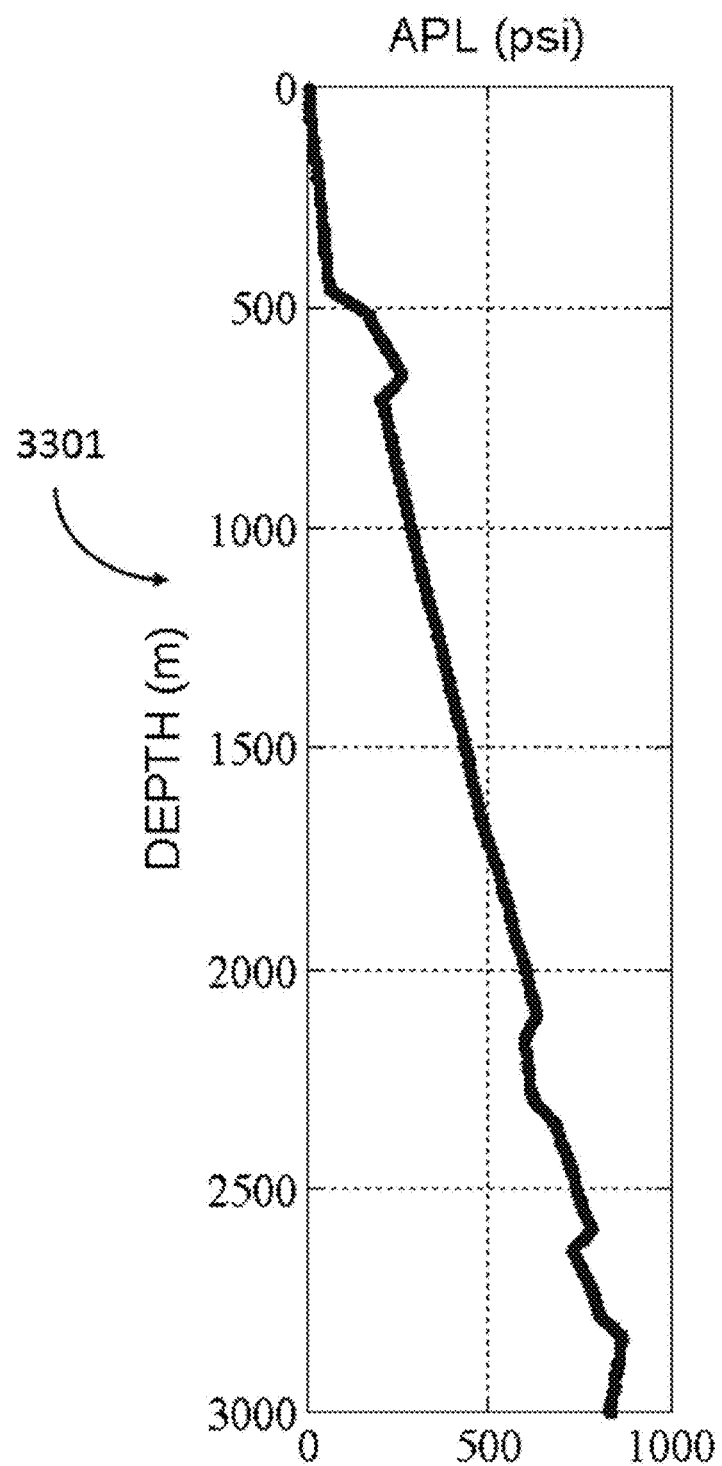
FIG. 17a shows a calculated annular pressure loss (APL) for Well #2 according to an embodiment of the present invention.
Figure 17B:
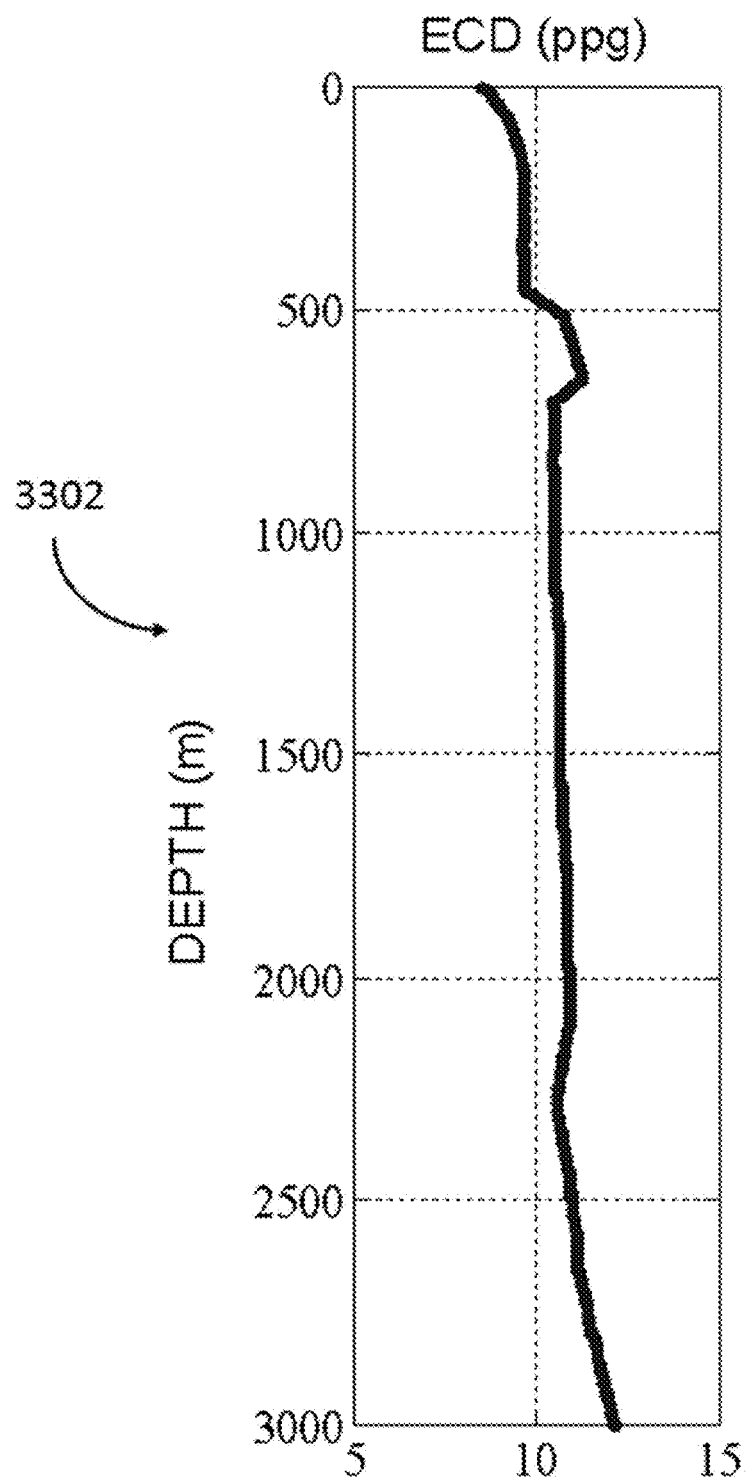
FIG. 17b shows a calculated equivalent circulatory density (ECD) for Well #2 according to an embodiment of the present invention.
Figure 17C:
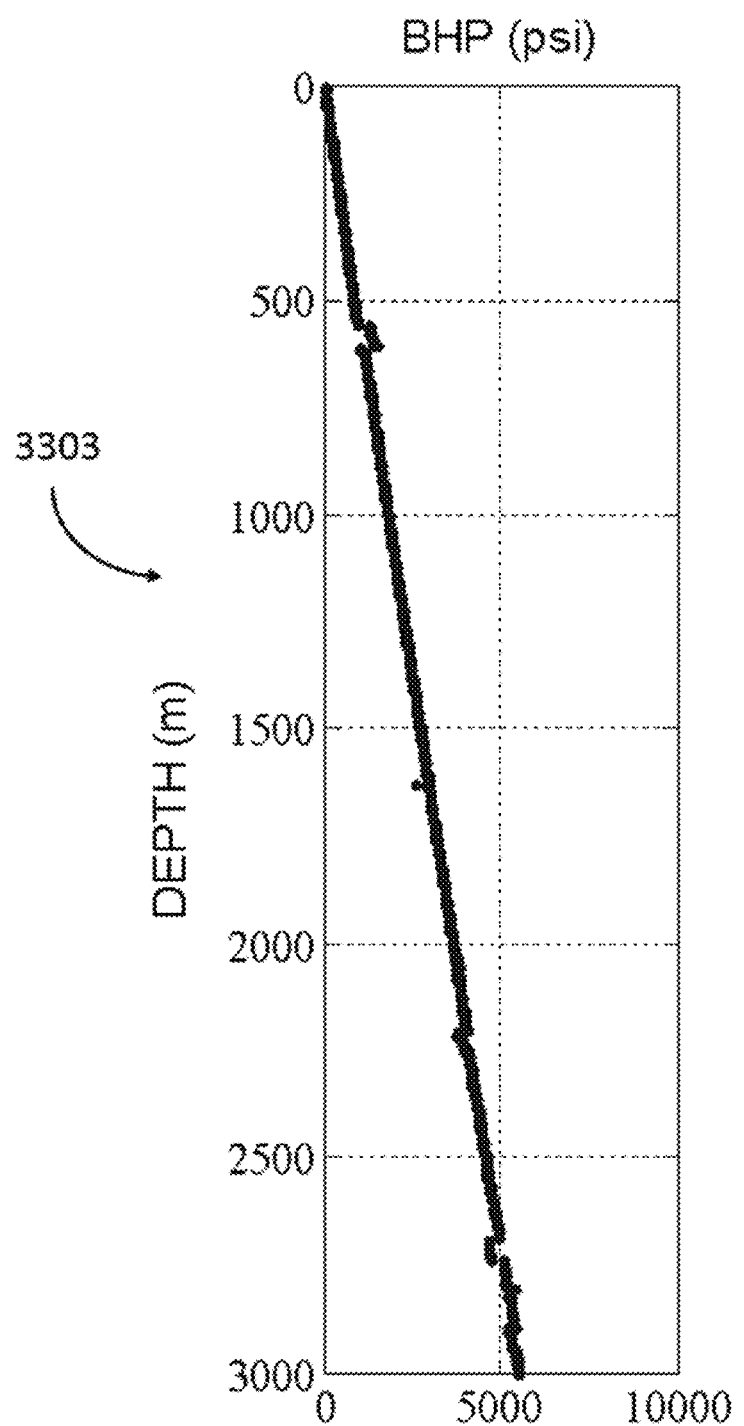
FIG. 17c shows a bottom hole pressure (BHP) for Well #2 according to an embodiment of the present invention.
Figure 17D:
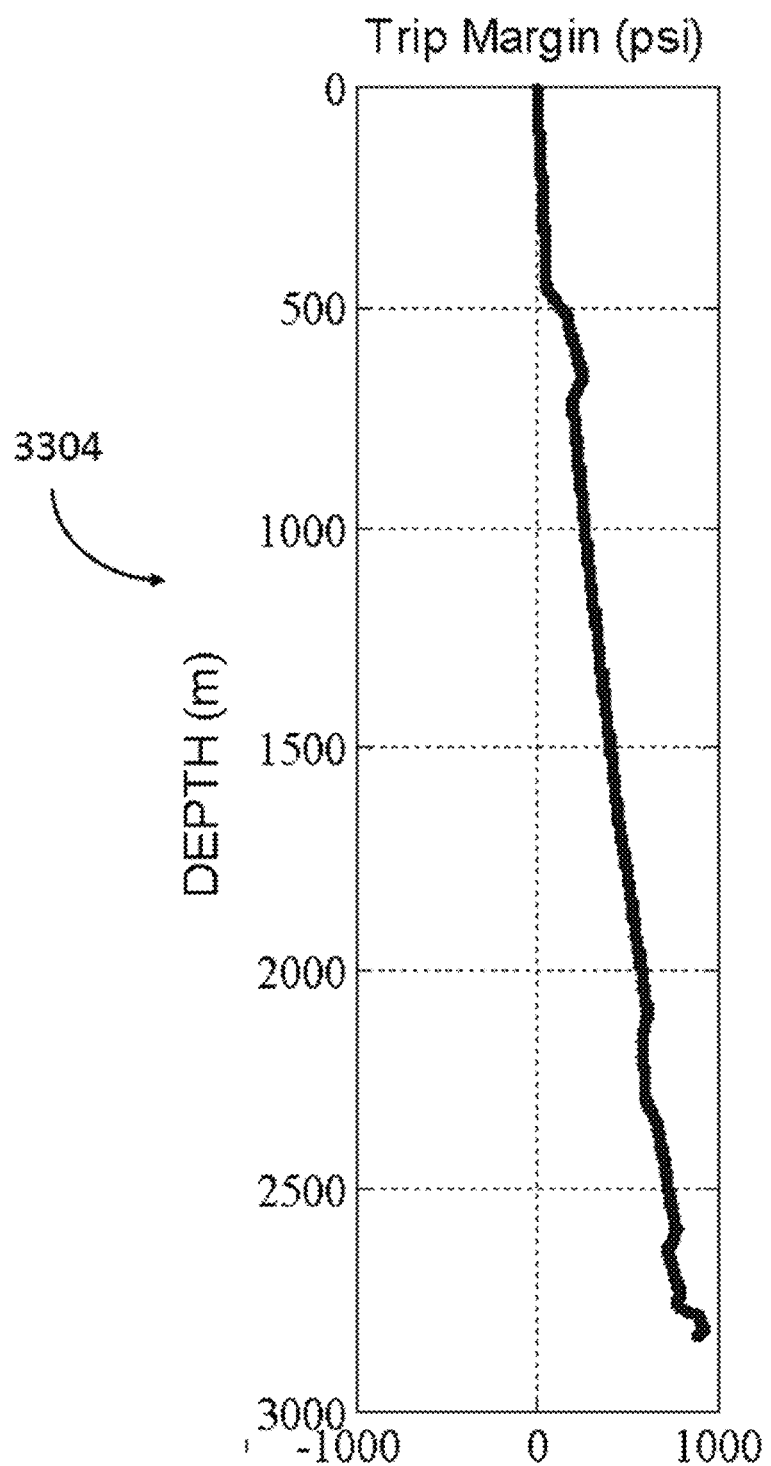
FIG. 17d shows a calculated trip margin for Well #2 according to an embodiment of the present invention.
Figure 18A:
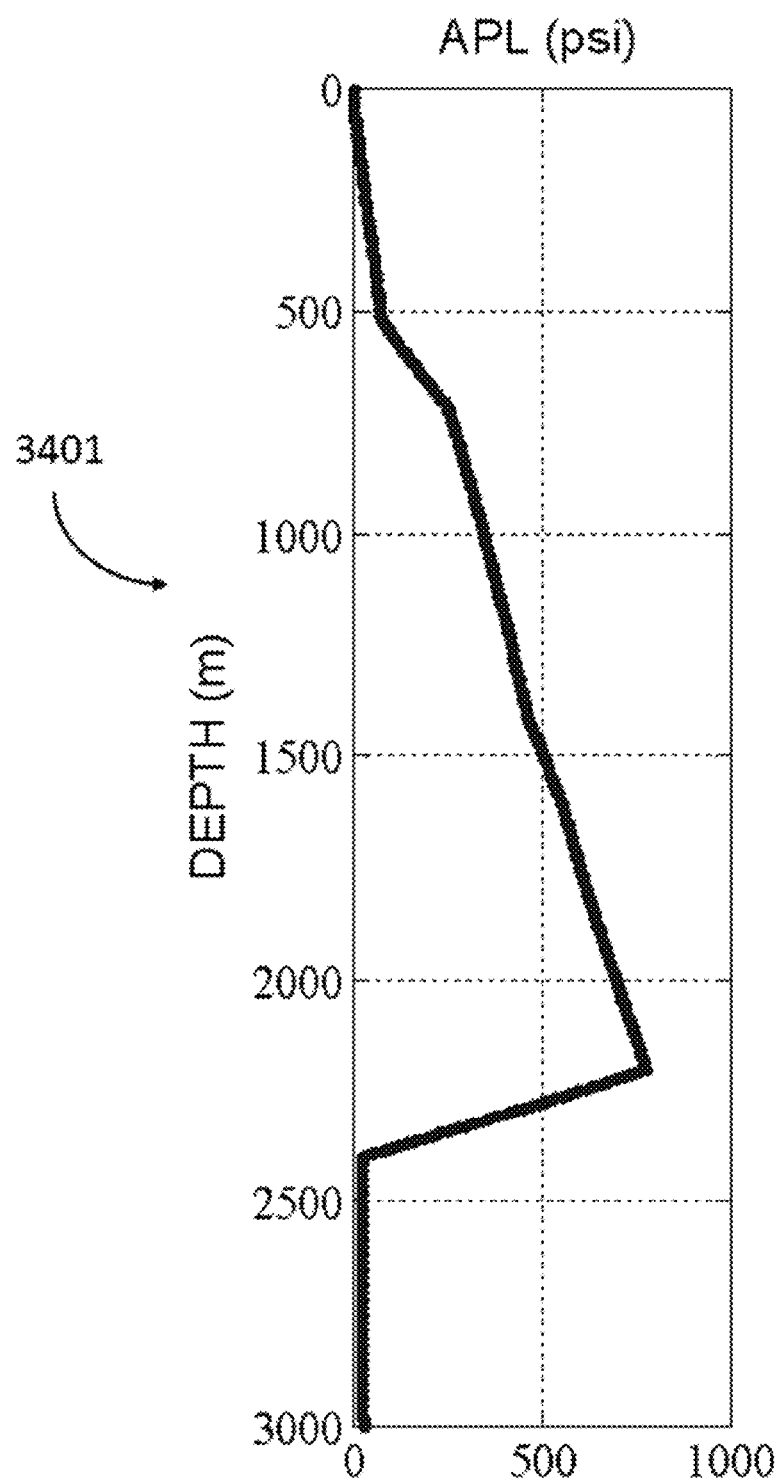
FIG. 18a shows a calculated annular pressure loss (APL) for Well #3 according to an embodiment of the present invention.
Figure 18B:
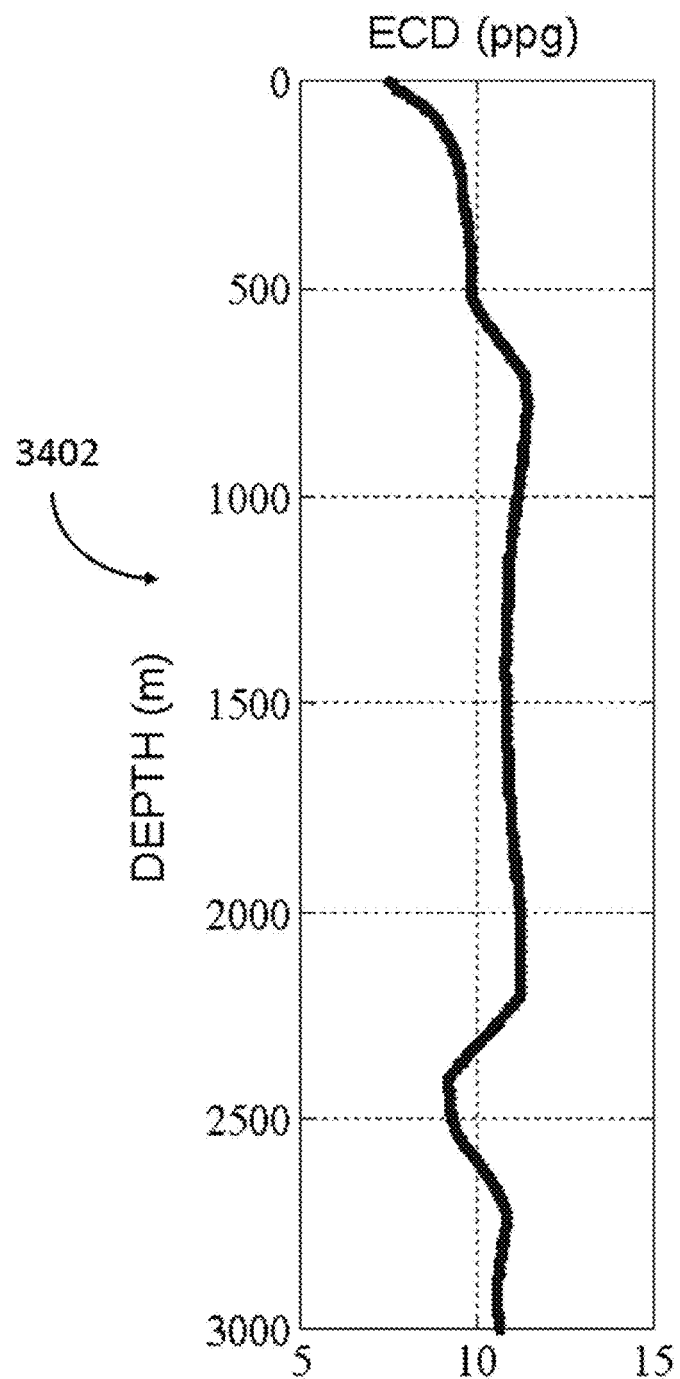
FIG. 18b shows a calculated equivalent circulatory density (ECD) for Well #3 according to an embodiment of the present invention.
Figure 18C:
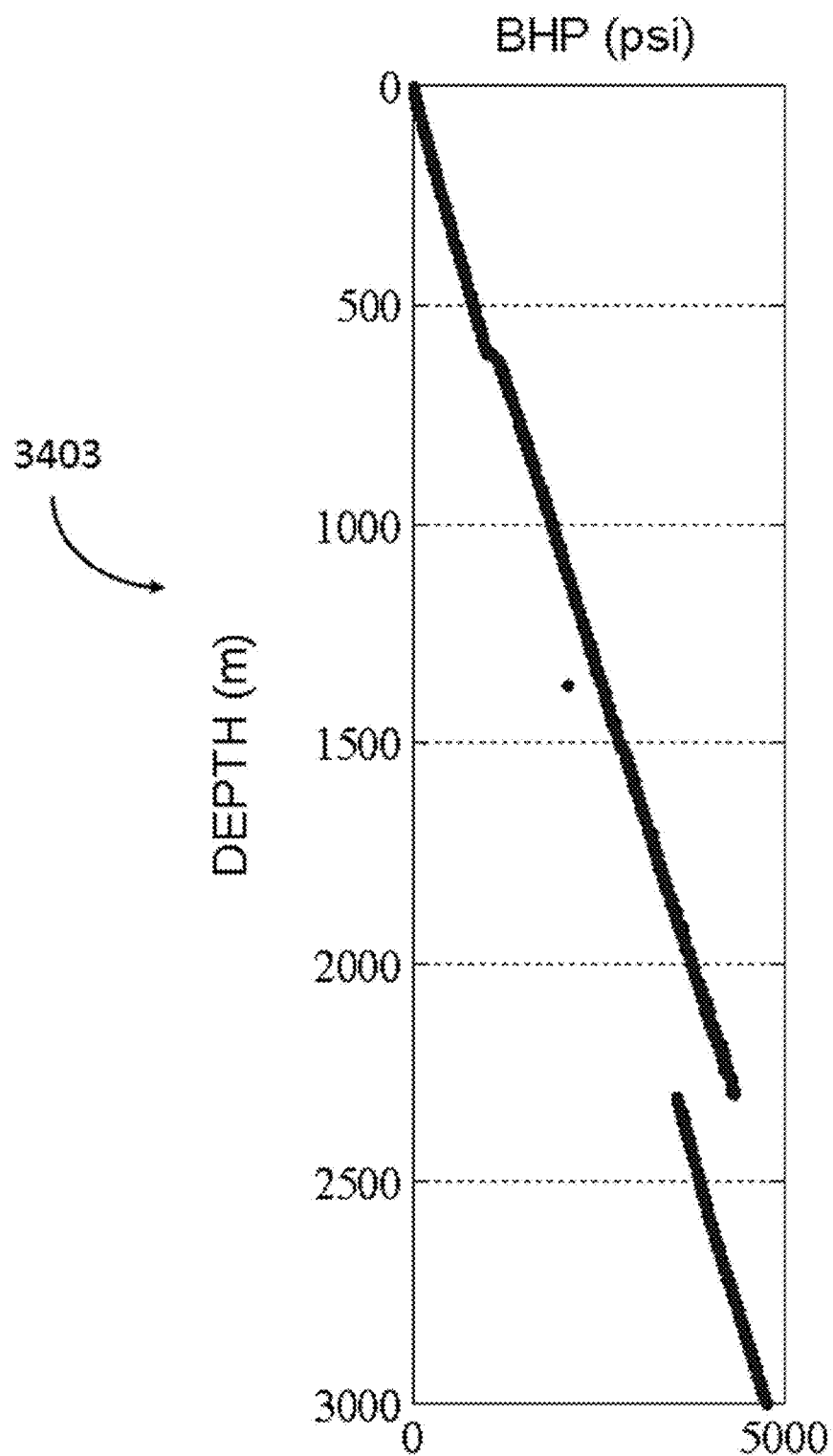
FIG. 18c shows a bottom hole pressure (BHP) for Well #3 according to an embodiment of the present invention.
Figure 18D:
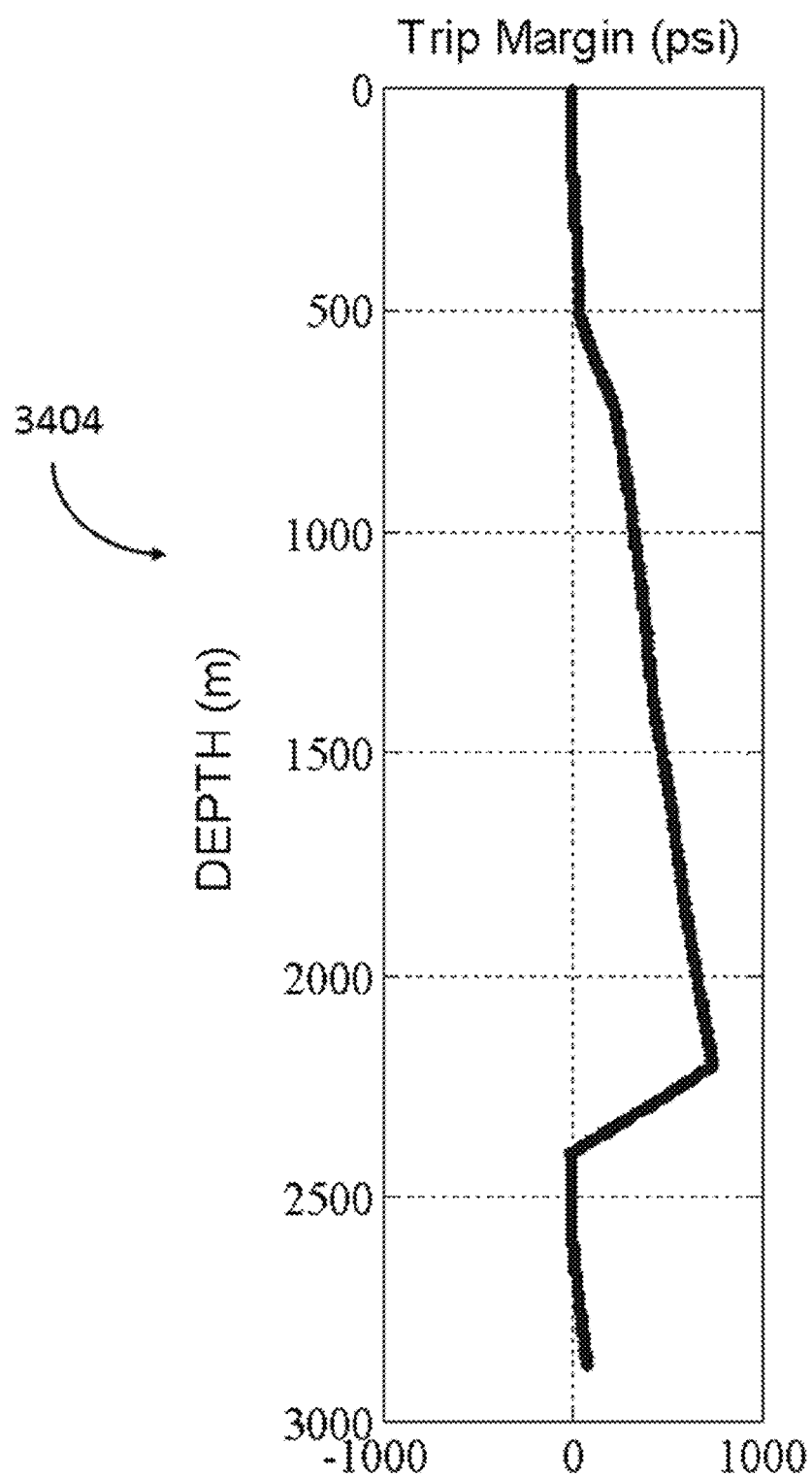
FIG. 18d shows a calculated trip margin for Well #3 according to an embodiment of the present invention.

Dynamic hydraulic parameters, including annular pressure loss, equivalent circulatory density and trip margin were calculated using an embodiment of the invention for Well #1, Well #2, and Well #3. FIGS. 16a, 17a, and 18a show calculated annular pressure loss (APL) 3201, 3301 and 3401 for Well #1, Well #2, and Well #3. FIGS. 16b, 17b, and 18b show calculated equivalent circulatory density (ECD) 3202, 3302 and 3402 for Well #1, Well #2, and Well #3. FIGS. 16c, 17c, and 18c show a bottom hole pressure (BHP) 3203, 3303 and 3403 for Well #1, Well #2, and Well #3. FIGS. 16d, 17d, and 18d show calculated trip margin 3204, 3304, 3404 for Well #1, Well #2, and Well #3.

Rotating Friction Coefficient Estimation

According to an embodiment, friction may also be considered in drilling operations as the drill string is tripped in or out, or rotated on or off bottom. Friction may affect the solid mechanics calculations, such as torque 2073 and drag 2052, as well as the hydraulics calculations, including surge, swab, and hook load estimation during cementing. Beyond the conventional torque and drag calculation model such as described in C. A. Johancsik et al., "Torque and drag in directional wells-prediction and measurement", June 1984, SPE 11380 and M. Lesage et al., "Evaluating drilling practice in deviated wells with torque and weight data", 1988, SPE 16114, a further model incorporating both the sliding and rolling velocities for rotating friction factor estimation as described in R. Samuel, "Friction factors: what are they for torque, drag, vibration, bottom hole assembly and transient surge/swarb analysis", February 2010, SPE 128059, and R. F. Mitchell et al., "How good is the torque/drag model?", 2009, SPE 105068, all incorporated by reference herein, may be employed as set out below:

The friction coefficient is defined as:
Coefficient of Friction µ (COF)

$$\mu = \frac{F_f}{F_n}$$

$F_f$: frictional force acting at the point of contact
$F_n$: normal force acting at the point of contact The drill string may be simultaneously rotated and tripped in or out and it may also be simultaneously rotated and reciprocated. The drag force can thus be given as:

$$T = \mu_v \times F_n \times r \times \cos\varphi \times \frac{|\omega|}{|V_{rs}|}$$

During rotation, the pipe tends to climb to the high side of the wellbore, and reaches an equilibrium angle of $\varphi = \tan^{-1} \mu_v$, where the friction force is balanced. Consequently, the force can be described as $$T = \frac{\mu_v}{\sqrt{1+\mu_v^2}} \times F_n \times r \times \frac{|\omega|}{|V_{rs}|}$$

where $|V_{rs}|$ resultant velocity of a contact point on the drill string $$|\omega| \text{ angular velocity} = \text{diameter} \times \pi \times \frac{\text{pipe rotation velocity}}{60}$$

r: radius of the component

Figure 19:
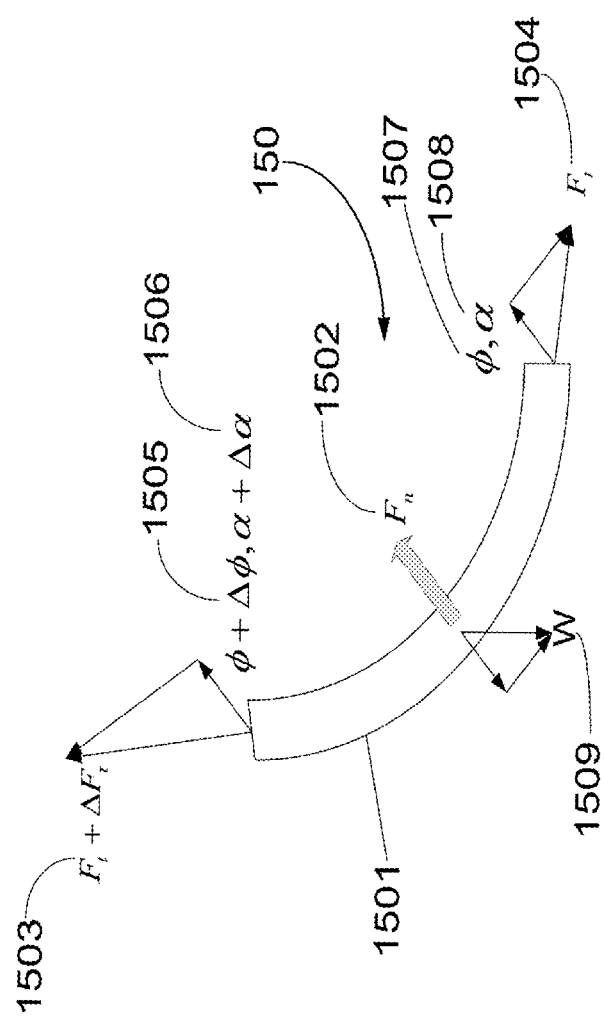
FIG. 19 is a diagram depicting a force balance on a drill string element according to an embodiment of the present invention.

As a result, the rotary friction coefficients may be estimated from the above equation, which will lead to the calculation of $F_n$. The entire drill string may be segmented into small elements (e.g., 0.2 m per segment), and the calculation starts at the bottom of the drill string and proceeds stepwise upward. Each short element of the drill string contributes small increments of axial and torsional load. FIG. 19 shows the forces acting on a short, slightly-curved element. The net normal force $F_n$ is the negative vector sum of normal components from the weight, W, and from the two tension forces, $F_t$ and $F_t+\Delta F_t$. The magnitude of the normal force is $$F_n = [(F_t \Delta \alpha \sin \overline{\varphi})^2 + (F_t \Delta \varphi + W \sin \overline{\varphi})^2]^{1/2}$$

where α: azimuth angle at lower end of drill string elements (degree)

Δα: increase in azimuth angle over length of element (degree)

φ: inclination angle at lower end of drill string element (degree)

Δφ: increase in inclination angle over length of element (degree)

$\overline{\varphi}$: average inclination angle of element (degree)

For drill collars and coiled tubing, the outside diameter of the drill collar or coiled tubing may be used to calculate the values in the above equation. For drill pipe, heavy weight and casing, the outside diameter of the tool joint may be used. The calculation of normal force may be done by estimation of Bouyed weight of each element together with the real-time inclination and azimuth information.

FIG. 19 shows a force balance 150 on a drill string element 1501. Normal force 1502 results from the combination of the two tension forces, $F_t$ 1504 and $F_t+\Delta F_t$ 1503. As shown, $F_t+\Delta F_t$ 1503, is comprised of component forces φ+Δφ 1505 and α+Δα 1506 and $F_t$ 1504 is comprised of component forces φ 1507 and α 1508.

Figure 20:
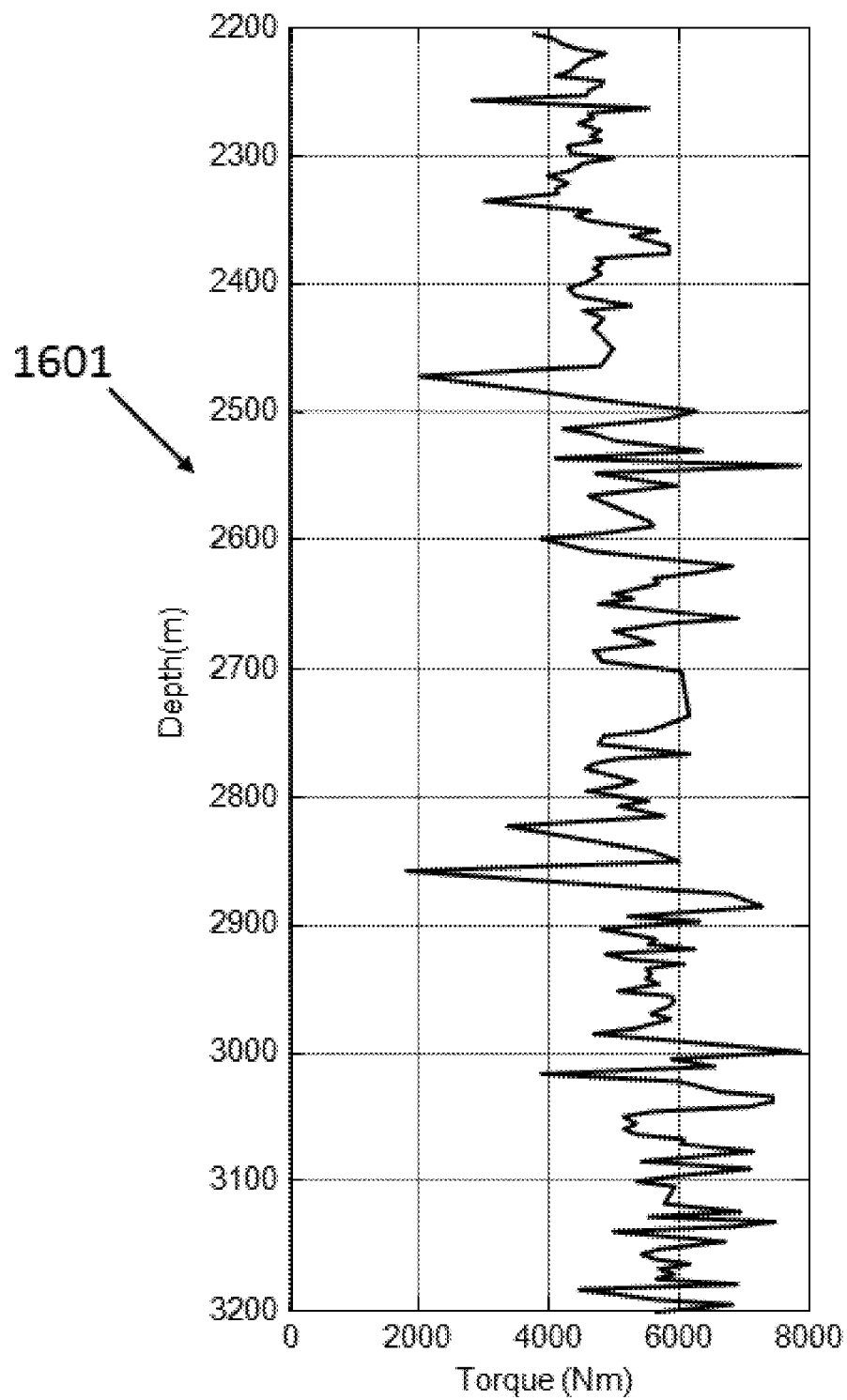
FIG. 20 is a diagram depicting measured real-time drilling torque for Well #2 according to an embodiment of the present invention.
Figure 21:
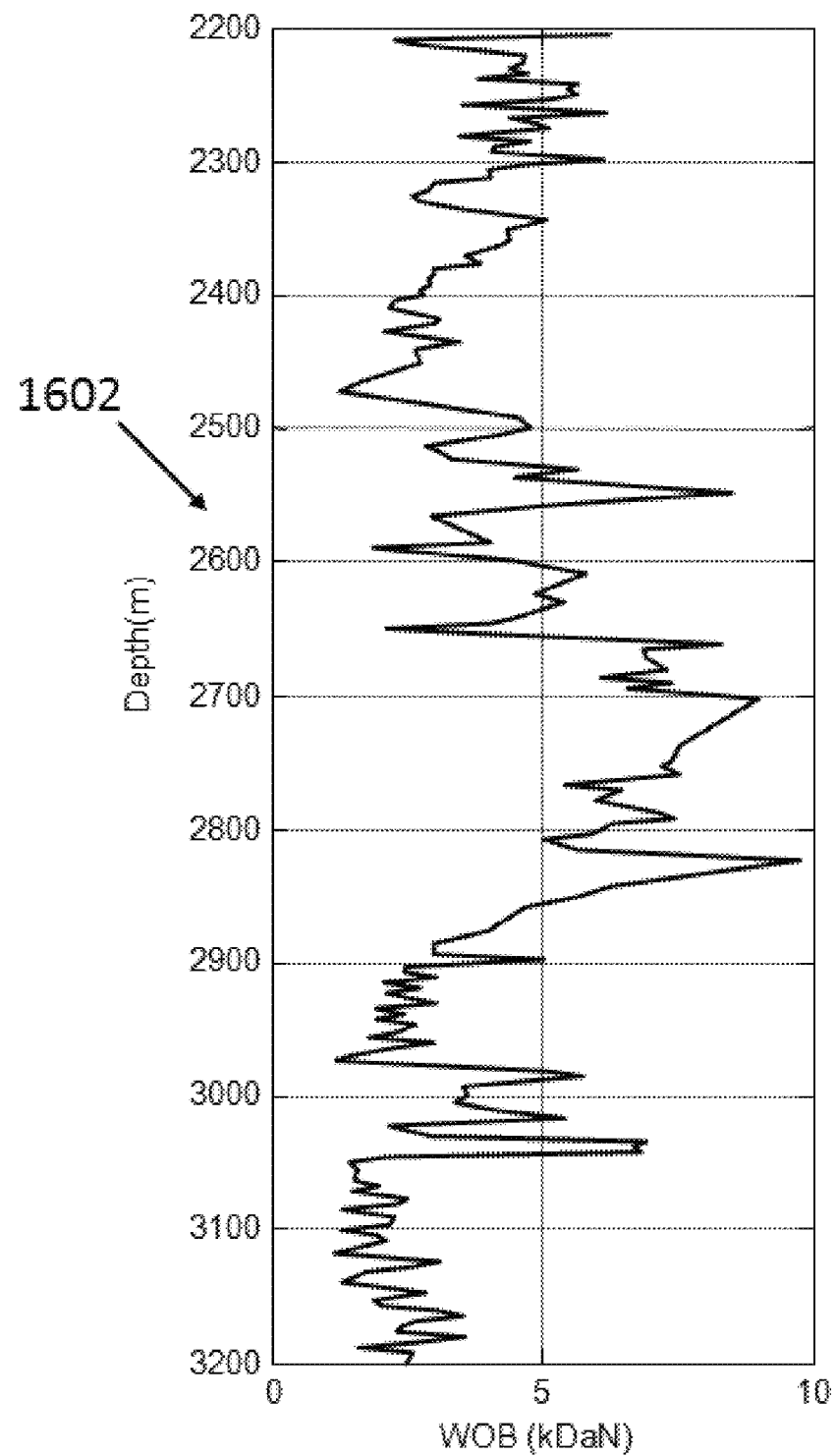
FIG. 21 is a diagram depicting WOB data for Well #2 according to an embodiment of the present invention.
Figure 22:
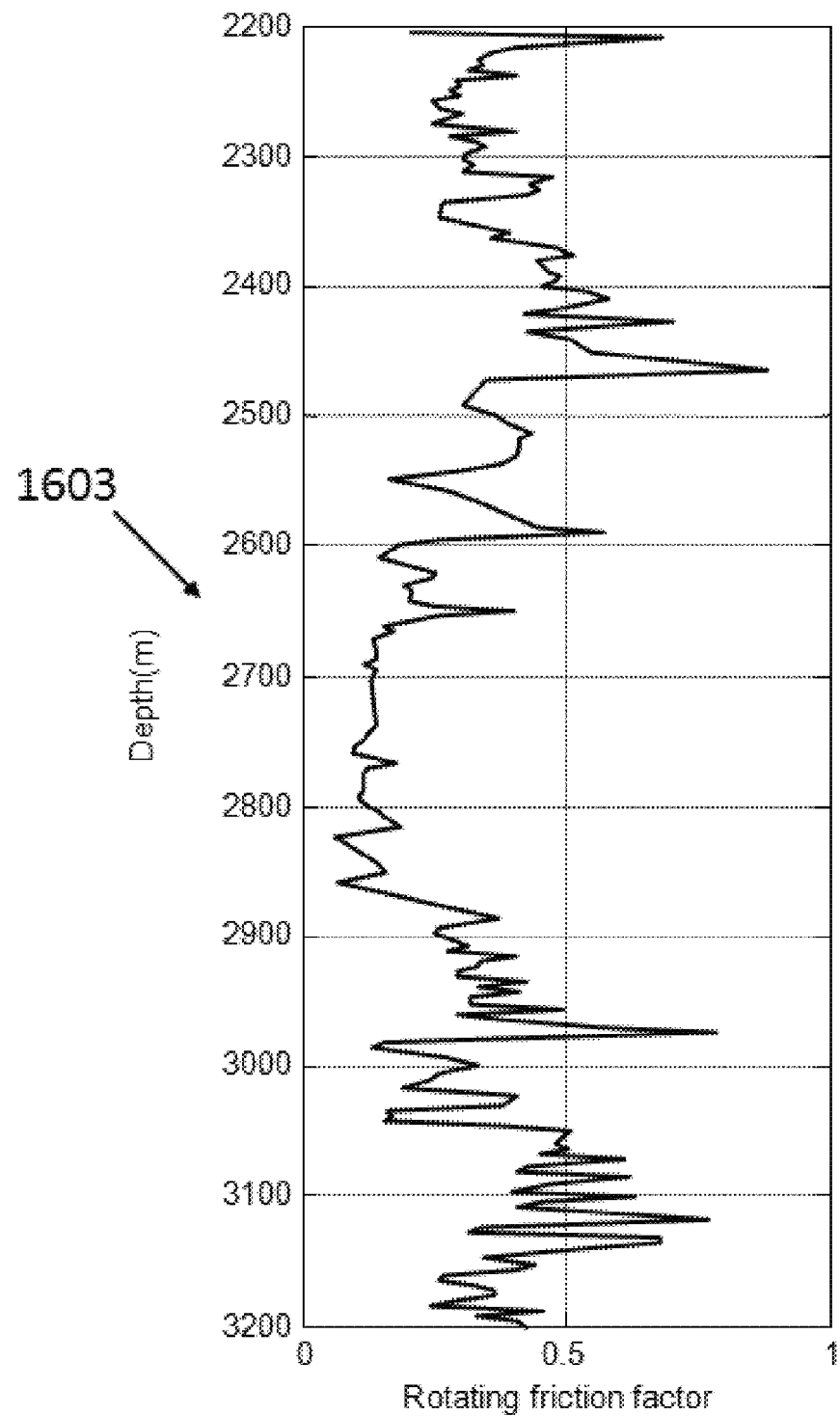
FIG. 22 is a diagram depicting estimated rotating friction factor for Well #2 according to an embodiment of the present invention.

Sample data from Well #1 was applied using an embodiment of the invention and resulted in the estimation results as shown in FIGS. 20, 21, and 22. FIGS. 20 and 21 display the measured real-time drilling data, torque 1601 (FIG. 20) and WOB 1602 (FIG. 21). FIG. 22 displays the resulting estimated rotary friction factor 1603 for the sample data.

Permeability Estimation

If neutron-density log 2046 data is available, the porosity 2075 may be taken from the compensated neutron porosity value. The permeability 2076 may be calculated based on empirical porosity-permeability correlation models as described in A. Aziz et al., "Permeability prediction: core vs log derived values", 1995 International Conference on Geology, Geotechnology and Mineral Resources of Indochina, B. Balan et al., "State-of-the-art in the permeability determination from well log data part 1: a comparative study, model development", 1995, SPE 30978, S. Mohaghegh et al., "State-of-the-art in permeability determination from well log data part 2: verifiable, accurate permeability predictions, the touch-stone of all models", 1995, SPE 30979, U. Ahemd et al., "Permeability estimation: the various sources and their interrelationships", 1991, SPE 19604 and A. Timur, "An investigation of permeability, porosity and residual water saturation relationships for sandstone reservoirs", The Log Analyst 1968, all of which are hereby incorporated by reference. The model may include an irreducible water saturation ($S_{wi}$) value, as detailed below.

$$K^{1/2} = 100 \frac{\phi^2 (1-S_{wi})}{S_{wi}} (ref: \text{Coates 1981})$$

K: permeability (md)

φ: porosity (fractional)

$S_{wi}$: irreducible water saturation (fractional)

Figure 23:
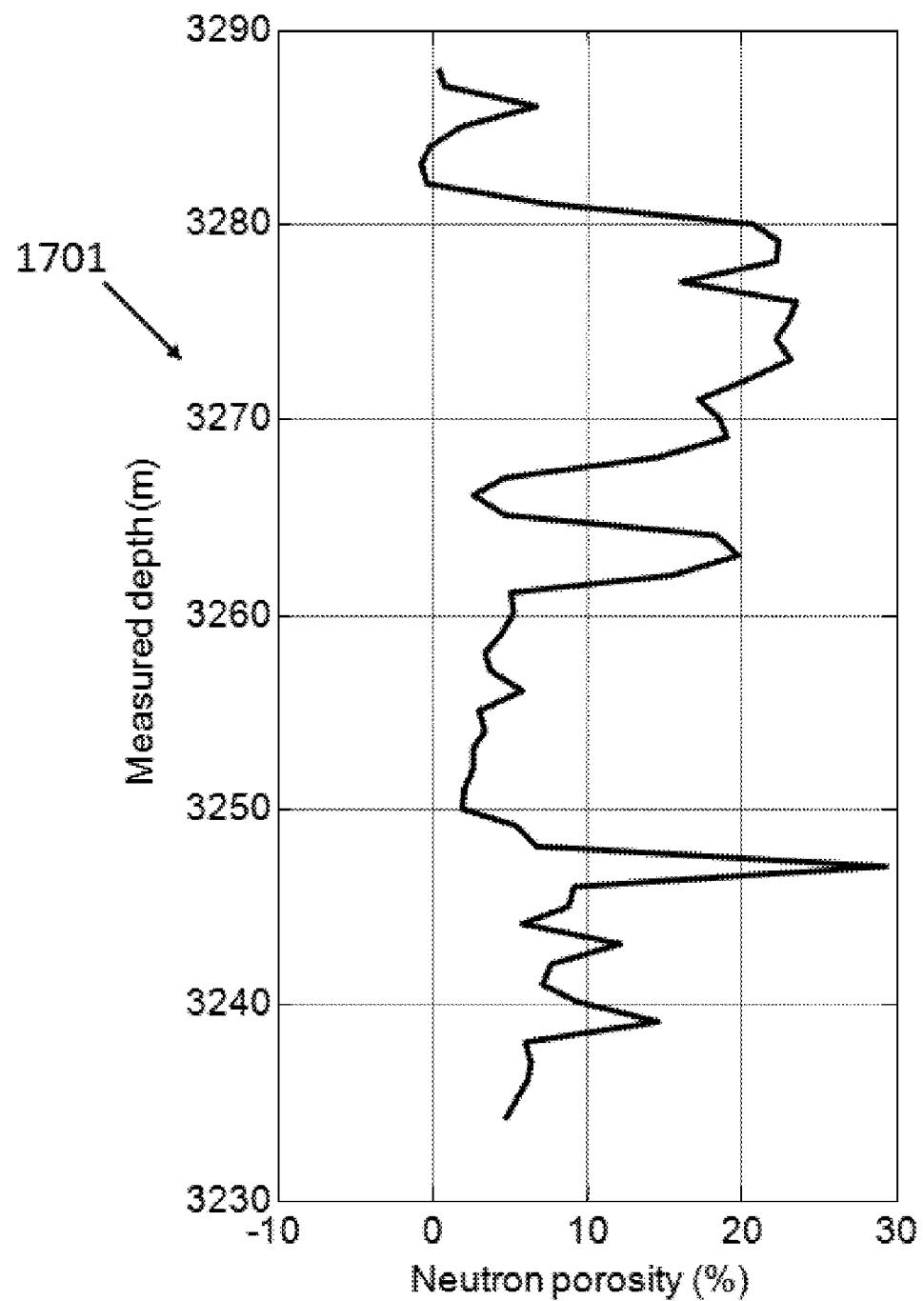
FIG. 23 is a diagram depicting measured neutron porosity for an interval of Well #2 according to an embodiment of the present invention.

According to an embodiment, FIG. 24 shows the calculated permeability 1702 based on the neutron porosity 1701 shown on FIG. 23 using an average $S_{wi}$ value of 21% for Well #1. Further, real-time $S_{wi}$ may be estimated if a neutron magnetic resonance log is available. That is, the water saturation may be either obtained from direct measurement data, or from the estimation using the neutron magnetic resonance log data.

Volumes, Capacities & Displacements

According to an embodiment, the volumes 3245, capacities and displacements calculations may provide fundamental indications leading to potential safety issues. These calculations, together with the permeability 2076 & porosity 2075, lithology prediction 2057, pore pressure estimation 2053, may serve as the combined inputs to the expert knowledge system to address a variety of safety issues during drilling.

According to an embodiment, the system may include pressure control calculations, in which the kill sheets and its related calculations may be carried out. These may involve the following calculations:

Drill string & annulus capacities

Drill string & annulus volumes

Total volumes

Surface to bit strokes & time

Bit to shoe strokes & time

Maximum mud weight

Maximum allowable annulus surface pressure

Kill mud

Pressure step down

Figure 24A:
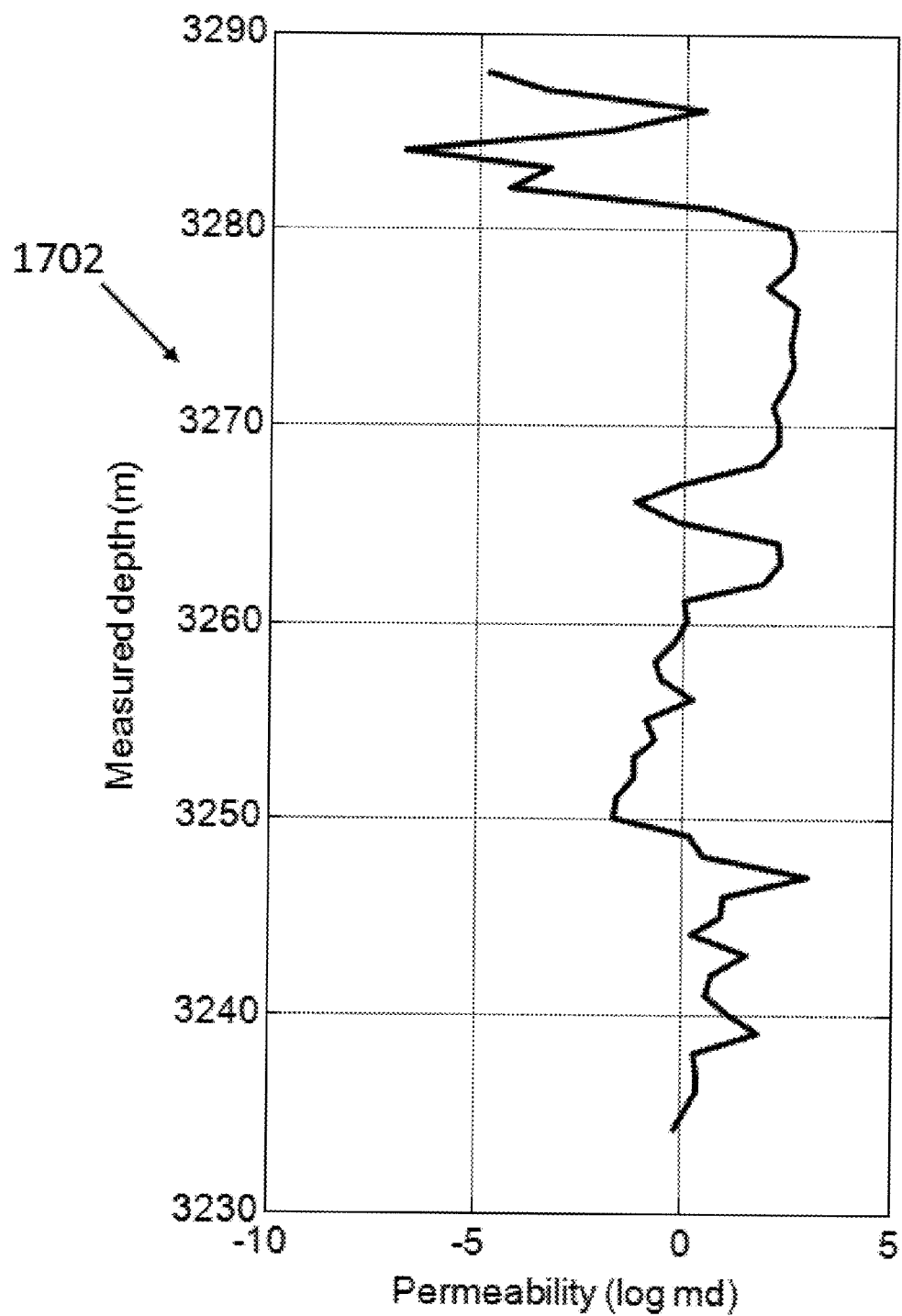
FIG. 24a is a diagram depicting estimated permeability for an interval of Well #2 according to an embodiment of the present invention.
Figure 24C:
FIG. 24c shows a portion of the tour sheet of Well #1 relating to the drilling assembly according to an embodiment of the present invention.
Figure 24D:
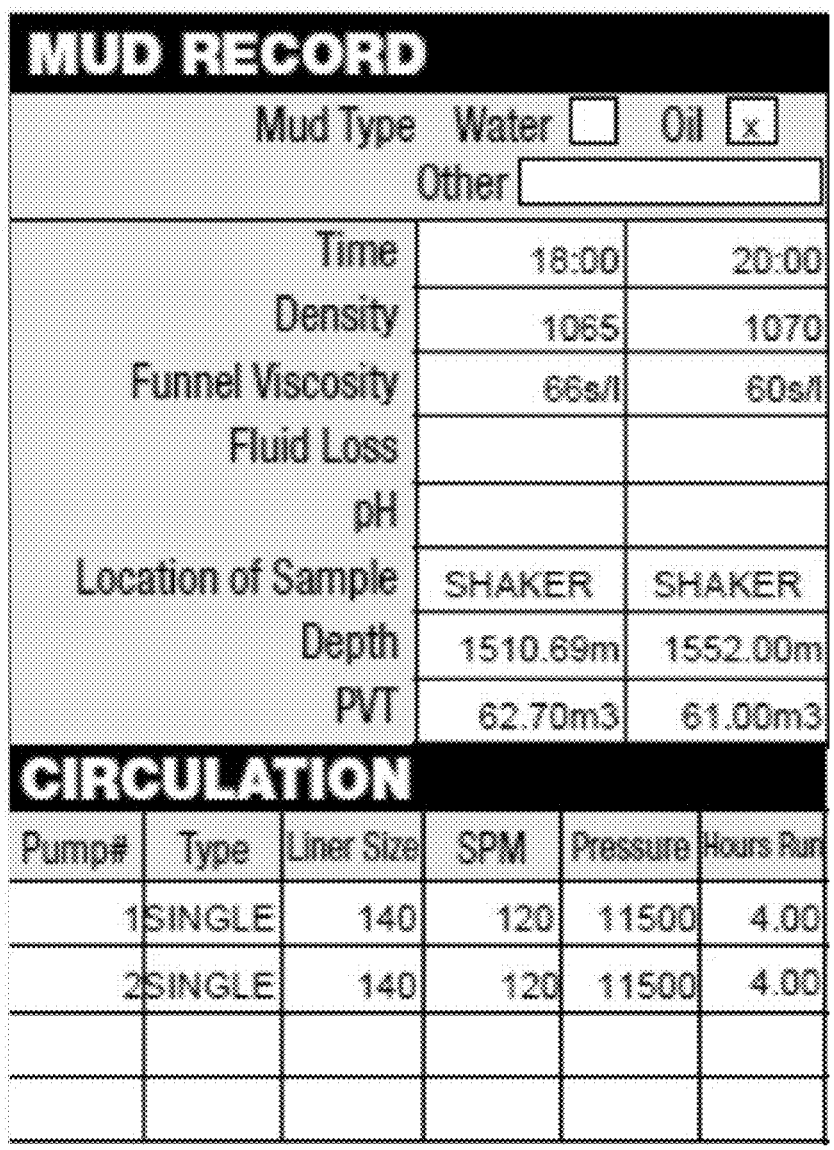
FIG. 24d shows a portion of the tour sheet of Well #1 relating to the mud record and circulation according to an embodiment of the present invention.
Figure 24E:
FIG. 24e shows a portion of the tour sheet of Well #1 relating to reduced pump speed according to an embodiment of the present invention.
Figure 24F:
FIG. 24f shows calculations displayed to the user for kill sheet #1 according to an embodiment of the present invention.
Figure 24G:
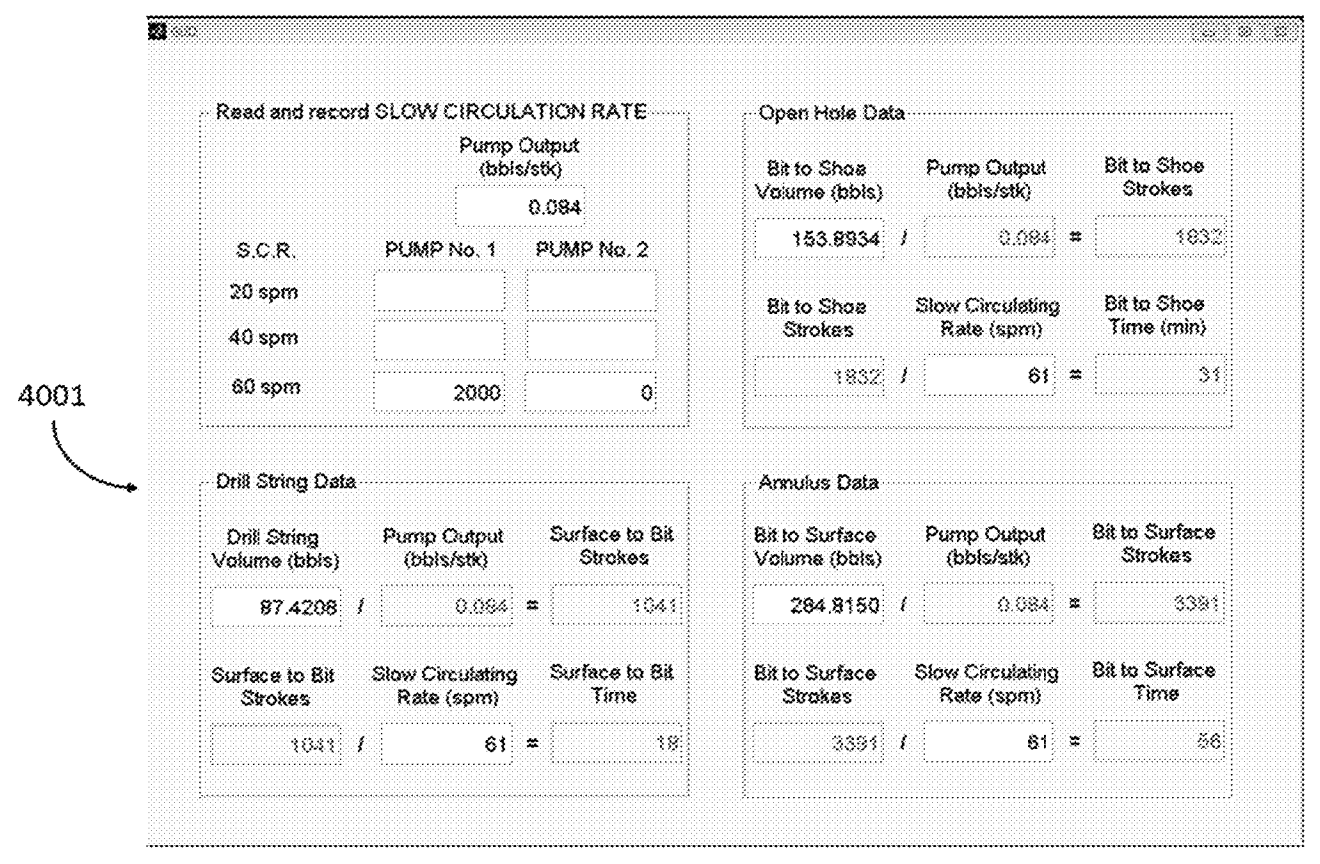
Figure 24I:
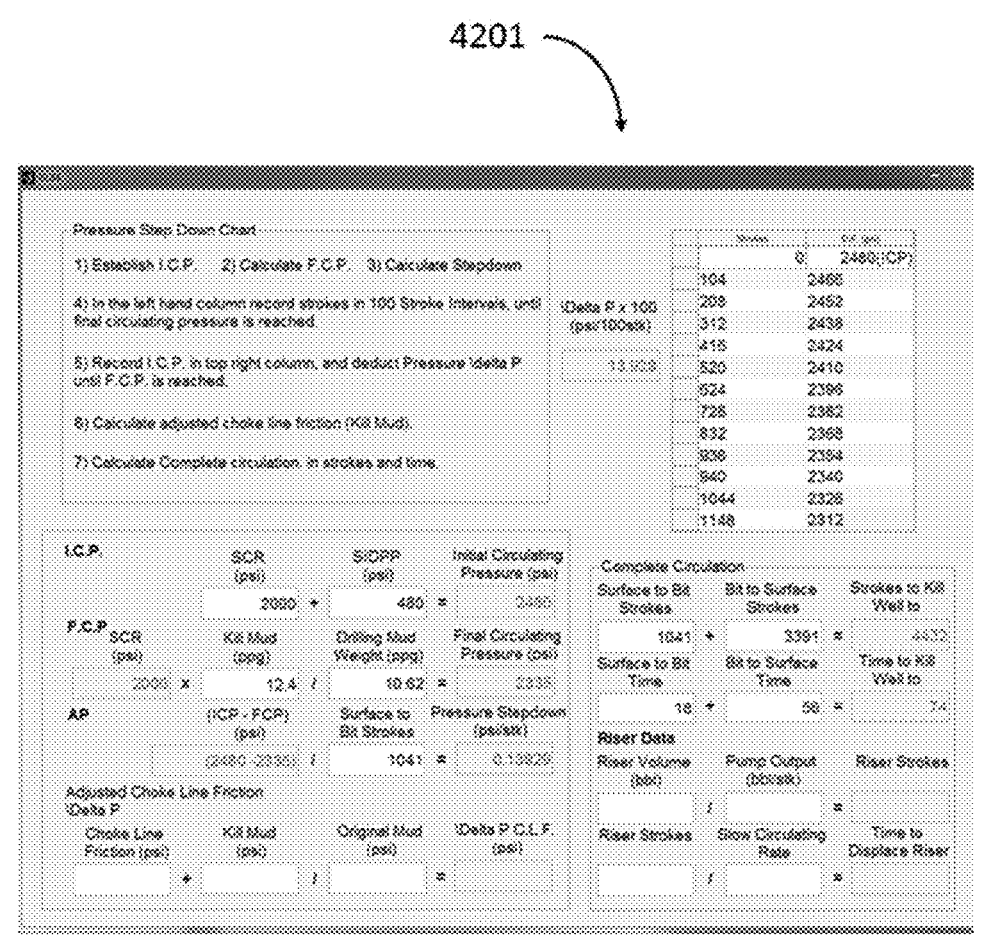
Figure 241:
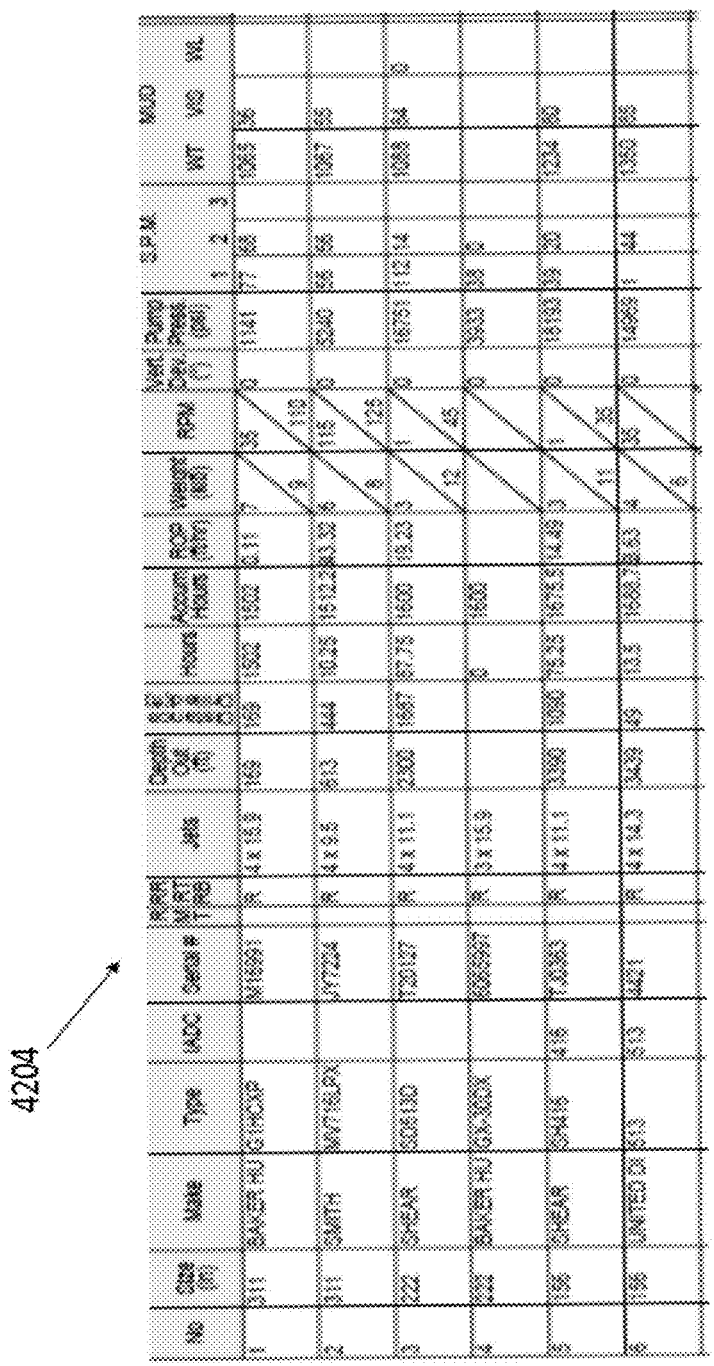

Table 13 lists the calculations in the kill sheet for the pressure control according to an embodiment of the present invention. The calculation was performed with the three sets of sample well data and the results from Well #1 are provided as an example. The pre-recorded data for the calculation may be read from the oilfield instrumentation and data acquisition systems tour sheet and drilling software database software. The snapshots of the relevant data are shown in FIGS. 24b, 24c, 24d, and 24e. FIG. 24b shows the front page summary of a tour sheet for Well #1 3501, FIG. 24c shows the drilling assembly portion of a tour sheet for Well #1 3601, FIG. 24d shows the mud record and circulation portions of a tour sheet for Well #1 3701, and FIG. 24e shows the reduced pump speed portion of a tour sheet for Well #1 3801. Table 14 shows the casing summaries read from the geology report. The calculation results are shown in FIGS. 24f, 24g, 24h, and 24i. FIG. 24f shows a user interface display of calculations for kill sheet #1 3901, FIG. 24g shows a user interface display of calculations for kill sheet #2 4001, FIG. 24h shows a user interface display of calculations for kill sheet #3 4101 and FIG. 24i shows a user interface display of calculations for kill sheet #4 4201.

TABLE 13

Volumes, capabilities & displacements calculation

Prerecorded data

Original mud weight (OMW) [ppg]
Measured depth (MD) [ft]
Kill rate pressure (KRP) [psi] @ rate [spm]
Drill string volume [bbl]

Drilling pipe capacity [bbl/ft] × length [ft]
HWDP capacity [bbl/ft] × length [ft]
Drill collar capacity [bbl/ft] × length [ft]
Annular volume [bbl]

Drill collar/open hole capacity [bbl/ft] × length [ft]
Drill pipe/HWDP open hole capacity [bbl/ft] × length [ft]
Drill pipe/casing capacity [bbl/ft] × length [ft]
Pump data Pump output [bbl/stk]@ efficiency [%]
Surface to bit strokes [stk] = Drill string volume [bbl]/pump output [bbl/stk]
Bit to casing shoe strokes [stk] = Open hole volume[bbl]/pump output[bbl/stk]
Bit to surface strokes [stk] = Annulus volume[bbl]/pump output[bbl/stk]
Kick data SIDPP [psi]
SICP [psi]
Pit gain [bbl]
True vertical depth [ft]
Other critical calculations Kill weight mud (KWM) [ppg] = SIDPP [psi]/0.052/TVD [ft] + OMW [ppg]
Initial circulating pressure (ICP) [psi] = SIDPP [psi] + KRP [psi]
Final circulating pressure (FCP) [psi] = KWM [ppg] × KRP [psi]/OMW [ppg]
Psi/stroke [psi/stk] = ( ICP [psi] − FCP [psi])/strokes to bit

TABLE 14

Casing summary

| Casing type | Casing size | Landed depth | Hole size |
|---|---|---|---|
| Surface | 244.5 | 612.00 | 311.0 |
| Intermediate | 177.8 | 1992.00 | 222.0 |
| Production | 114.4 | 3314.00 | 156.0 |

Cost Estimation

According to an embodiment, one aspect of the software is to recommend drilling procedures which may result in the successful completion of the well as safely and inexpensively as possible. The drilling engineer may make recommendations concerning routine rig operations such as drilling fluid treatment, pump operation, bit selection, and any problems encountered in the drilling operation. In many cases, the use of a drilling cost equation may be useful in making these recommendations. The decision concerning which bit to use often based on some performance criteria, such as total rotating hours, total footage, or maximum penetration rate. Other times, the least expensive bit is chosen. This approach may be satisfactory in areas where practices and costs are constants but it may not be satisfactory where drilling costs are changing, and drilling practices and bit selection vary. The usual procedure may be to break the drilling costs into (1) variable drilling costs and (2) fixed operating expenses that are independent of alternatives being evaluated. Selection of the bit best suited for a specific use may be further complicated by the variable performances and prices of the many types of bits.

According to an embodiment, bit selection may be based on achieving the minimum cost-per-foot. In this way, it may be possible to achieve an optimum relationship between penetration rate, bit footage, rig cost, trip time and bit cost. A common application of a drilling cost formula may be to evaluate the efficiency of a bit run. A large fraction of the time required to complete a well may be spent either drilling or making a trip to replace the bit. The total cost required to drill a given depth $\Delta D$ may be expressed as the sum of the total rotating time during the bit run, $t_b$, the non-rotating time during the bit run, $t_c$, and trip time, $t_t$. The cost-per-foot as related to these variables may be determined by the equation:

$$C_f = \frac{C_b + C_r(t_b + t_c + t_t)}{\Delta D}$$

where
$C_f$ is drilled cost per unit depth,
$C_b$ is the cost of bit, and
$C_r$ is the fixed operating cost of the rig per unit time independent of the alternatives being evaluated.

Figure 24J:
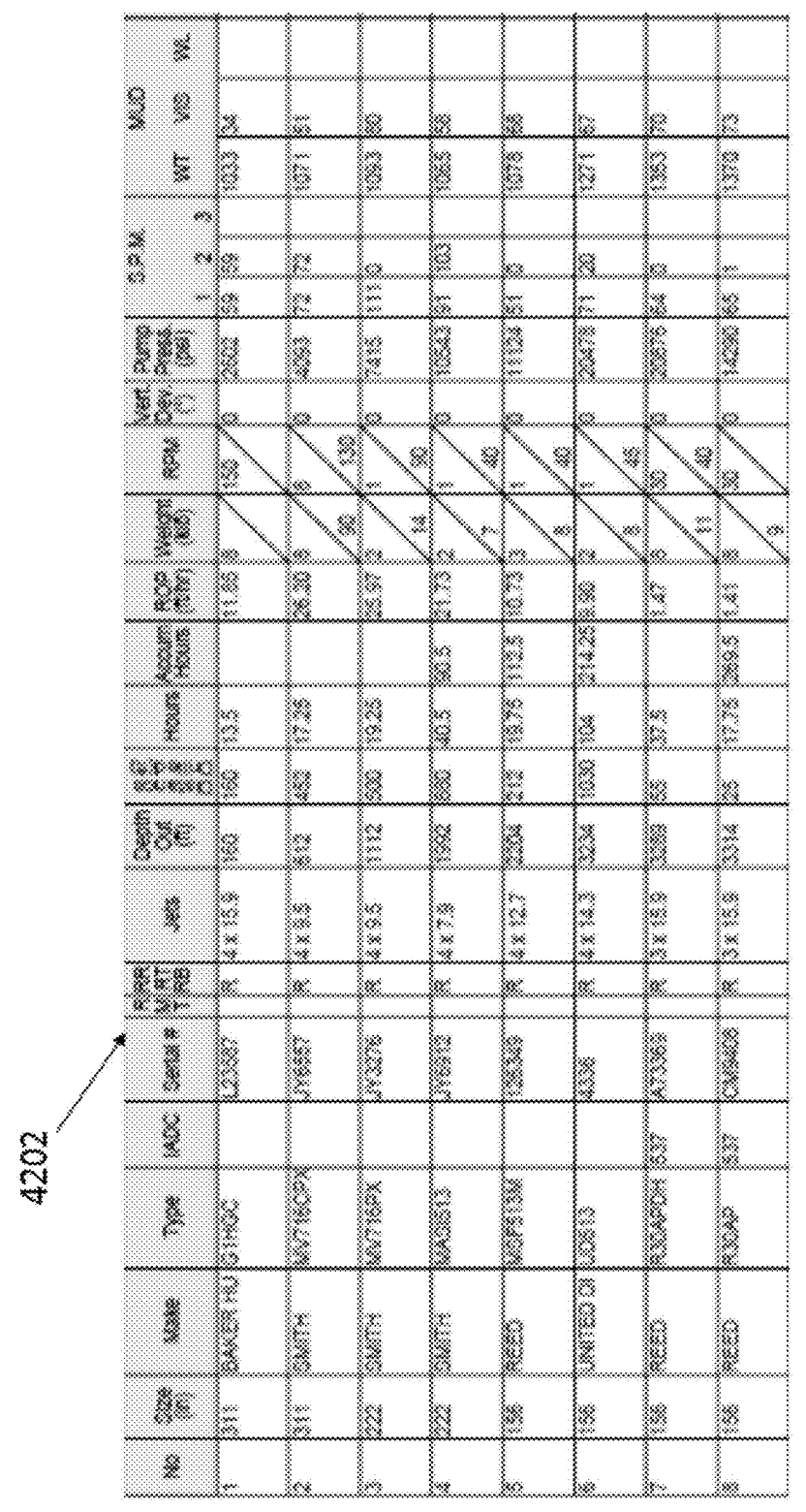
Figure 24K:
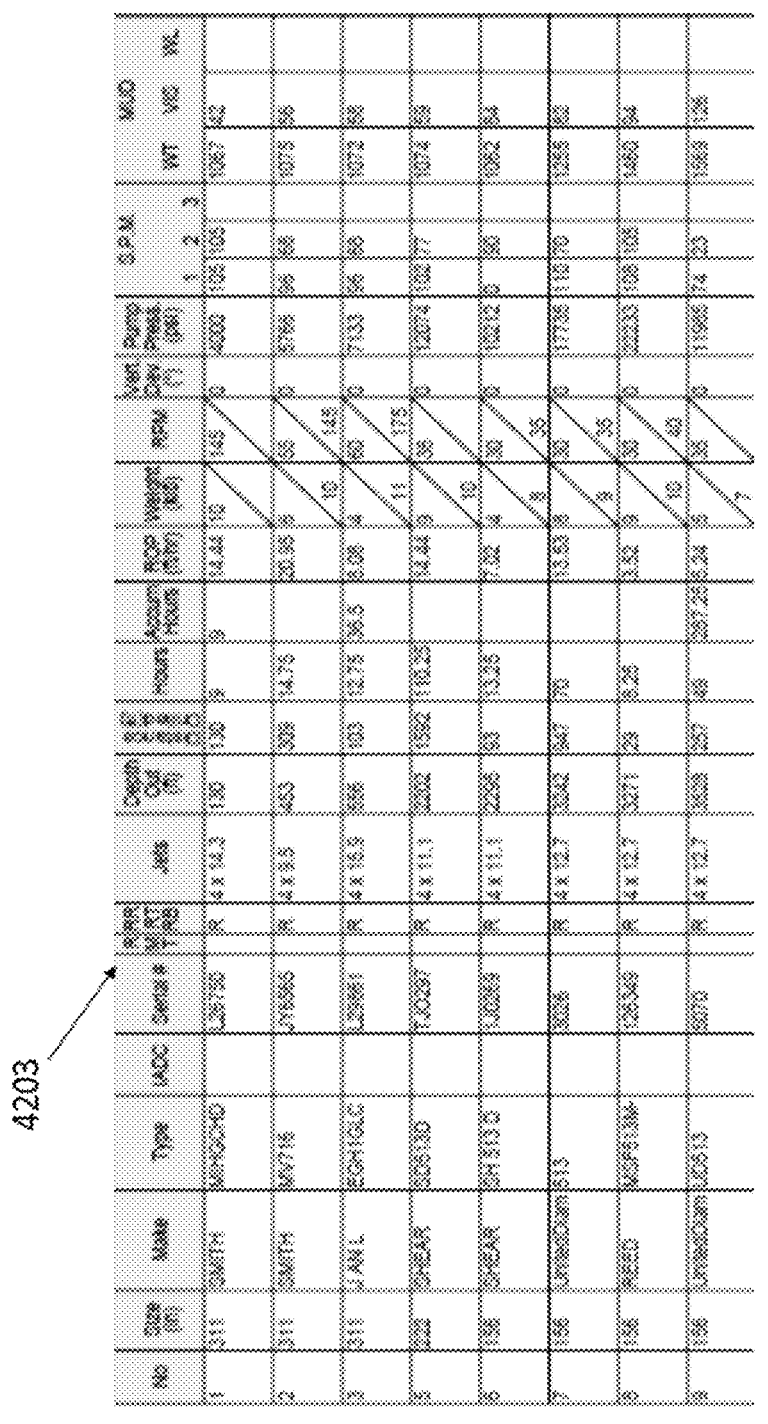

The following are sample calculations of cost-per-foot for bits used in Well #1, Well #2 and Well #3 according to an embodiment. FIGS. 24*j*, 24*k*, and 24*l* display copies of the bit record of Well #1 4202, the bit record of Well #2 4203 and the bit record of Well #3 4204, respectively, which has the information for each bit run including the bit type, hour of running, average ROP, and depth. Tables 15, 17, and 19 list the cost information read from the drilling software. The resulting cost-per-foot analysis results are shown in Tables 16, 18, and 20.

TABLE 15

Cost information of Well #1

| | Bit # | | | | | | | |
|---|---|---|---|---|---|---|---|---|
| | 1 | 2 | 3 | 4 | 5 | 6 | 7 | 8 |
| Bit cost $ | 2500 | 8500 | 14303 | 7920 | 8500 | 9500 | 14520 | 14520 |
| Rig cost/hr $ | 400 | 686 | 686 | 686 | 686 | 686 | 686 | 686 |

TABLE 16

Cost-per-foot calculation results for Well #1

| | Bit # | | | | | | | |
|---|---|---|---|---|---|---|---|---|
| | 1 | 2 | 3 | 4 | 5 | 6 | 7 | 8 |
| Cost-per-foot $ | 49.375 | 45.00 | 55.017 | 40.57 | 104.00 | 78.49 | 731.73 | 1067.86 |

TABLE 17

Cost information of Well #2

| | Bit # | | | | | | | |
|---|---|---|---|---|---|---|---|---|
| | 1 | 2 | 3 | 4 | 5 | 6 | 7 | 8 |
| Bit cost $ | 1450 | 8130 | 2450 | 15920 | 9500 | 9500 | 4000 | 9500 |
| Rig cost/hr $ | 645 | 646 | 646 | 646 | 646 | 646 | 646 | 646 |

TABLE 18

Cost-per-foot calculation results for Well #2

| | Bit # | | | | | | | |
|---|---|---|---|---|---|---|---|---|
| | 1 | 2 | 3 | 4 | 5 | 6 | 7 | 8 |
| Cost-per-foot $ | 55.8 | 57.15 | 103.75 | 54.74 | 194.19 | 57.78 | 321.71 | 160.13 |

TABLE 19

Cost information of Well #3

| | Bit # | | | | |
|---|---|---|---|---|---|
| | 1 | 2 | 3 | 4 | 5 |
| Bit cost $ | 850 | 11500 | 16870 | 10900 | 9500 |
| Rig cost/hr $ | 668 | 686 | 686 | 686 | 686 |

TABLE 20

Cost-per-foot calculation results for Well #3

| | Bit # | | | | |
|---|---|---|---|---|---|
| | 1 | 2 | 3 | 4 | 5 |
| Cost-per-foot $ | 5941.93 | 41.74 | 45.68 | 57.36 | 382.88 |

By using this cost-per-foot formula, a bit may be pulled when it no longer becomes economical to drill with it. When the drilling time-per-foot begins to increase, and the footage drilled-per-time decreases, the cost-per-foot will begin to increase. When that increase is first noticed, it may be economical to pull the bit. But since this drilling cost function ignores risk factors, the results of the cost analysis may also be tempered with engineering judgment. Reducing the cost of a bit run may not necessarily result in lower well costs if the risk of encountering drilling problems such as stuck pipe, hole deviation, hole washout is greatly increased.

Cost-Per-Foot Calculations Including Downhole Motors

When downhole motors are used and charged at an hourly rate, they may be included in the cost equation:

$$C_f = \frac{C_b + C_r(t_b + t_c + t_t) + C_m \cdot t_b}{\Delta D}$$

where $C_m$ refers to the cost per hour of drilling

Target Cost-Per-Foot and Target ROP

According to an embodiment, the above cost-per-foot calculations may also be used in generating performance proposals. A target cost-per-foot may be calculated based on information from offset well performance. If the target is met or exceeded, the motor may be charged at normal list price; if it is not, then the hourly rate may be adjusted downwards (to an agreed minimum) until the target figure is reached. Before a target cost-per-foot is proposed to the operator, the user should be reasonably sure that the operator will be able to achieve a minimum ROP. This ROP may be the drill rate needed to meet both the proposed cost-per-foot figure and the pricing structure. After calculating this target ROP, it may be determined whether the target cost-per-foot is attainable.

From the cost-per-foot calculations including downhole motors, there is provided:

$$t_b = \frac{C_f \cdot \Delta D - C_b - C_r(t_c + t_t)}{C_r + C_m}$$

$$ROP = \frac{\Delta D}{t_d}$$

It should also be noted that all terms in the preceding two formulas are targets. For example, $C_f$ is the target cost-per-foot agreed upon with the user.

Expert Decision Engine

According to an embodiment, the decision making for expert system recommendations for safety concerns while drilling may be based on inputting both historical data from the historical database 309 and adjusted real-time drilling parameters 329 to the expert decision engine 328 which applies a set of expert decision rules in accordance with the decision trees set out below. According to an embodiment, the expert decision engine 328 may include six decision trees: mud volume, porosity, permeability, stuck pipe, bit wear and environmental. Further expert decision trees may be added according to the format described below in the discretion of the operator. The expert decision recommendations may appear as prompts to the user during operation of the client or standalone software through the graphical user interface. Moreover, as discussed by example below, the user may be warned through the graphical user interface of a danger level: green indicates normal, yellow indicates warning, and red indicates dangerous. At the yellow or red danger levels, the graphical user interface display may also flash to alert the user of the issue.

Mud Volume

Figure 25:
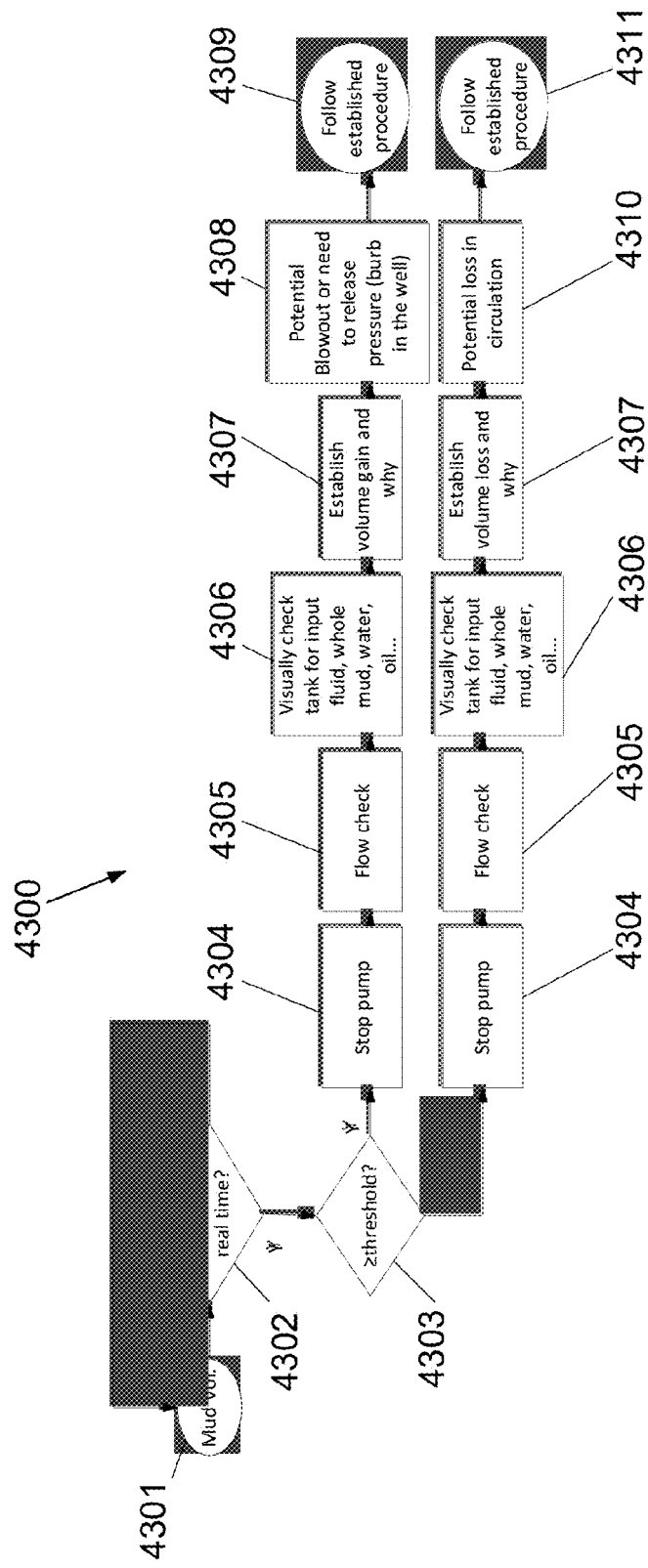
FIG. 25 shows a decision tree of the expert decision engine relating to mud volume according to an embodiment of the present invention.

According to an embodiment as shown in FIG. 25, the mud volume decision tree 4300 monitors for a change of the mud volume parameter in real time 4302 and if the mud volume parameter 4301 is greater or equal to than a defined threshold 4303, the pump is stopped 4304, a flow check is performed 4305, a visual check of the tank for input fluid, whole mud, water, oil, and for flow in the drill pipe and annulus 4306 may occur, volume gain may be established 4307 and the reason therefor such as potential blowout or need to release pressure 4308 or potential loss in circulation 4310, and a procedure in regards of potential blowout or need to release pressure 4309 or a procedure developed by the operator or contractor in regards of potential loss in circulation 4311 may be presented to the user.

According to an embodiment, the defined threshold may be set according to the conditions as follows: 1) if losses are less than 20 barrels per hour, or if company guidelines permit losses of 20 barrels per hour while drilling with a water base mud continue drilling; if losses are greater than 20 barrels per hour, try to heal or fix the loss zone while drilling using 2 to 6 pounds per barrel loss circulation material if there are partial losses. For more extreme losses, but not full losses, stop, mix a tank of whole mud with lost circulation material of 6 plus pounds per barrel; if full losses arise, stop, and evaluate options to fix or stop loss circulation: a. set a plug. There are various types (Di-Seal, GUNK etc.), b. set cement plug across the loss zone, c. drill ahead without circulating (drill ahead blind).

Porosity

Figure 26:
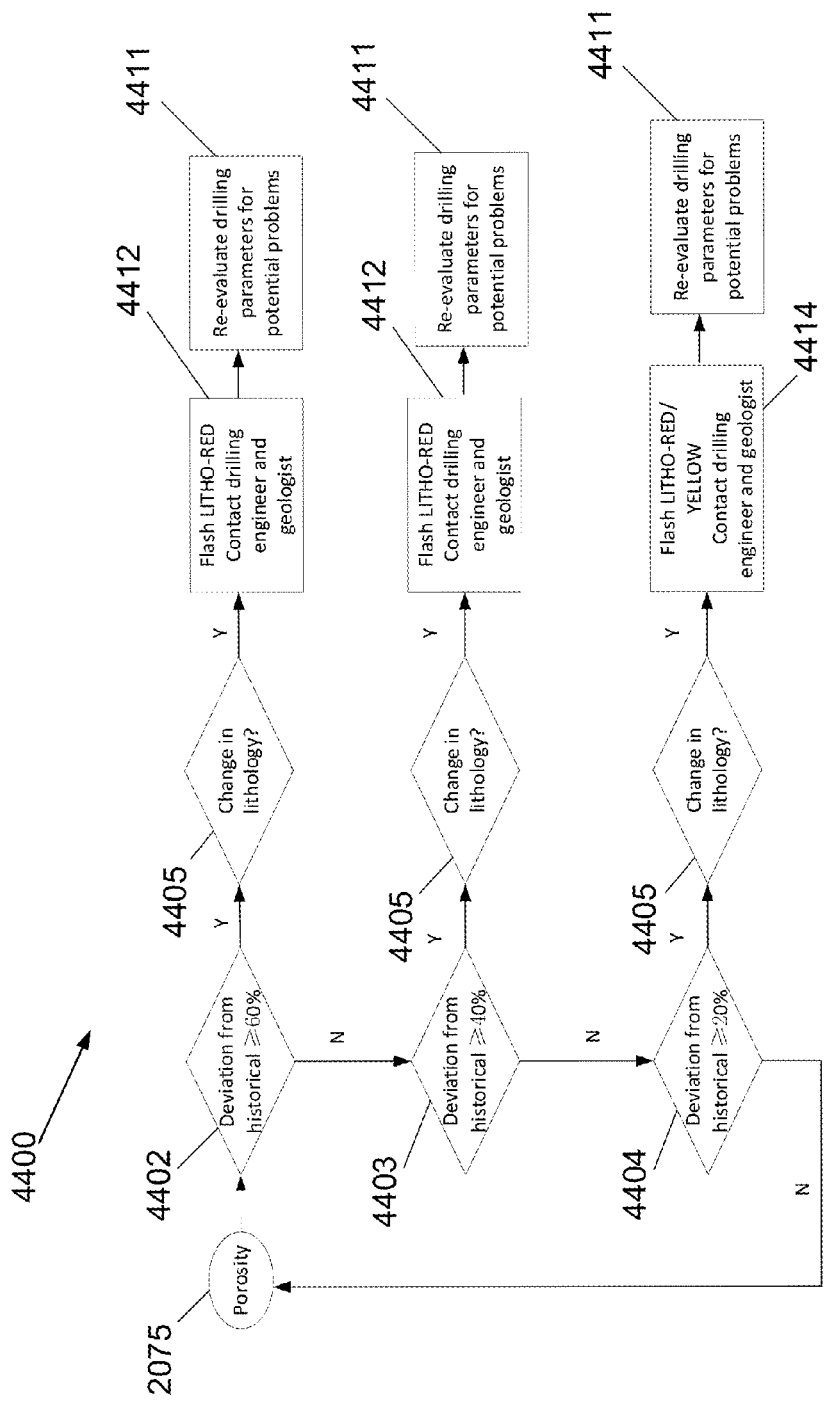
FIG. 26 shows a decision tree of the expert decision engine relating to porosity according to an embodiment of the present invention.

According to an embodiment as shown in FIG. 26, the porosity decision tree 4400 monitors the porosity 2075 parameter for significant deviation from the historical reference value. If the deviation from the historical value is greater or equal to 60% 4402, expert decision engine 328 determines whether there has been a change in lithology 4405 by comparing the predicted lithology type with a lithology sample collected at a particular depth. Once a sample is collected, the resulting variable may be imported into the program via a user interface for comparison. If there has been a change in lithology then the expert decision engine 328 panel may flash litho-red 4412, which reflects both porosity change and lithology change (whereas red reflects porosity variations against the historical porosity records only) and prompt the user to contact the drilling engineer and geologist to re-evaluate the drilling parameters for potential hole problems 4411. If the deviation from the historical value is not greater or equal to 60%, but greater or equal to 40% 4403, it is determined whether there has been a change in the lithology 4405. If there has been a change in the lithology, the expert decision engine 328 panel may flash litho-red and prompt the user to contact the drilling engineer and geologist 4412 to re-evaluate the drilling parameters for potential hole problems 4411. If the deviation from the historical value is not greater or equal to 40%, it is determined whether it is greater or equal to 20% 4404, and if it is, then it is determined whether there has been a change in the lithology 4405. If there has been a change in lithology, the expert decision engine 328 panel may flash litho-red and yellow alternately and prompt the user to contact the drilling engineer and geologist 4414 to re-evaluate the drilling parameters for potential hole problems 4411. A person skilled in the art will appreciate that different thresholds than 60%, 40% and 20% may be used according to embodiments of the invention in the discretion of the operator or user.

Permeability

Figure 27:
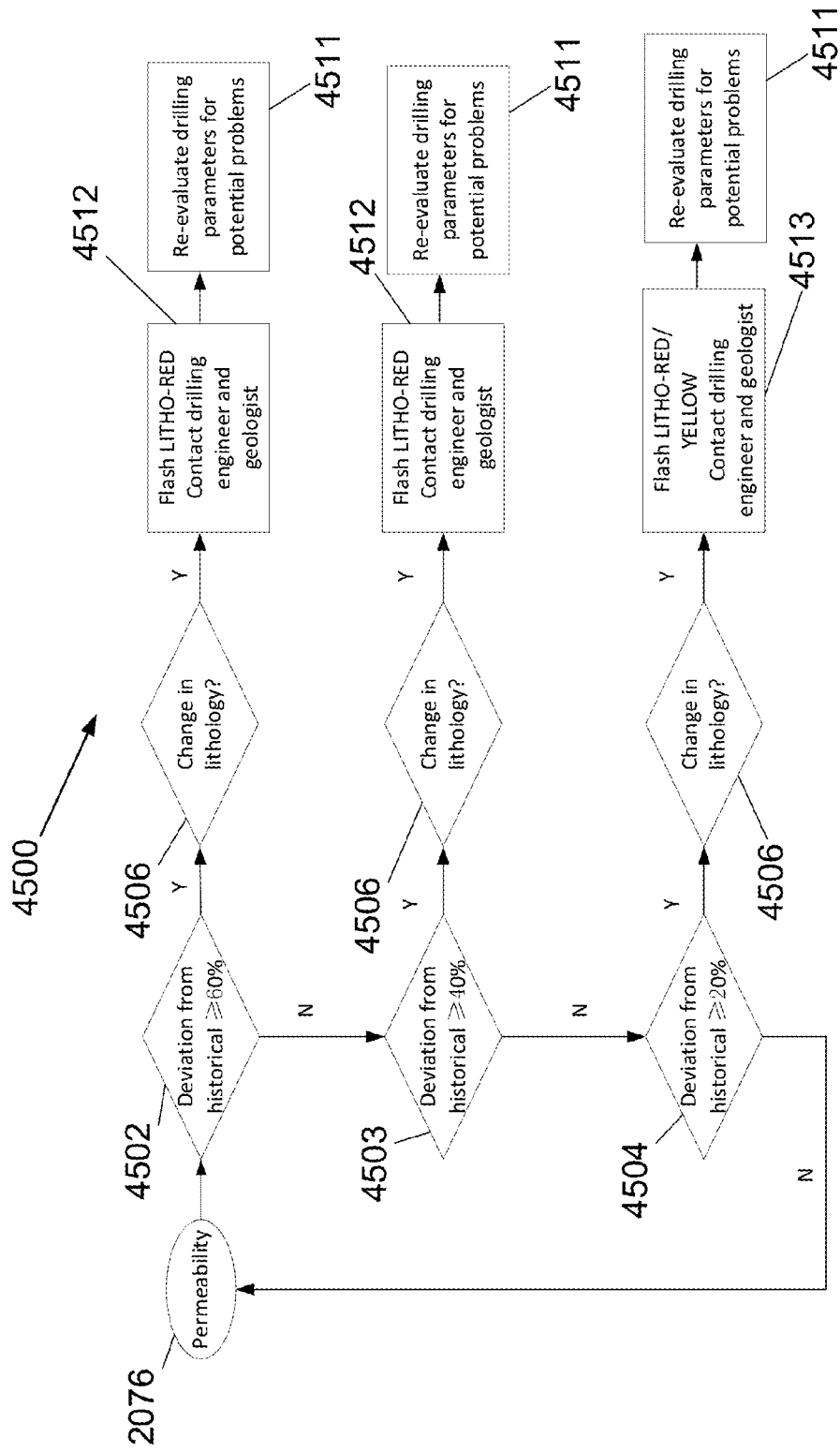
FIG. 27 shows a decision tree of the expert decision engine relating to permeability according to an embodiment of the present invention.

According to an embodiment as shown in FIG. 27, the permeability decision tree 4500 monitors the permeability 2076 parameter for significant deviation from the historical reference value 312. If the deviation from the historical value is greater or equal to 60% 4502, it is determined whether there has been a change in lithology 4506 as described above, and if there has been a change in lithology then the expert decision engine 328 panel may flash litho-red and prompt the user to contact the drilling engineer and geologist 4512 to re-evaluate the drilling parameters for potential hole problems 4511. If the deviation from the historical value is not greater or equal to 60%, but greater or equal to 40% 4503, it is determined whether there has been a change in the lithology 4506 in the same manner as described for porosity above. If there has been a change in the lithology, the expert decision engine 328 panel may flash litho-red and prompt the user to contact the drilling engineer and geologist 4512 to re-evaluate the drilling parameters for potential hole problems 4511. If the deviation from the historical value is not greater or equal to 40%, it is determined whether it is greater or equal to 20% 4504 and if yes, it is determined whether there has been a change in the lithology 4506. If there has been a change in lithology, the expert decision engine 328 panel may flash litho-red and yellow alternately and prompt the user to contact the drilling engineer and geologist 4513 to re-evaluate the drilling parameters for potential hole problems 4511. A person skilled in the art will appreciate that different thresholds than 60%, 40% and 20% may be used according to embodiments of the invention in the discretion of the operator or user.

Stuck Pipe

Figure 28:
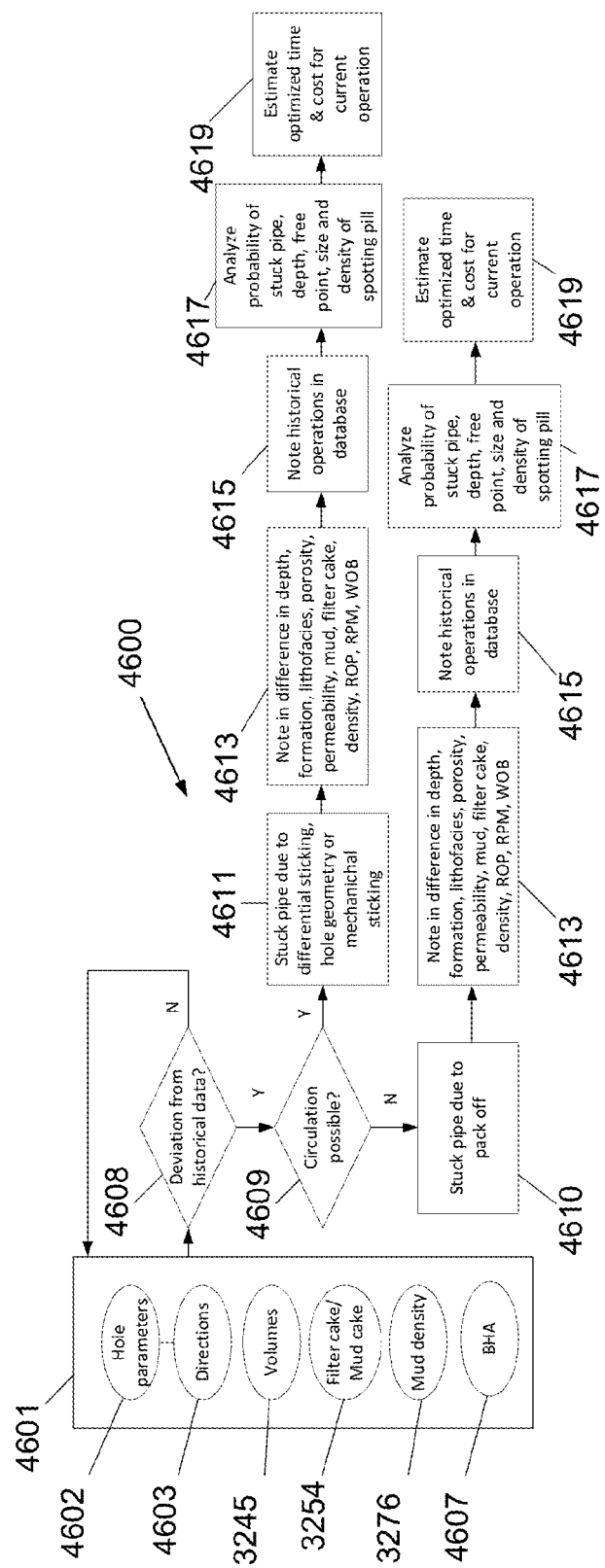
FIG. 28 shows a decision tree of the expert decision engine relating to the concern of a stuck pipe according to an embodiment of the present invention.

According to an embodiment as shown in FIG. 28, the stuck pipe 4600 decision tree monitors the stuck pipe decision parameters 4601 such as hole parameters 4602, directions 4603, volumes 3245, filter cake/mud cake 3254, mud density 3276, and bottom hole assembly 4607 parameters for deviation from the historical reference value 4608. If there is deviation, i.e. if you get stuck on the current well where they did not get stuck on the historical well, then a determination of the differences may be made to aid in decision making; the expert system engine 328 determines whether circulation is possible 4609. If yes, then there may be stuck pipe due to differential sticking, hole geometry (keyseat, dogleg, etc.) or mechanical sticking (junk in the hole or casing seat, etc.) 4611 and the expert decision engine 328 then reviews the difference in depth, formation, lithofacies, porosity, permeability, mud, filter cake, density, ROP, RPM, and WOB 4613, and the historical operations in the database 4615 and may analyze the probability of stuck, depth, free point, size and density of spotting pill 4617, and estimate optimized time and cost for the current operation 4619. If circulation is not possible, there may be a stuck pipe due to pack off 4610, and the expert decision engine 328 then notes the difference in depth, formation, lithofacies, porosity, permeability, mud, filter cake, density, ROP, RPM and WOB 4613, and the historical operations 4615 in the database and may analyze the probability of stuck pipe, depth, free point, size and density of spotting pill 4617, and estimate optimized time and cost for the current operation 4619.

The analysis of the probability of getting stuck is made with regard to whether there is circulation or no circulation and the directionality during getting stuck: drilling ahead, tripping in the hole, tripping out of the hole, with drill string or electric logging tools. When drilling, the free point is analyzed via an equation (provided a few paragraphs below), which conveys the depth of stuck pipe. While tripping, it is evident (number of pipe, etc.) or may be determined from sensors 101. The size of the spotting pill may be done by rule of thumb. According to an embodiment, the spotting pill may be approximately 50 barrels. According to an embodiment, the density of spotting pill may be 1 to 1.5 pounds per gallon more than the drilling mud.

The expert decision engine 328 may therefore determine stuck pipe situations while drilling. The free point constant for the stuck pipe may be determined from the depth at which the pipe is stuck and the number of feet of free pipe may be estimated by the drill pipe stretch table (see Table 21).

TABLE 21

Drill pipe stretch table

| ID (in.) | Nominal Weight (lb/ft) | ID (in) | Wall Area (sq in.) | Stretch constant (in/klb/kft) | Free point constant |
|---|---|---|---|---|---|
| 2⅜ | 4.85 | 1.995 | 1.304 | 0.30675 | 3260.0 |
|  | 6.65 | 1.815 | 1.843 | 0.21704 | 4607.7 |
| 2⅞ | 6.85 | 2.241 | 1.812 | 0.22075 | 4530.0 |
|  | 10.40 | 2.151 | 2.858 | 0.13996 | 7145.0 |
| 3½ | 9.50 | 2.992 | 2.590 | 0.15444 | 6475.0 |
|  | 13.3 | 2.764 | 3.621 | 0.11047 | 9052.5 |
|  | 15.5 | 2.602 | 4.304 | 0.09294 | 10760.0 |
| 4.0 | 11.85 | 3.476 | 3.077 | 0.13000 | 7692.5 |
|  | 14.00 | 3.340 | 3.805 | 0.10512 | 9512.5 |
| 4½ | 13.75 | 3.958 | 3.600 | 0.11111 | 9000.0 |
|  | 16.60 | 3.826 | 4.407 | 0.09076 | 11017.5 |
|  | 18.10 | 3.754 | 4.836 | 0.08271 | 12090.0 |
|  | 20.00 | 3.640 | 5.498 | 0.07275 | 13745.0 |
| 5.0 | 16.25 | 4.408 | 4.347 | 0.09145 | 10935.0 |
|  | 19.50 | 4.276 | 5.275 | 0.07583 | 13187.5 |
| 5½ | 21.90 | 4.778 | 5.828 | 0.06863 | 14570.0 |
|  | 24.70 | 4.670 | 6.630 | 0.06033 | 16575.0 |
| 6⅝ | 25.20 | 5.95 | 6.526 | 0.06129 | 16315.0 |

The length of free pipe may be calculated as follows:

$$\text{Feet of free pipe} = \frac{\text{stretch(in.)} \times \text{free point constant}}{\text{pull force}(1000 \text{ lb})}$$

The free point constant (FCF) may be determined for any type of steel drill pipe if the outside diameter and inside diameter are known:

$$FPC = A_s \times 2500$$

where $A_s$ denotes the pipe wall cross sectional area (sq. in)

Bit Wear

Figure 29:
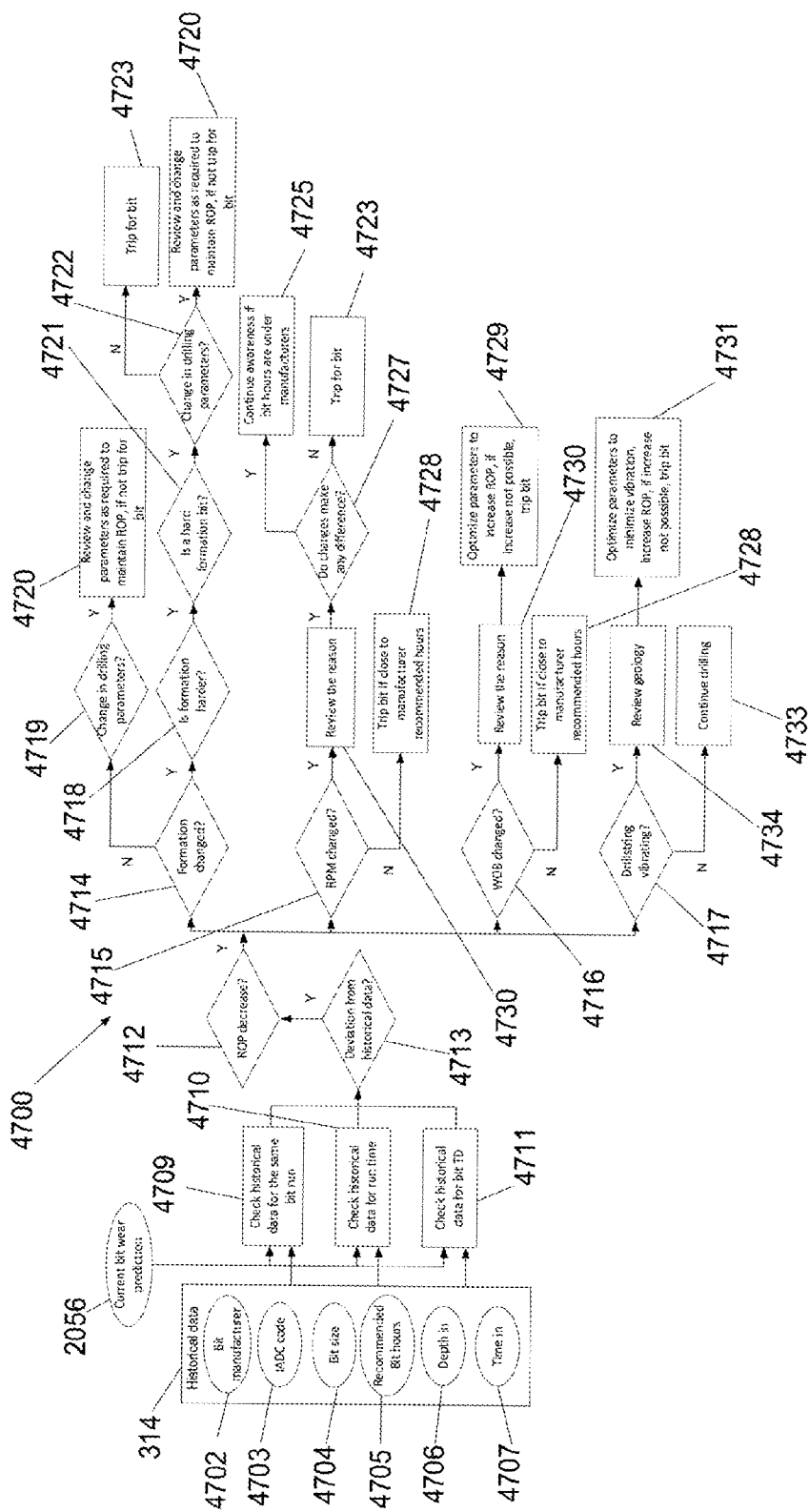
FIG. 29 shows a decision tree of the expert decision engine relating to bit wear according to an embodiment of the present invention.

According to an embodiment as shown in FIG. 29, the bit wear prediction decision tree 4700 monitors the current bit wear prediction 2056 and historical data for the same bit 314. The bit manufacturer 4702, IADC (International Association of Drilling Contractors) code for bit type 4703, bit size 4704, recommended bit hours 4705, depth in 4706, time in 4707, are checked against historical data for same bit run 4709, checked against historical data for run time 4710, and checked against historical data for bit total depth 4711 for deviation from the historical data 4713. If there is a deviation from historical data, i.e. when all or some of the parameters are different from the historical database for the same bit, and there is a rate of penetration (ROP) decrease 4712, then it is determined whether the formation changed 4714, and if no, then it is determined whether there has been a change in the drilling parameters 4719. If yes, the parameters are reviewed and changed as required to maintain rate of penetration, if not the expert system engine prompts to trip for bit 4720. If the formation has changed, i.e. which is determined in the same way as a lithology change as discussed above, if the formation is harder 4718, then the bit is checked as to whether it is a hard formation bit 4721, if it is then is it checked to determine whether there has been a change in drilling parameters 4722 and if not, the expert system engine prompts to trip for bit 4723 to change the bit. If yes, the parameters are reviewed and changed as required to maintain the rate of penetration 4720. If there has been a rate of penetration decrease, the expert decision engine 328 also determines if RPM (revolutions per minute, which is a measure of bit rotary speed) has changed 4715. If RPM has not changed, then the expert decision engine 328 prompts to trip the bit if it is close to the bit manufacturer's recommended hours 4728. If the RPM has changed, then the reason is reviewed 4730 and the expert decision engine 328 determines if any changes will make a difference 4727. If changes to the drilling parameters do not make a difference then the expert decision engine 328 prompts to trip the bit 4723. If the changes make a difference, then the expert decision engine 328 continues to monitor that bit hours are under manufacturer's recommended hours 4725. If there has been a rate of penetration decrease, the expert decision engine 328 also determines if WOB has changed 4716. If WOB has not changed, then the expert decision engine 328 trips the bit if close to the bit manufacturer's recommended hours 4728. If the WOB has changed, then the reason is reviewed 4730 and the parameters may be optimized to increase ROP. If an increase is not possible, the system trips for bit 4729. If there has been a rate of penetration decrease, the expert decision engine 328 also determines if the drill string is vibrating 4717. If the drill string is vibrating, the geology is reviewed 4734 and the system optimizes the parameters to minimize vibration and increase the ROP, and if an increase is not possible, the system trips for bit 4731. If the expert decision engine 328 determines that the drill string is not vibrating, the system continues drilling 4733. The geology review 4734 may be carried out by checking the current lithology sample to see if there is any evidence of a different geology than that indicated by the predicted lithology. For example, is there any chert or other hard or soft material at this depth that would indicated this formation is such that vibration would occur. Drilling parameters may be optimized by changing pump rates (stokes per minute, SPM), RPM, and WOB to see if any minor variation causes an improvement.

Environmental

Figure 30:
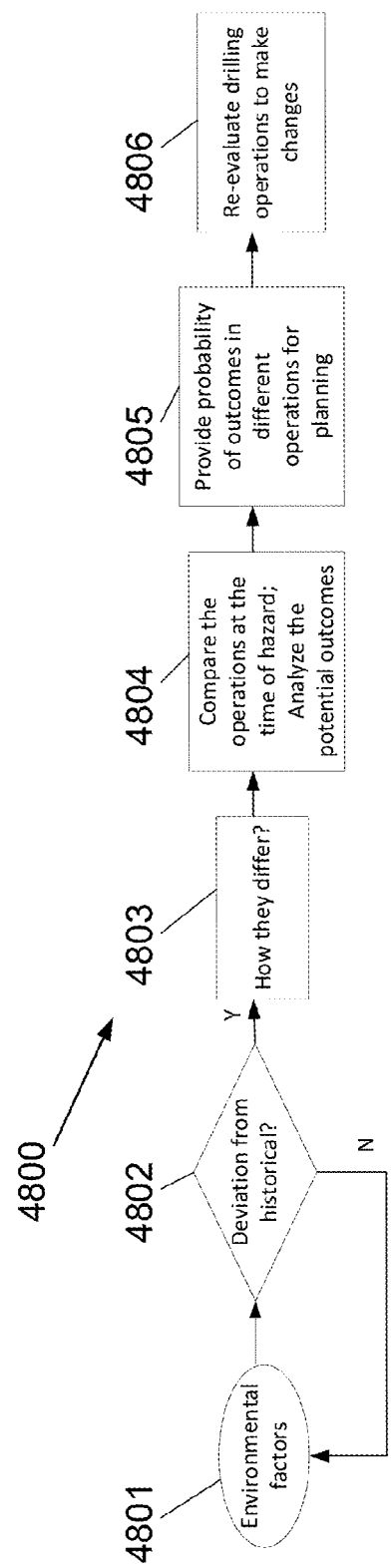
FIG. 30 shows a decision tree of the expert decision engine relating to environmental concerns according to an embodiment of the present invention.

According to an embodiment as shown in FIG. 30, the environmental factors decision tree 4800 may review the environmental factors 4801 to determine if there is deviation from historical values 4802. The environmental factors 4801 reviewed may include what type of fluid that was spilled (e.g. water based mud, oil based mud, formation fluid, engine fluid, gas or diesel?), what was the volume of spilled fluid, how sensitive are the surrounding areas to the fluid (e.g. dry land or water, lake, pond, swamp, river, or creek, or underground water table?), is the well in an environmentally sensitive area, such as a 'wet lands', a 'national park', etc., and other environmental factors conceived of by the drilling contractor and operator. If there is a deviation, the expert decision engine 328 determines how these differences differ from the historical values 4803, and then the expert decision engine 328 may compare the operations at the time of the hazard with historical wells in the area or other wells in the drilling area that have had similar incidents and the potential outcomes are analyzed 4804. The potential outcomes are analyzed by comparing them to the historical well problems in the same area, if any, or to outcomes given the contingency plans and other wells in the drilling area. The expert decision engine 328 then provides probabilities of the potential outcomes in different operations for planning 4805 and the drilling operations are then re-evaluated to make changes 4806. The probabilities of outcomes are generated by having more than one of these incidents, problems, concerns or issues occurring in the area on or by other rigs or in the historic well data. When the contingency plan is developed by the operator or contractor, they may research this data.

Software Implementation

Figure 31:
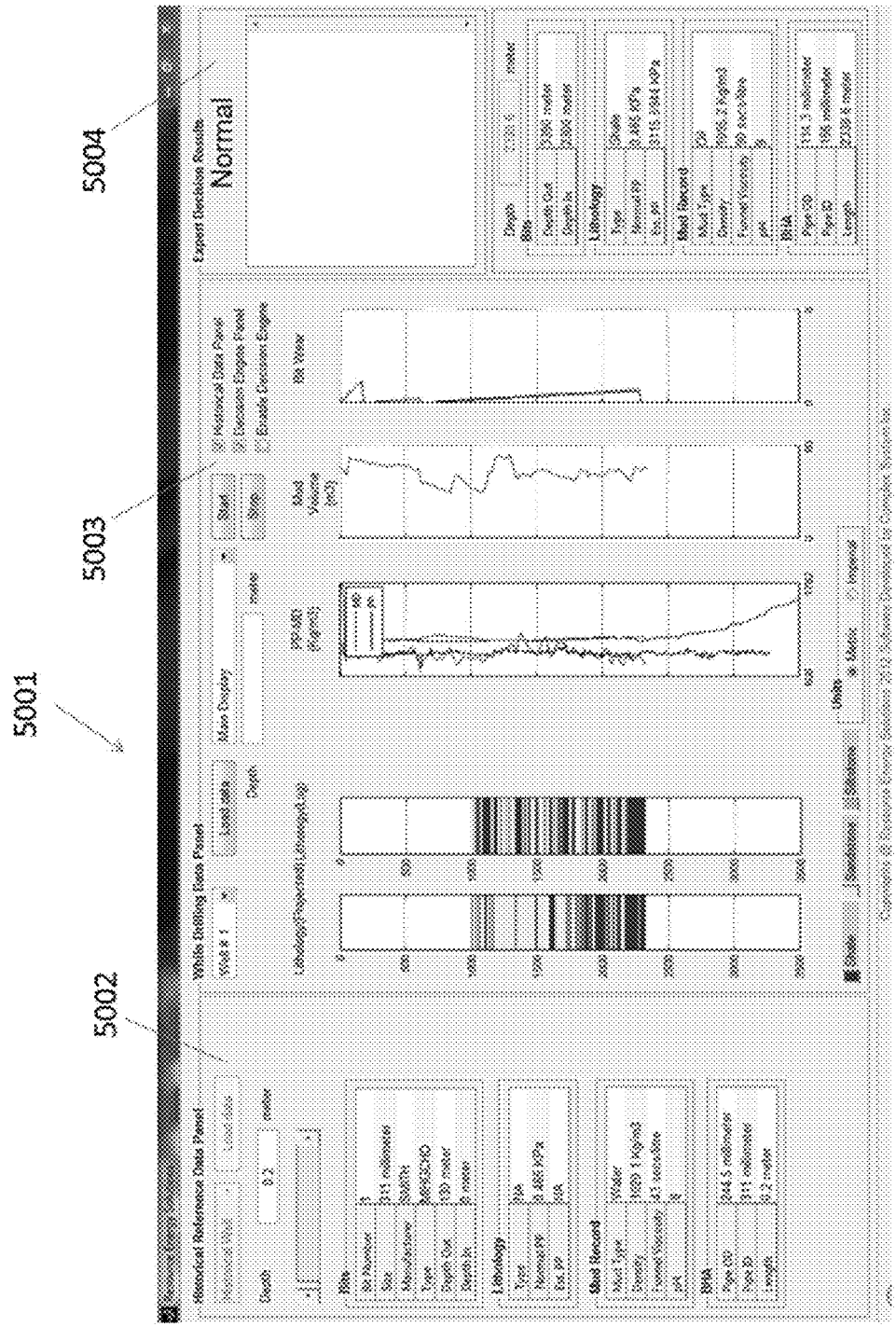
FIG. 31 shows a graphical user interface (GUI) with three panels according to an embodiment of the present invention.
Figure 32:
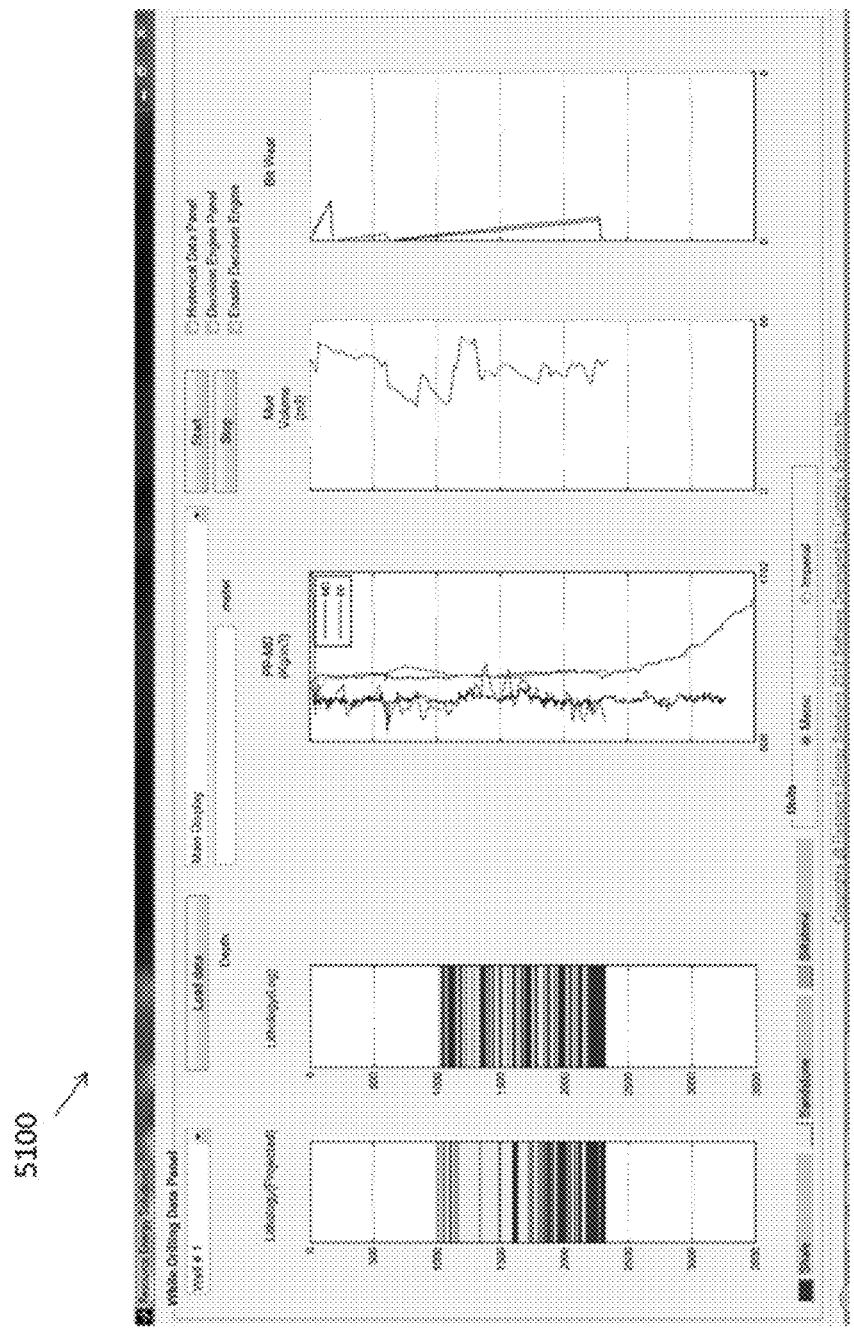
FIG. 32 shows a main display of the GUI according to an embodiment of the present invention.

According to an embodiment as shown in FIG. 31, a graphical user interface (GUI) 5001 may be provided for the software. According to an embodiment, the functions in the prediction engine 20, the trend fusion engine 308 and the expert decision engine 328 may be integrated into the software so that the full set of relevant drilling parameters, prediction tools, optimization tools, analytic tools and the expert decision system are available to the user through a common interface. According to an embodiment, the GUI 5001 may be made up of three subpanels which govern different aspects of the software's functionality. According to the embodiment as shown in FIG. 31, those subpanels are a Historical Reference Data Panel 5002, a While-Drilling Data Panel 5003 and Expert Decision Panel 5004.

As shown in FIG. 31, the Historical Reference Data panel 5002 may display the historical drilling data obtained from the nearby analogous wells as reference information. The Expert Decision panel 5004 may allow comparison between the real-time drilling parameters and operations with the historical drilling data in the Historical Reference Data panel 5002. Since the reference information in the Historical Reference Panel 5002 is time/depth dependent, there may be a slider and text box for users to provide the depth and the information may be retrieved accordingly. The reference data may comprise information relating to the drill bits including bit type, depth in/out, diameter, manufacturer, manufacturer recommended hours, historical hours of running and bit wear status when pulled out; information relating to lithology including lithology type, estimated port pressure gradients, normal pore pressure for the region, porosity 2075, permeability 2076 and water saturation 3246; information relating to mud records including mud weight, mud type, viscosity, and PH; and information relating to the bottom hole assembly (BHA) including assembly components, outer diameter, inner diameter, pipe length, and weight.

The While-Drilling Data panel 5003 may show the real-time drilling data either from the real-time data acquisition system or from the data simulator. The while-drilling data may be loaded from the drop-down list on the top of the While-Drilling Data panel 5003 if it is from the real-time data acquisition system. In this scenario, the start button may initiate the data acquisition result in the plotting of the real-time drilling data as well as generation of the associated engine outputs. Alternatively, the simulator may be enabled when no real-time data is loaded. In this case, the start button may initiate the simulator to plot the simulated data in an animated fashion. The simulator may simulate various cases of potential problems in the drilling process which may not appear in the real-time data. The drilling fusion prediction engine 20 and the expert decision engine 328 may be triggered immediately after the simulation or loading starts. The views of the historical data panel 5002 and the expert decision panel 5004 may be enabled or disabled by clicking the check boxes on top of the while-drilling data panel 5003.

Also on top of the while-drilling data panel 5003, a drop-down list may be provided for the user to switch between five different categories, which may represent five different views of current drilling parameters (Table 22). All plots for different categories may be synchronized. After clicking the start button, plotting may be executed in real-time so that switching between different categories does not interfere with the plotting processing.

TABLE 22

Categories in while-drilling information display

| Category | Parameters |
|---|---|
| Main Display | Lithology (from logging), Lithology (from prediction), Pore pressure estimate (from Trend Fusion Engine), mud volume, mud density, predicted bit wear |
| MWD | ROP, WOB, RPM, torque, flow |
| Hydrostatic Pressure | Hydrostatic pressure, BHP (static) |
| Dynamic Pressure | APL, ECD, BHP (circulation), Trip margin |
| LWD | Gammy ray, tension, neutron porosity, water saturation, filter cake |
| Kill Sheet | Capacity and volume calculations |

Figure 33:
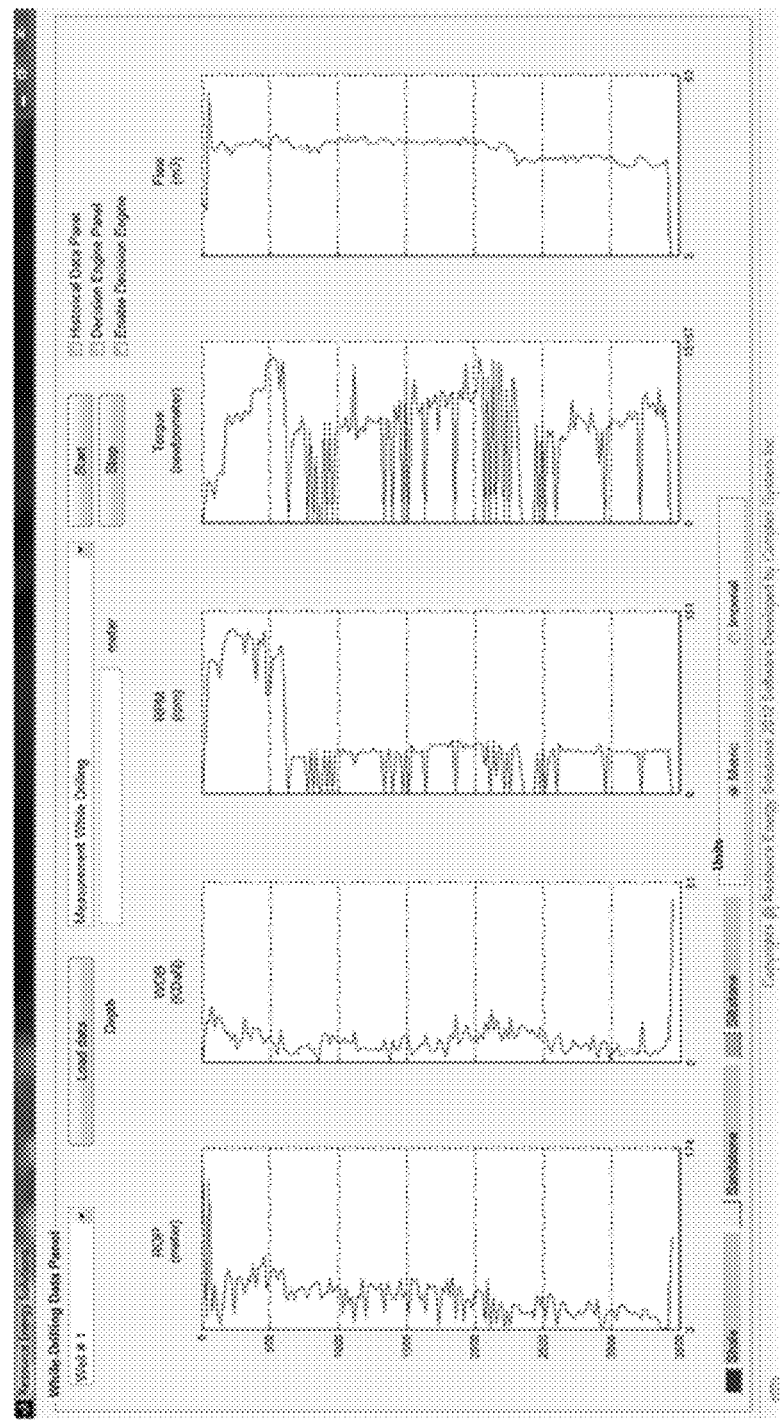
FIG. 33 shows a MWD display of the GUI in metric units according to an embodiment of the present invention.
Figure 34:
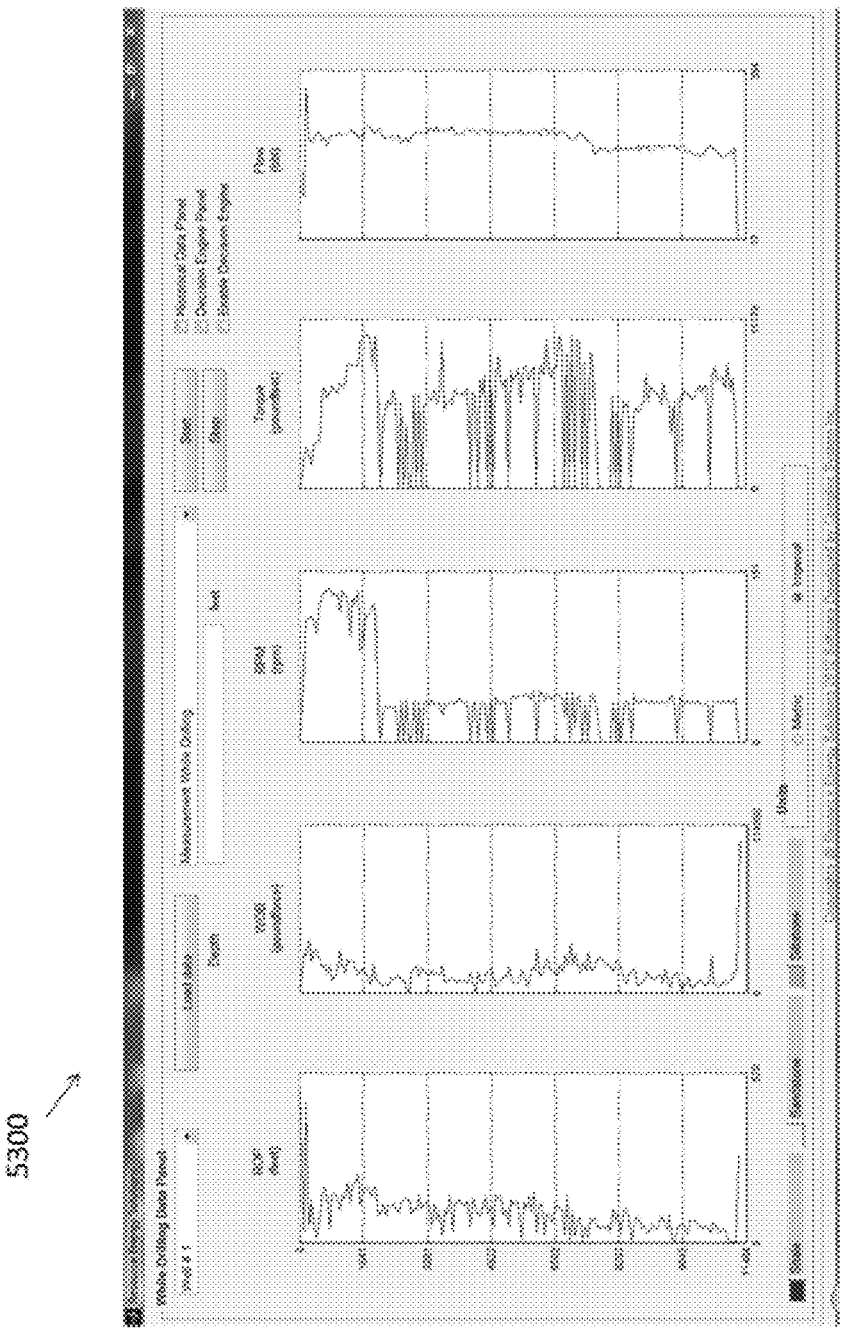
FIG. 34 shows a MWD display of the GUI in imperial units according to an embodiment of the present invention.
Figure 35:
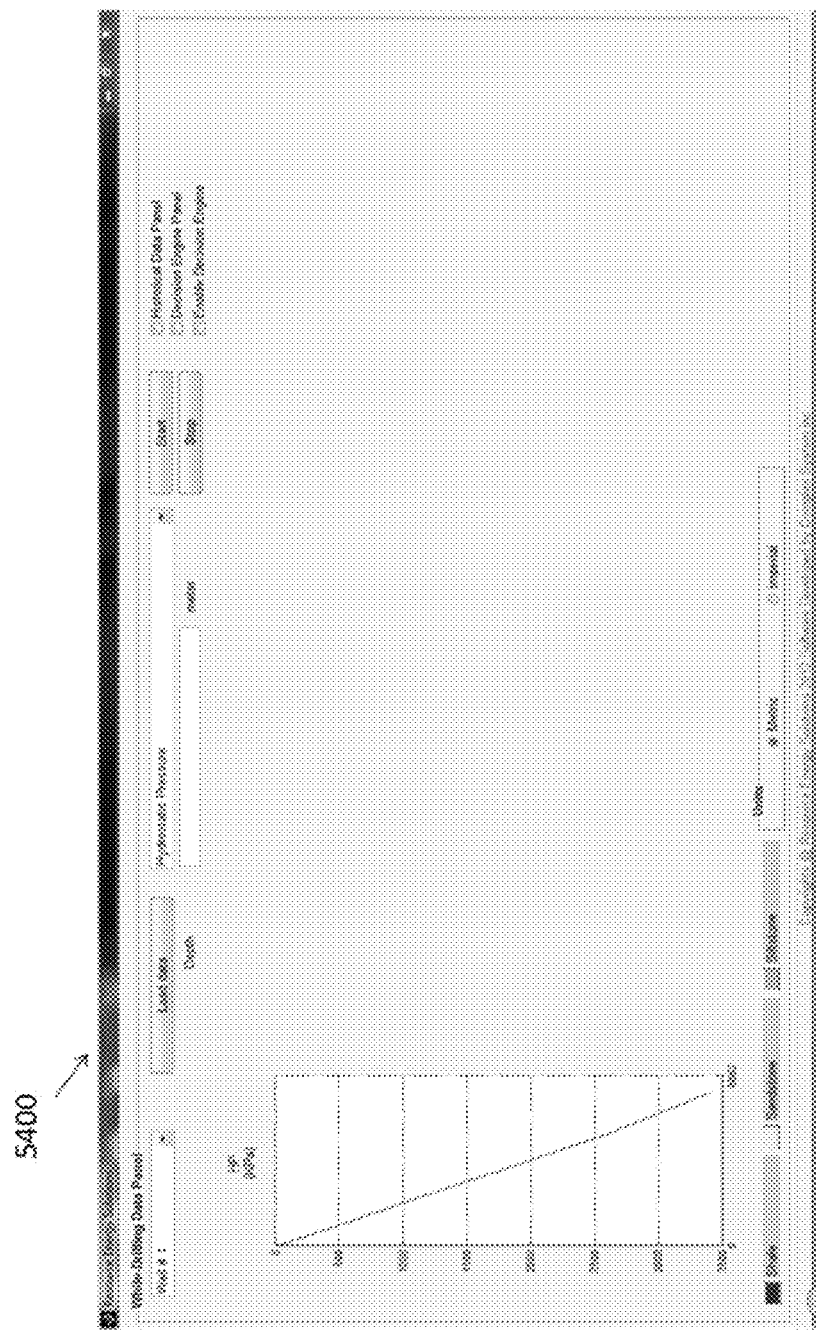
FIG. 35 shows a hydrostatic pressure display of the GUI according to an embodiment of the present invention.
Figure 36:
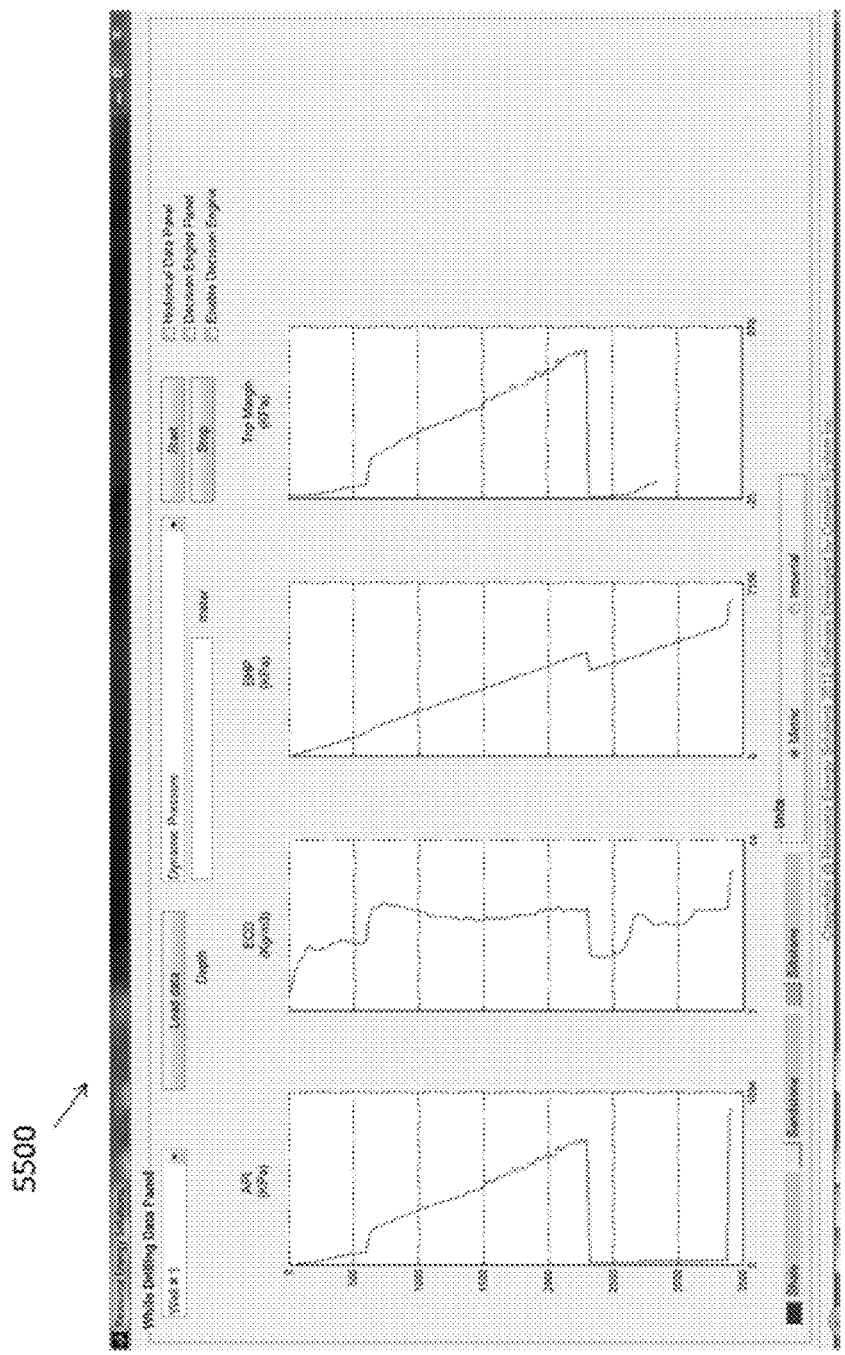
FIG. 36 shows a dynamic pressure display of the GUI according to an embodiment of the present invention.
Figure 37:
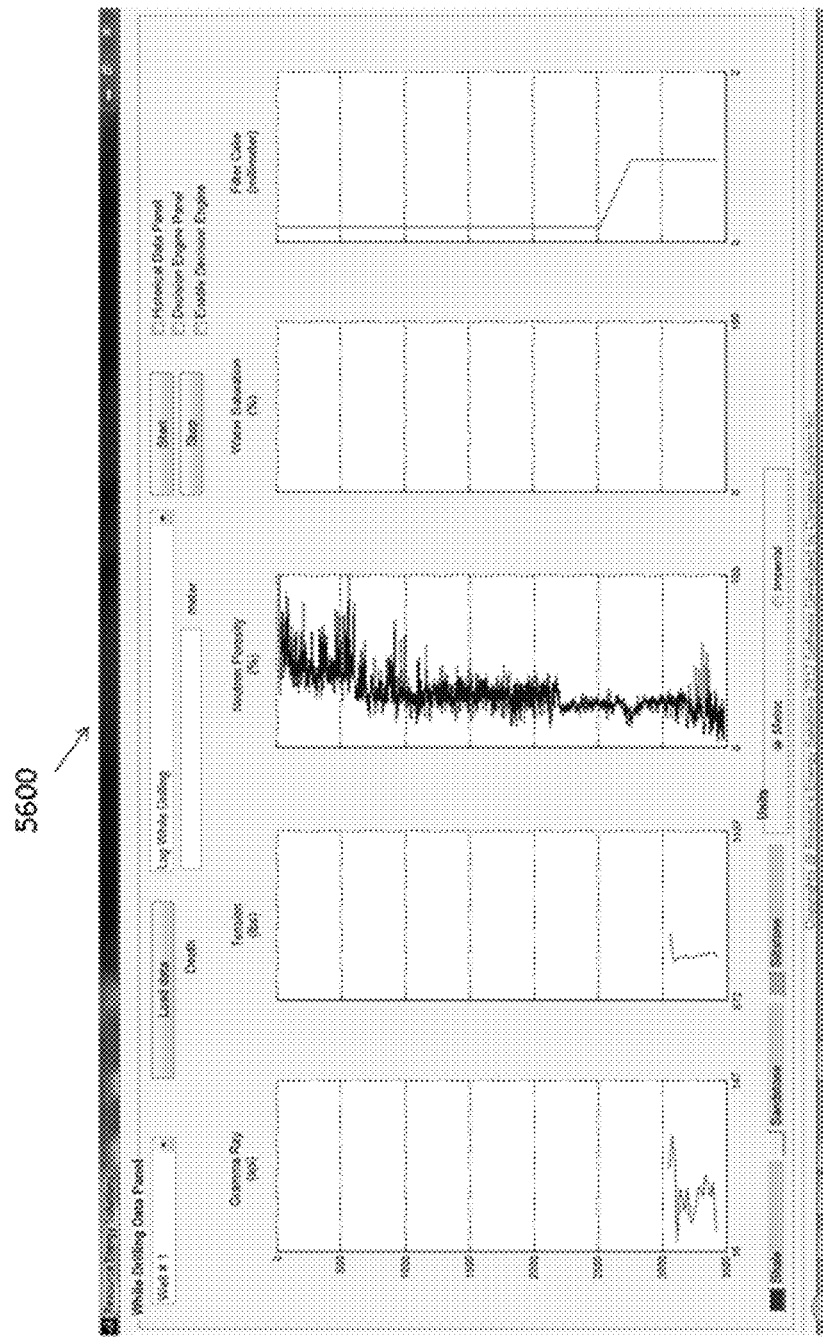
FIG. 37 shows a logging-while-drilling (LWD) display of the GUI according to an embodiment of the present invention.
Figure 38:
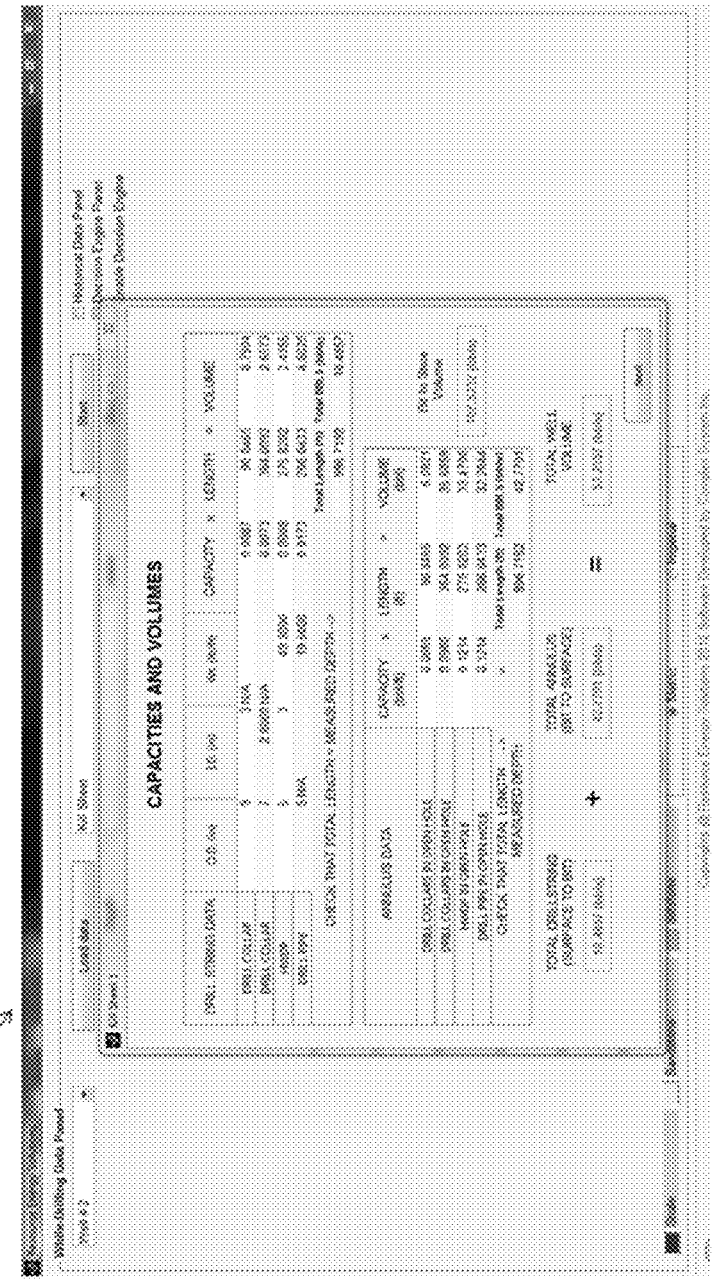
FIG. 38 shows a kill sheet display of the GUI according to an embodiment of the present invention.
Figure 39:
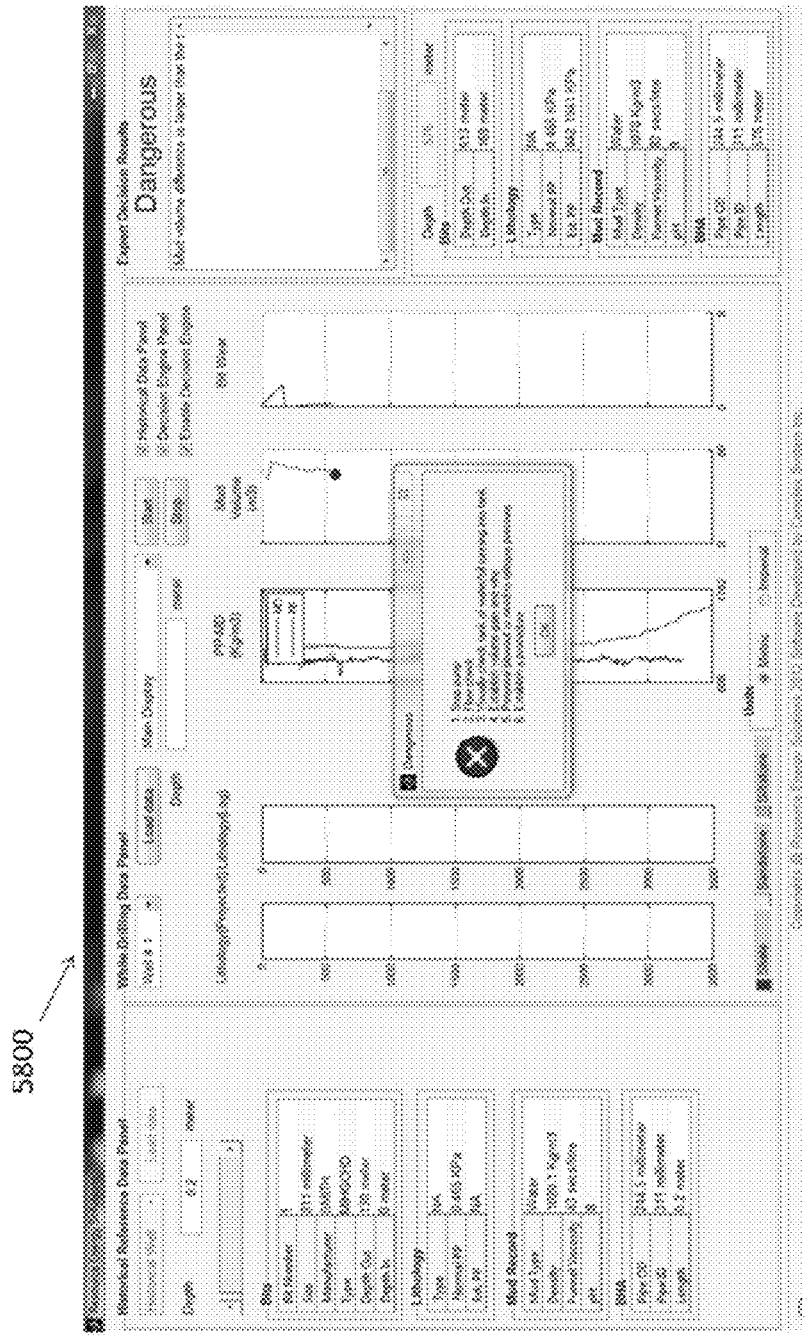
FIG. 39 shows an expert decision engine prompt for a mud volume issue for Well #1 according to an embodiment of the present invention.
Figure 40:
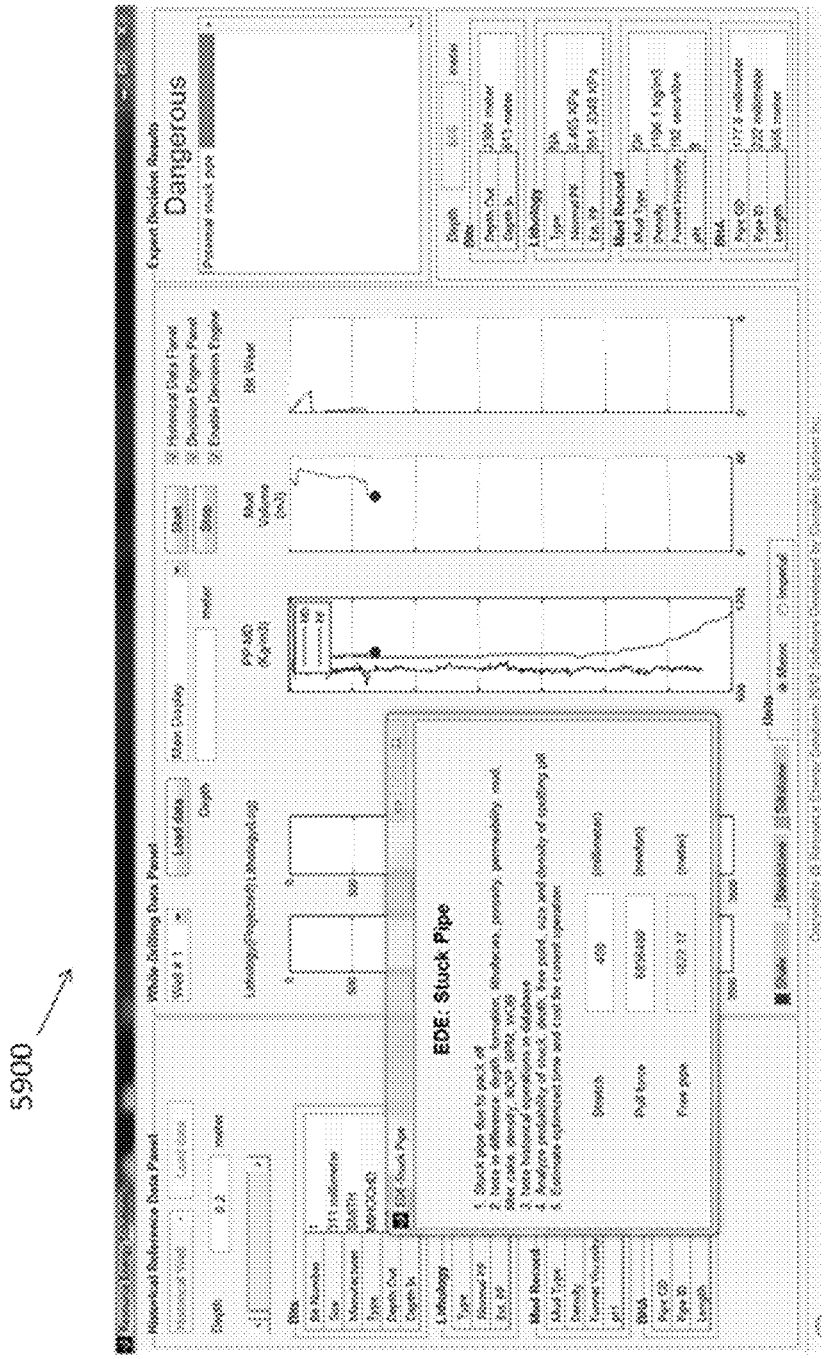
FIG. 40 shows an expert decision engine prompt for potential stuck pipe due to mud density and mud volume for Well #1 according to an embodiment of the present invention.
Figure 41:
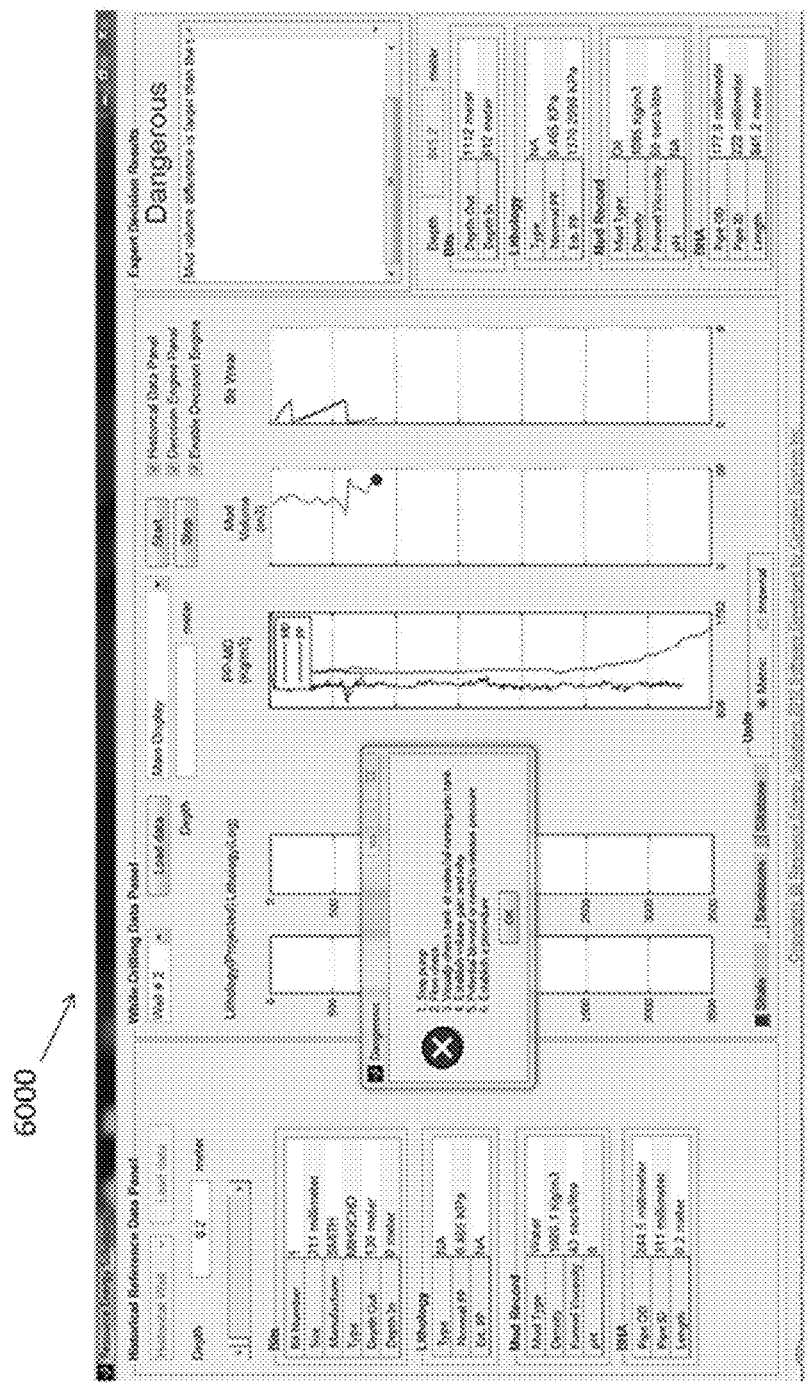
FIG. 41 shows an expert decision engine prompt for a mud volume issue for Well #2 according to an embodiment of the present invention.
Figure 42:
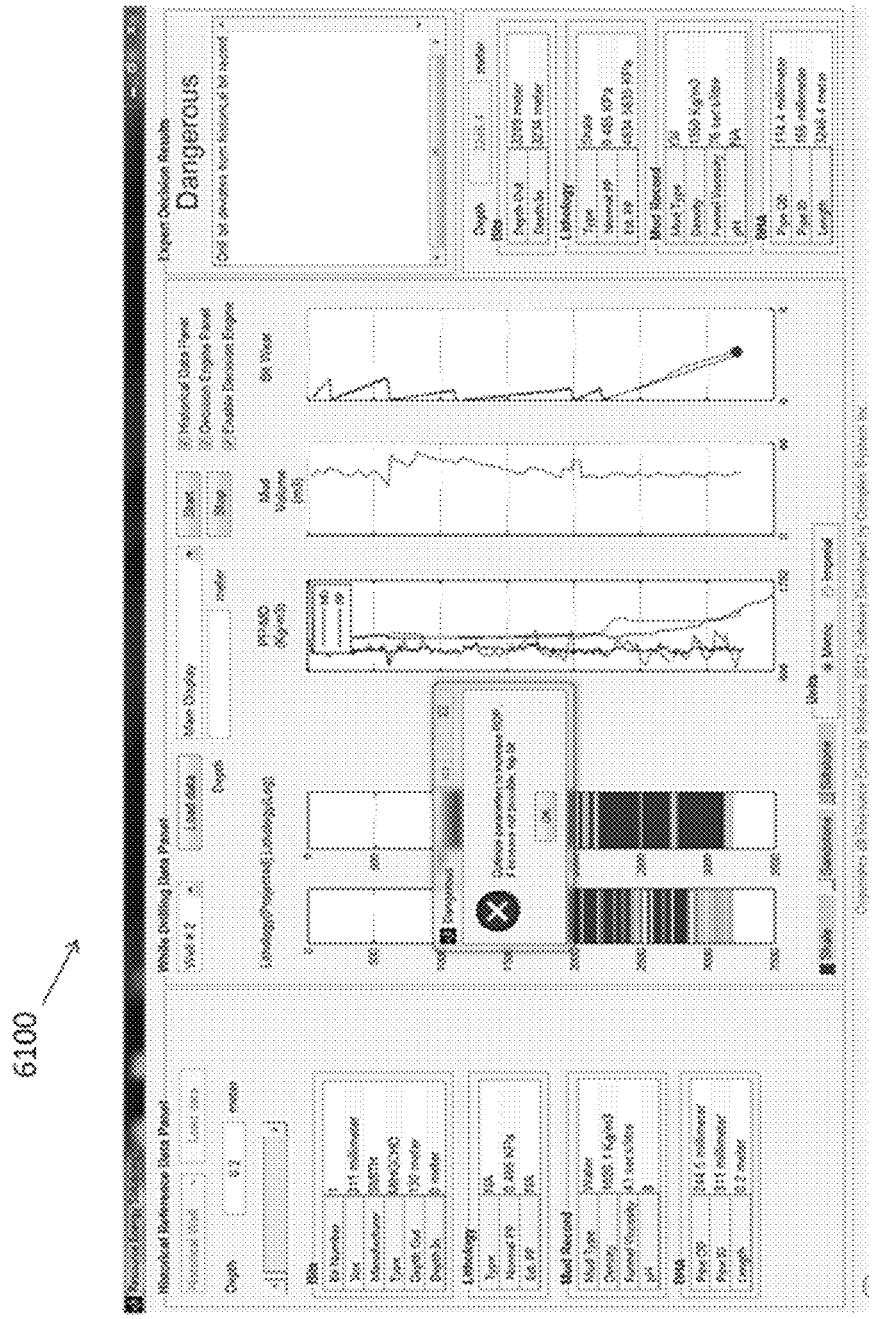
FIG. 42 shows an expert decision engine prompt for bit wear for Well #2 according to an embodiment of the present invention.
Figure 43:
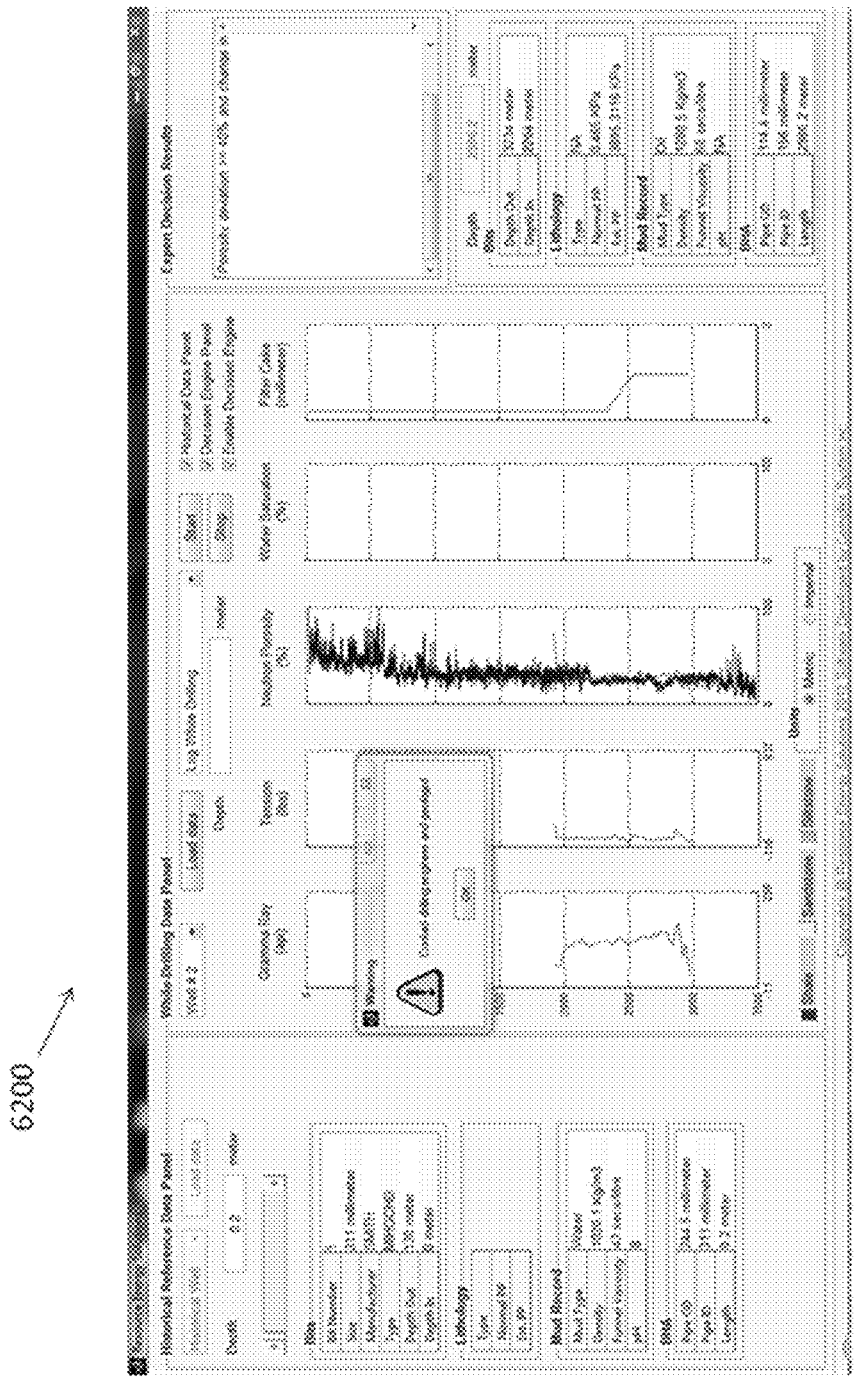
FIG. 43 shows an expert decision engine prompt for a porosity issue for Well #2 according to an embodiment of the present invention.

FIGS. 32, 33, 34, 35, 36, 37, and 38 show screen shots for these five categories: GUI-main display 5100, GUI-MWD (metric units) 5200, GUI-MWD (imperial units) 5300, GUI-Hydrostatic pressure 5400, GUI-Dynamic pressure 5500, GUI-LWD 5600, GUI-Kill sheet 5700. FIGS. 33 and 34 belong to the same category (i.e., MWD) but with a different unit system. The unit conversion may be enabled by clicking the switch buttons on the bottom of the GUI. According to an embodiment, the default unit system may be the metric unit system. Real-time data may be plotted in red and the referencing historical data, if applicable, may be plotted in blue or green. The category kill sheet may retrieve the current drilling assembly information to calculate the capacities and volumes along the drill string and pipe, which may be displayed in the first GUI window. The GUI may also allow users to continue calculation by inputting more information in the second, third and fourth GUI windows.

The Expert Decision panel 5004 (right panel in FIG. 31) may list the status reports from the six expert decision engines. According to an embodiment, different drilling statuses may be indicated by using different colours on the top of the panel, for example, Normal (green), Warning (yellow), and Dangerous (red). The status may be continuously updated to indicate an ongoing problem while drilling as well as the suggested actions to take. Similar to the Historical Reference Data panel 5002, the Expert Decision panel 5004 may also enable users to examine the drilling parameters in detail at a specific depth.

According to an embodiment, the warning and dangerous statuses may trigger the system to be stopped immediately so that the drilling engineers or operator may examine the problem. Normal status would not interrupt the drilling as all parameters would have been determined to be within the safety requirement. In the cases of a warning status or dangerous status, the current potential issues may be shown in the status window for review by the user. The associated problematic parameters may also be flashed in their corresponding displays at the current drilling depth. All potential problems as determined by the expert decision engine may also be recorded in a log for subsequent viewing.

FIGS. 39, 40, 41, 42, and 43 show the expert decision engine prompts for mud volume issues for Well #1 5800 and Well #2 6000, a porosity issue for Well #2 6200, a bit wear issue for Well #2 6100 and a potential stuck pipe 5900 for Well #1 according to an embodiment. As the potential issues are determined, further suggestions towards the underlying drilling parameters may be displayed in a pop-up window.

According to an embodiment, optimized drilling parameters 2072, as shown in FIG. 3, from the drilling optimization engine 205 may be used by the control software of the drill string to adjust drilling operations in view of the real-time predictions or expert system engine recommendations. Drilling operations may be adjusted manually, by a human operator viewing the optimized drilling parameters 2072, according to an embodiment, on a standard computer display, and acting on them to control drilling operations; alternatively, the optimized drilling parameters 2072 may be automatically fed into the control software for operating a drilling rig, subject to a manual override by a human operator. According to an embodiment, the optimized drilling parameters 2072 may be used to update the geological model and trajectory database to ensure their contents reflect the real-time observations and measurements, or to replace planned parameter values with actual measurements in the drilling model. The prediction-optimization control may form a closed feedback loop for drilling operation, which may reduce the overall drilling cost and risk.

Embodiments of the invention, or aspects thereof, may be provided in a computer program comprising computer readable instructions for execution on a computer. The computer program is storable on any suitable computer storage medium so as to comprise a computer program product. Such a computer program may provide a graphical user interface which may allow the drilling operator to view and override adjusted drilling parameters as desired.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of drilling a wellbore in a geological formation, comprising:
   acquiring historical geological data of a region to be drilled;
   determining trends in the historical geological data;
   acquiring real-time drilling data during drilling;
   pre-processing the real-time drilling data including applying data validation and data smoothing to the real-time drilling data;
   determining a real-time lithology prediction by processing the pre-processed real-time drilling data through a multilayer neural network trained using the historical geological data;
   adjusting drilling parameters in real-time based on the real-time lithology prediction;
   recognizing an unsafe condition in the wellbore using the determined trends from the historical geological data and the pre-processed real-time drilling data; and
   displaying an expert system recommendation to an operator in response to the recognition of the unsafe condition.

2. The method of claim 1, wherein the step of displaying an expert system recommendation to an operator in response to the recognition of the unsafe condition comprises displaying the expert system recommendation to the operator through a graphical user interface.

3. The method of claim 2, further comprising displaying the real-time lithology prediction to the operator through a graphical user interface.

4. The method of claim 1, wherein the step of recognizing an unsafe condition in the wellbore using the determined trends from the historical geological data and the pre-processed real-time drilling data includes an expert decision engine applying a set of expert decision rules.

5. The method of claim 4, wherein the expert decision engine applies rules relating to a mud volume parameter.

6. The method of claim 4, wherein the expert decision engine applies rules relating to a porosity parameter.

7. The method of claim 4, wherein the expert decision engine applies rules relating to a permeability parameter.

8. The method of claim 4, wherein the expert decision engine applies rules relating to a stuck pipe parameter.

9. The method of claim 4, wherein the expert decision engine applies rules relating to a bit wear parameter.

10. The method of claim 4, wherein the expert decision engine applies rules relating to an environmental factor.

11. A drilling system for drilling a wellbore in a geological formation, the drilling system comprising:
    one or more sensors for sensing real-time drilling data at a rig during a drilling operation;
    a computer system including:
      a drilling fusion prediction engine configured to receive the sensed real-time drilling data and to pre-process the sensed real-time drilling data including applying data validation and data smoothing to the sensed data, the drilling fusion prediction engine including a software module for predicting lithology in real time by processing the preprocessed sensed real-time drilling data through a multilayer neural network trained using historical geological data of a region to be drilled;
      a trend fusion engine to receive the historical geological data and to determine trends in the historical geological data; and
      an expert decision engine configured to recognize an unsafe condition in the wellbore using the determined trends from the historical geological data and the pre-processed sensed real-time drilling data and to display an expert system recommendation to an operator in response to the recognition of the unsafe condition; and
    a communication network to transmit the sensed real-time drilling data to the drilling fusion prediction engine.

12. The drilling system of claim 11, wherein the expert system recommendation is displayed to an operator through a graphical user interface.

13. The drilling system of claim 11, wherein the expert decision engine is configured to apply a set of expert decision rules.

14. The drilling system of claim 13, wherein the expert decision rules include rules relating to a mud volume parameter.

15. The drilling system of claim 13, wherein the expert decision rules include rules relating to a porosity parameter.

16. The drilling system of claim 13, wherein the expert decision rules include rules relating to a permeability parameter.

17. The drilling system of claim 13, wherein the expert decision rules include rules relating to a stuck pipe parameter.

18. The drilling system of claim 13, wherein the expert decision rules include rules relating to a bit wear parameter.

19. The drilling system of claim 13, wherein the expert decision rules include rules relating to an environmental factor.

20. A computer program product, the computer program product comprising:
- a storage medium configured to store computer-readable instructions for drilling a wellbore in a geological formation;
- the computer-readable instructions including instructions for,
    - receiving historical geological data of a region to be drilled;
    - determining trends in the historical geological data;
    - receiving real-time drilling data during drilling;
    - pre-processing the real-time drilling data including applying data validation and data smoothing to the real-time drilling data;
    - determining a real-time lithology prediction by processing the pre-processed real-time drilling data through a multilayer neural network trained using the historical geological data;
    - providing adjusted drilling parameters in real-time based on the real-time lithology prediction;
    - recognizing an unsafe condition in the wellbore using the determined trends from the historical geological data and the pre-processed real-time drilling data; and
    - displaying an expert system recommendation to an operator in response to the recognition of the unsafe condition.

* * * * *